(12) United States Patent
Hamid et al.

(10) Patent No.: US 11,113,184 B2
(45) Date of Patent: Sep. 7, 2021

(54) DISPLAY IN A GRAPHICAL FORMAT OF TEST RESULTS GENERATED USING SCENARIO MODELS

(71) Applicant: Breker Verification Systems, San Jose, CA (US)

(72) Inventors: Adnan Hamid, Fremont, CA (US); Kairong Qian, San Jose, CA (US); Kieu Do, San Jose, CA (US); Joerg Grosse, Munich (DE)

(73) Assignee: Breker Verification Systems, San Jose, CA (US)

( * ) Notice: Subject to any disclaimer, the term of this patent is extended or adjusted under 35 U.S.C. 154(b) by 450 days.

(21) Appl. No.: 15/159,576

(22) Filed: May 19, 2016

(65) Prior Publication Data

US 2016/0266203 A1    Sep. 15, 2016

Related U.S. Application Data

(63) Continuation of application No. 14/689,687, filed on Apr. 17, 2015, now Pat. No. 9,360,523.

(Continued)

(51) Int. Cl.
*G06F 11/36* (2006.01)
*G01R 31/3177* (2006.01)
(Continued)

(52) U.S. Cl.
CPC ...... *G06F 11/3688* (2013.01); *G01R 31/3177* (2013.01); *G01R 31/31813* (2013.01);
(Continued)

(58) Field of Classification Search
CPC .. G06F 11/3636; G06F 11/3692; G06F 11/28; G01R 31/3177; G01R 31/31813
See application file for complete search history.

(56) References Cited

U.S. PATENT DOCUMENTS 5,870,588 A    2/1999  Rompaey et al.
5,968,195 A *  10/1999 Ishiyama ....... G01R 31/318392
                                              714/727

(Continued)

FOREIGN PATENT DOCUMENTS

EP        1473573 B1      6/2001
WO     2001045565 A2      6/2001

OTHER PUBLICATIONS

Jbrg Grobe, 2012 Breker Verification Systems, Inc., ("Close Your Coverage Loop with Grpah-Based scenario Models") pp. 1-14. Provided on Applicants IDS.*

(Continued)

*Primary Examiner* — Akash Saxena
(74) *Attorney, Agent, or Firm* — Penilla IP, APC

(57) ABSTRACT

A method for testing a system-on-a-chip (SoC) is described. The method includes parsing a file to determine functions to be performed components of the SoC. The method further includes receiving a desired output of the SoC and generating a test scenario model based on the desired output of the SoC. The test scenario model includes a plurality of module representations of the functions and includes one or more connections between two of the module representations. The desired output acts as a performance constraint for the test scenario model. The test scenario model further includes an input of the SoC that is generated based on the desired output, the module representations, and the one or more connections. The test scenario model includes a path from the input via the module representations and the connections to the desired output.

22 Claims, 32 Drawing Sheets

Related U.S. Application Data

(60) Provisional application No. 61/981,711, filed on Apr. 18, 2014.

(51) Int. Cl.

| | | |
|---|---|---|
| *G01R 31/3181* | (2006.01) | |
| *G06F 30/20* | (2020.01) | |
| *G06F 30/39* | (2020.01) | |
| *G06F 30/331* | (2020.01) | |
| *G06F 30/3323* | (2020.01) | |
| *G06F 3/0484* | (2013.01) | |
| *G06F 11/22* | (2006.01) | |
| *G06F 11/263* | (2006.01) | |
| *G06T 11/20* | (2006.01) | |
| *G06F 9/48* | (2006.01) | |
| *G06F 11/25* | (2006.01) | |

(52) U.S. Cl.
CPC .......... *G06F 3/0484* (2013.01); *G06F 9/4881* (2013.01); *G06F 11/2205* (2013.01); *G06F 11/25* (2013.01); *G06F 11/263* (2013.01); *G06F 30/20* (2020.01); *G06F 30/331* (2020.01); *G06F 30/3323* (2020.01); *G06F 30/39* (2020.01); *G06T 11/206* (2013.01)

(56) References Cited

U.S. PATENT DOCUMENTS

| | | | | |
|---|---|---|---|---|
| 6,182,247 B1 * | 1/2001 | Herrmann | G01R 31/3177 | 702/117 |
| 6,247,147 B1 * | 6/2001 | Beenstra | G01R 31/3177 | 714/39 |
| 6,308,305 B1 * | 10/2001 | Sugiyama | G06F 17/5031 | 716/113 |
| 6,415,408 B1 | 7/2002 | Rhodes | | |
| 6,415,409 B1 | 7/2002 | Rhodes | | |
| 6,460,148 B2 * | 10/2002 | Veenstra | G01R 31/3177 | 703/16 |
| 6,480,981 B1 | 11/2002 | Rhodes | | |
| 6,490,711 B2 * | 12/2002 | Buckley, Jr. | G06F 17/5022 | 716/102 |
| 6,530,073 B2 * | 3/2003 | Morgan | G06F 17/5045 | 716/102 |
| 6,532,561 B1 * | 3/2003 | Turnquist | G01R 31/31922 | 714/738 |
| 6,571,365 B1 | 5/2003 | Rhodes | | |
| 6,587,995 B1 * | 7/2003 | Duboc | G06F 11/261 | 703/16 |
| 6,593,940 B1 * | 7/2003 | Petersen | G06F 11/3636 | 714/38.1 |
| 6,629,282 B1 * | 9/2003 | Sugamori | G01R 31/31905 | 324/750.22 |
| 6,687,710 B1 * | 2/2004 | Dey | G06F 17/5045 | 705/36 R |
| 6,701,474 B2 * | 3/2004 | Cooke | G01R 31/318342 | 714/724 |
| 6,704,889 B2 * | 3/2004 | Veenstra | G01R 31/3177 | 703/16 |
| 6,889,348 B2 * | 5/2005 | Sato | G01R 31/31813 | 324/762.01 |
| 6,970,875 B1 * | 11/2005 | Dey | G06F 8/36 | 707/948 |
| 6,978,410 B1 * | 12/2005 | Parnas | G01R 31/3183 | 714/724 |
| 7,178,115 B2 * | 2/2007 | Rajsuman | G01R 31/318314 | 716/106 |
| 7,281,185 B2 * | 10/2007 | Maoz | G01R 31/31835 | 714/738 |
| 7,290,072 B2 * | 10/2007 | Quraishi | G07F 17/3202 | 463/22 |
| 7,313,772 B2 * | 12/2007 | Hekmatpour | G06F 17/504 | 716/106 |
| 7,392,171 B2 * | 6/2008 | Blasi | G06F 17/5022 | 702/117 |
| 7,426,668 B2 * | 9/2008 | Mukherjee | G01R 31/31724 | 365/201 |
| 7,428,680 B2 * | 9/2008 | Mukherjee | G01R 31/31724 | 714/718 |
| 7,434,131 B2 * | 10/2008 | Mukherjee | G01R 31/31724 | 714/718 |
| 7,460,988 B2 * | 12/2008 | Higashi | G01R 31/318307 | 703/13 |
| 7,478,371 B1 * | 1/2009 | Gove | G06F 11/3461 | 717/128 |
| 7,490,307 B2 * | 2/2009 | Fomaciari | G06F 17/5031 | 716/103 |
| 7,533,309 B2 * | 5/2009 | Mukherjee | G11C 29/10 | 365/201 |
| 7,539,900 B1 * | 5/2009 | Plofsky | G01R 31/31705 | 714/30 |
| 7,577,928 B2 * | 8/2009 | Lindberg | G06F 17/5031 | 716/106 |
| 7,613,599 B2 * | 11/2009 | Bade | G06F 17/5022 | 703/14 |
| 7,681,165 B2 * | 3/2010 | Peters | G06F 17/5072 | 716/119 |
| 7,793,248 B1 * | 9/2010 | Van Brink | G06F 17/5045 | 703/13 |
| 7,797,123 B2 * | 9/2010 | De | G06F 17/504 | 702/117 |
| 7,849,425 B1 * | 12/2010 | Hamid | G06F 11/263 | 716/136 |
| 7,865,853 B2 * | 1/2011 | Hekmatpour | G06F 17/504 | 716/100 |
| 7,885,802 B2 * | 2/2011 | Calvez | G06F 17/5022 | 703/14 |
| 7,900,181 B2 * | 3/2011 | Hekmatpour | G06F 17/504 | 716/104 |
| 7,908,576 B2 * | 3/2011 | Huang | G06F 17/5027 | 716/106 |
| 8,042,011 B2 * | 10/2011 | Nicolaidis | G11C 29/56 | 365/201 |
| 8,051,402 B2 * | 11/2011 | Snell | G06F 17/5022 | 716/106 |
| 8,176,450 B1 * | 5/2012 | Van Brink | G06F 17/5045 | 703/14 |
| 8,347,294 B2 * | 1/2013 | Patanella | G06F 9/5038 | 709/206 |
| 8,397,188 B1 * | 3/2013 | Scheidt | G06F 17/5022 | 703/16 |
| 8,427,502 B2 * | 4/2013 | Choudhary | G06F 17/5045 | 345/619 |
| 8,560,893 B1 | 10/2013 | Hollander et al. | | |
| 8,561,041 B1 * | 10/2013 | Kuznicki | G06F 9/4425 | 717/149 |
| 8,776,093 B2 * | 7/2014 | Lupu | G06F 11/366 | 714/38.11 |
| 8,799,174 B1 * | 8/2014 | Mitchell | G06Q 10/06 | 705/301 |
| 8,799,864 B2 * | 8/2014 | Chen | G06F 17/5022 | 717/106 |
| 8,832,615 B2 * | 9/2014 | Hsieh | G06F 17/5009 | 716/106 |
| 8,843,863 B2 * | 9/2014 | Kobayashi | G06F 17/5036 | 716/102 |
| 8,904,325 B2 * | 12/2014 | Balance | 716/103 | |
| 9,009,635 B1 * | 4/2015 | O'Riordan | G06F 17/5022 | 716/106 |
| 9,316,689 B2 * | 4/2016 | Hamid | G01R 31/3177 | |
| 9,619,593 B1 * | 4/2017 | Aldrich | G06F 30/20 | |
| 9,628,095 B1 * | 4/2017 | Liveris | H03L 7/18 | |
| 9,651,619 B2 * | 5/2017 | Hamid | G06F 30/331 | |
| 10,107,859 B1 * | 10/2018 | Saxena | G01R 31/31858 | |
| 10,698,805 B1 * | 6/2020 | Ovadia | G06F 11/3684 | |
| 2001/0037447 A1 * | 11/2001 | Mukherjee | G06F 11/1405 | 712/239 |
| 2003/0101436 A1 * | 5/2003 | Kobrosly | G06F 8/41 | 717/128 |

(56) References Cited

U.S. PATENT DOCUMENTS

| | | | |
|---|---|---|---|
| 2003/0135832 A1* | 7/2003 | Buckley, Jr. | G06F 17/5022 716/106 |
| 2003/0145290 A1* | 7/2003 | Devins | G01R 31/318314 716/106 |
| 2003/0149946 A1* | 8/2003 | Devins | G06F 17/5022 716/106 |
| 2004/0210831 A1* | 10/2004 | Feng | G06F 17/5009 715/211 |
| 2004/0243339 A1* | 12/2004 | Maruyama | G01R 31/318307 702/124 |
| 2005/0149804 A1* | 7/2005 | Hiraide | G01R 31/31813 714/738 |
| 2006/0010428 A1* | 1/2006 | Rushby | G06F 11/3684 717/124 |
| 2006/0041808 A1* | 2/2006 | Yamamura | G01R 31/318307 714/738 |
| 2006/0150126 A1 | 7/2006 | Kamannavar et al. | |
| 2006/0229854 A1* | 10/2006 | Grichnik | G06F 30/20 703/2 |
| 2006/0229861 A1* | 10/2006 | Tatsuoka | G06F 9/52 703/21 |
| 2006/0248401 A1* | 11/2006 | Carroll | G06F 11/3664 714/38.1 |
| 2008/0028370 A1* | 1/2008 | Lewallen | G06F 11/323 717/128 |
| 2008/0115027 A1* | 5/2008 | Geller | G06F 11/263 714/738 |
| 2008/0115028 A1* | 5/2008 | Homer | G01R 31/31704 714/741 |
| 2008/0189094 A1 | 8/2008 | Adir et al. | |
| 2009/0013334 A1* | 1/2009 | Kobylinski | G06F 11/079 719/318 |
| 2009/0112548 A1* | 4/2009 | Conner | G01R 31/31917 703/13 |
| 2009/0144594 A1 | 6/2009 | Chakraborty | |
| 2009/0307654 A1* | 12/2009 | Ishikawa | G06F 8/20 717/106 |
| 2010/0017656 A1* | 1/2010 | Park | G06F 11/261 714/27 |
| 2010/0180245 A1* | 7/2010 | Rutten | G06F 11/323 716/113 |
| 2012/0221283 A1* | 8/2012 | Lee | G06F 11/3676 702/119 |
| 2012/0254888 A1* | 10/2012 | Kalogeropulos | G06F 8/452 718/107 |
| 2013/0055023 A1* | 2/2013 | Chong | G06F 11/366 714/30 |
| 2013/0227367 A1* | 8/2013 | Czamara | G01R 31/3177 714/735 |
| 2014/0282315 A1* | 9/2014 | Wakefield | G06F 17/504 716/106 |
| 2015/0301108 A1* | 10/2015 | Hamid | G06T 11/206 714/724 |
| 2015/0302126 A1* | 10/2015 | Hamid | G01R 31/3177 716/136 |
| 2016/0012167 A1* | 1/2016 | Jain | G06F 11/323 716/107 |
| 2019/0251219 A1* | 8/2019 | Behrend | G06F 30/3323 |
| 2020/0042362 A1* | 2/2020 | Cui | G06F 9/5027 |

OTHER PUBLICATIONS

"Close Your Coverage Loop with Grpah-Based scenario Models") pp. 1-14 (Further supplemented by audio presentation of Grobe (https://www.youtube.com/watch?v=6ZDk-bUrLLQ) time marker 8:14-8:26 specifically (also published Dec. 18, 2012)) Slides 2 pages, Dec. 18, 2012.*

Close Your Coverage Loop with Graph-Based Scenario Models Jörg Große, 14 Pages (Year: 2012).*

Close Your Coverage Loop with Graph-Based Scenario Models Jörg Große—Your tube video, https://www.youtube.com/watch?v=6ZDk-bUrLLQ, Jorg Grobe, Dec. 18, 2012 18:06 minutes. (Year: 2012).*

Joerg Grosse, 2012 Breker Verification Systems, Inc., pp. 1-14.

Anonymous: "Computer hardware—Wikipedia, the free encyclopedia", XP055289759, Retrieved from the internet: URL:https://en.wikipedia.org/wiki/Computer_hardware [retrieved on Nov. 2, 2016].

* cited by examiner

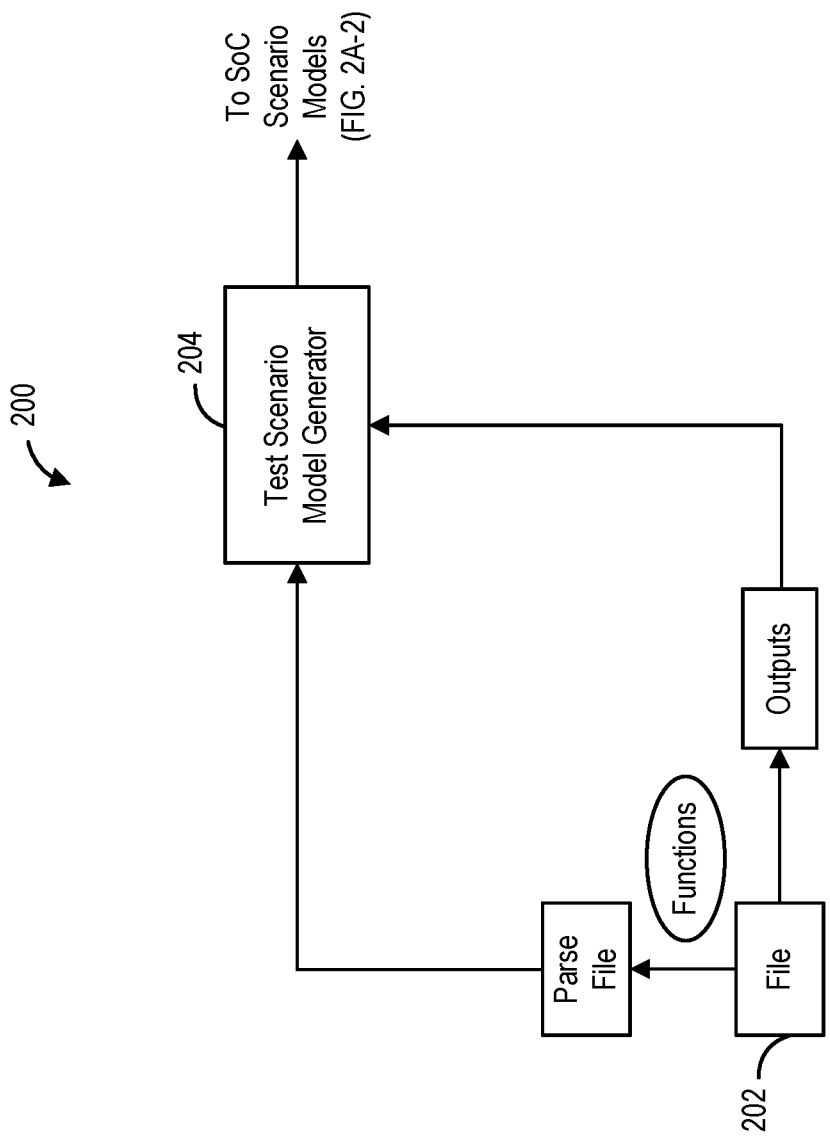

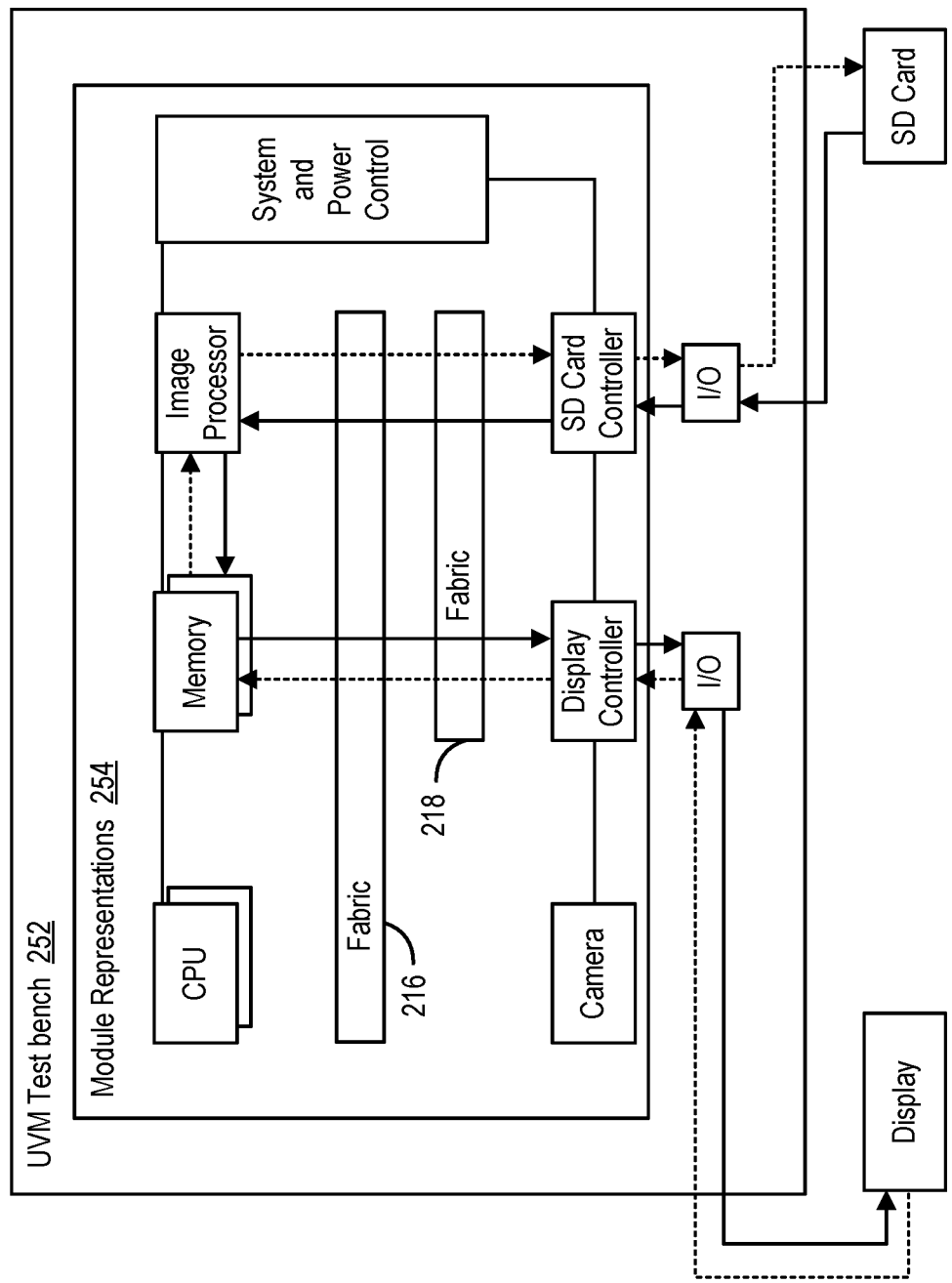
FIG. 2B-2 (Application Scenarios/Data Flow)

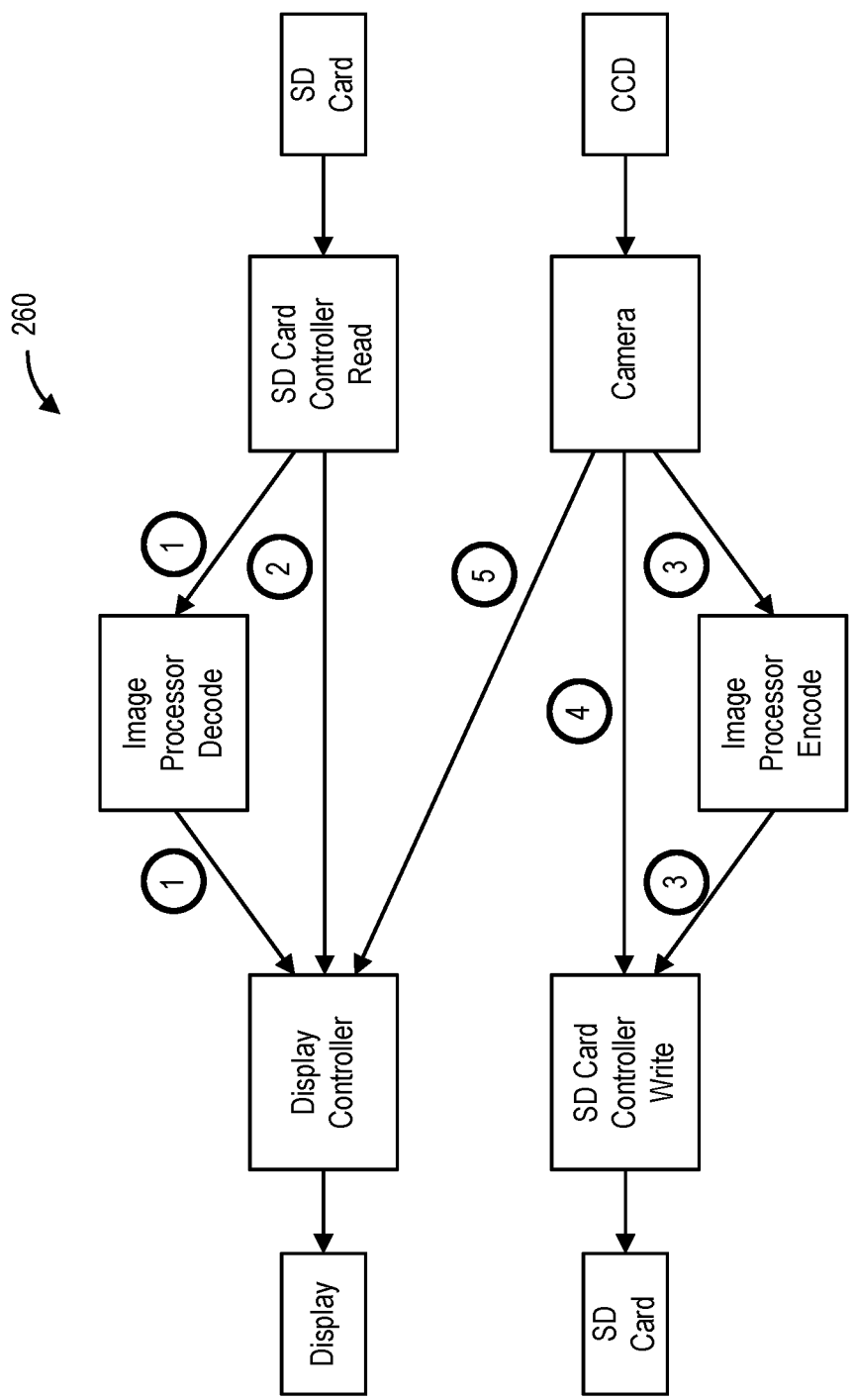
FIG. 2B-3 (Application Scenarios/Data Flow)

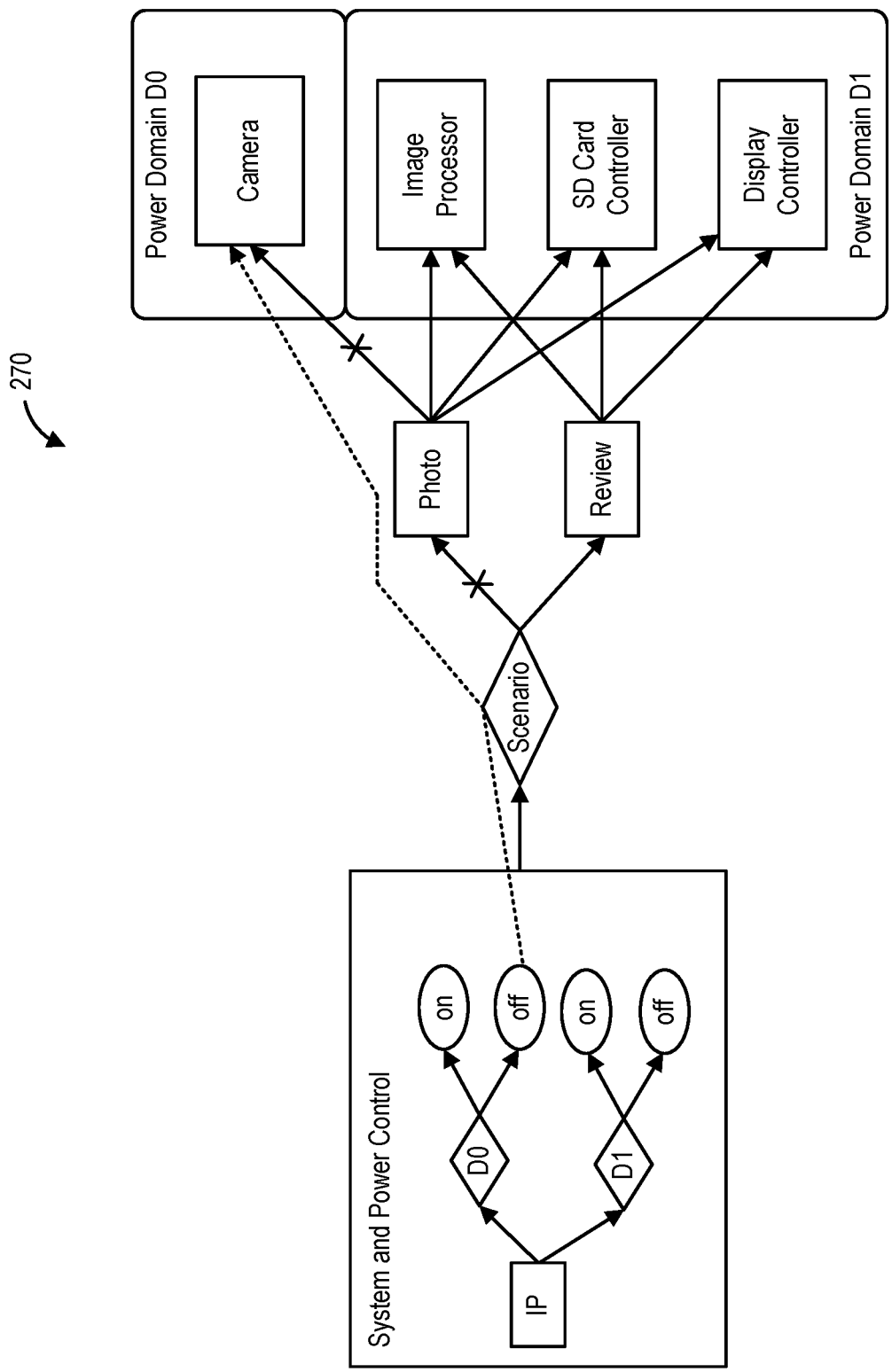
FIG. 2B-4 (System Scenario-Power Management)

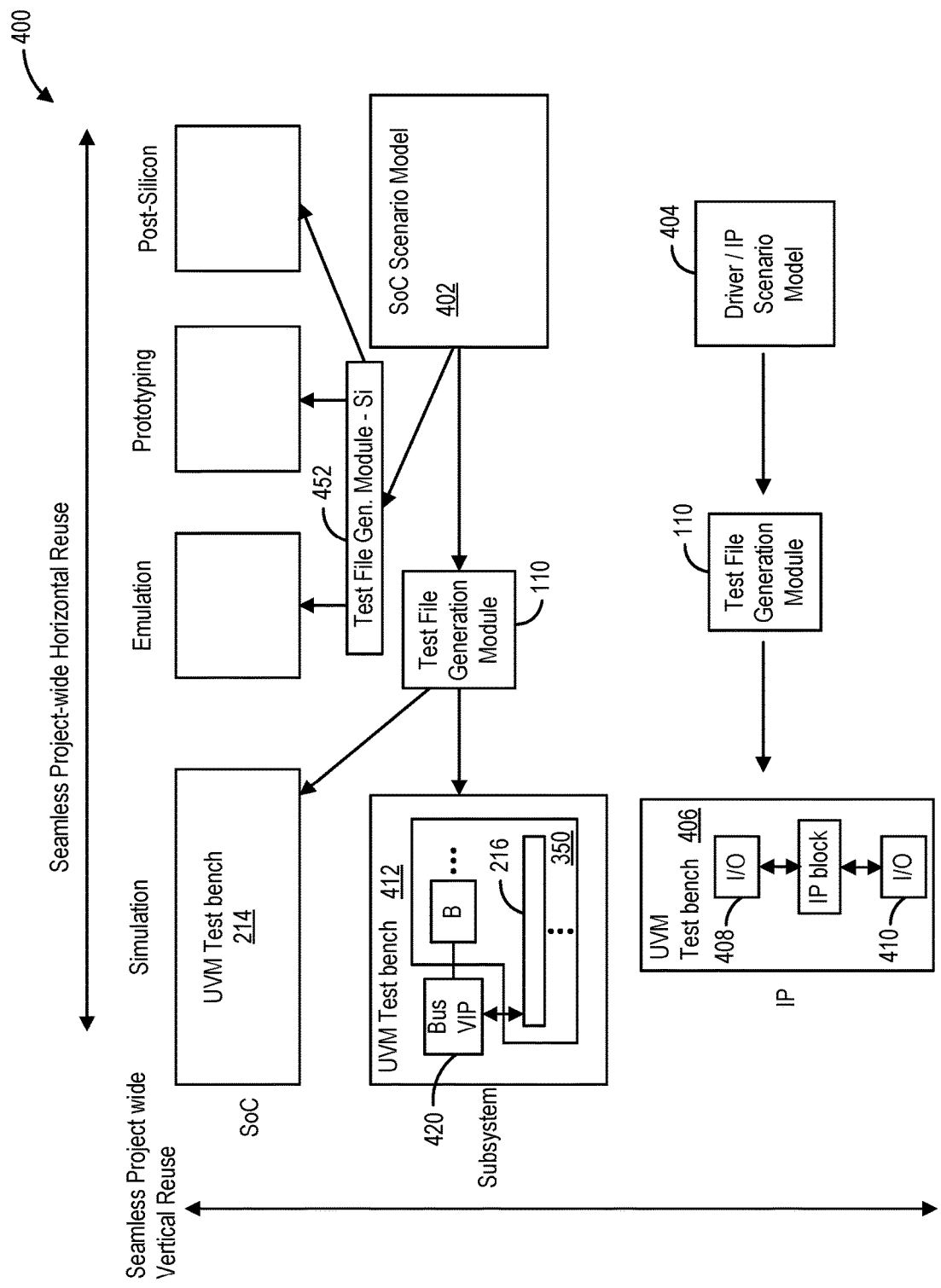
FIG. 4-1 (Flexible re-use of Scenario Model)

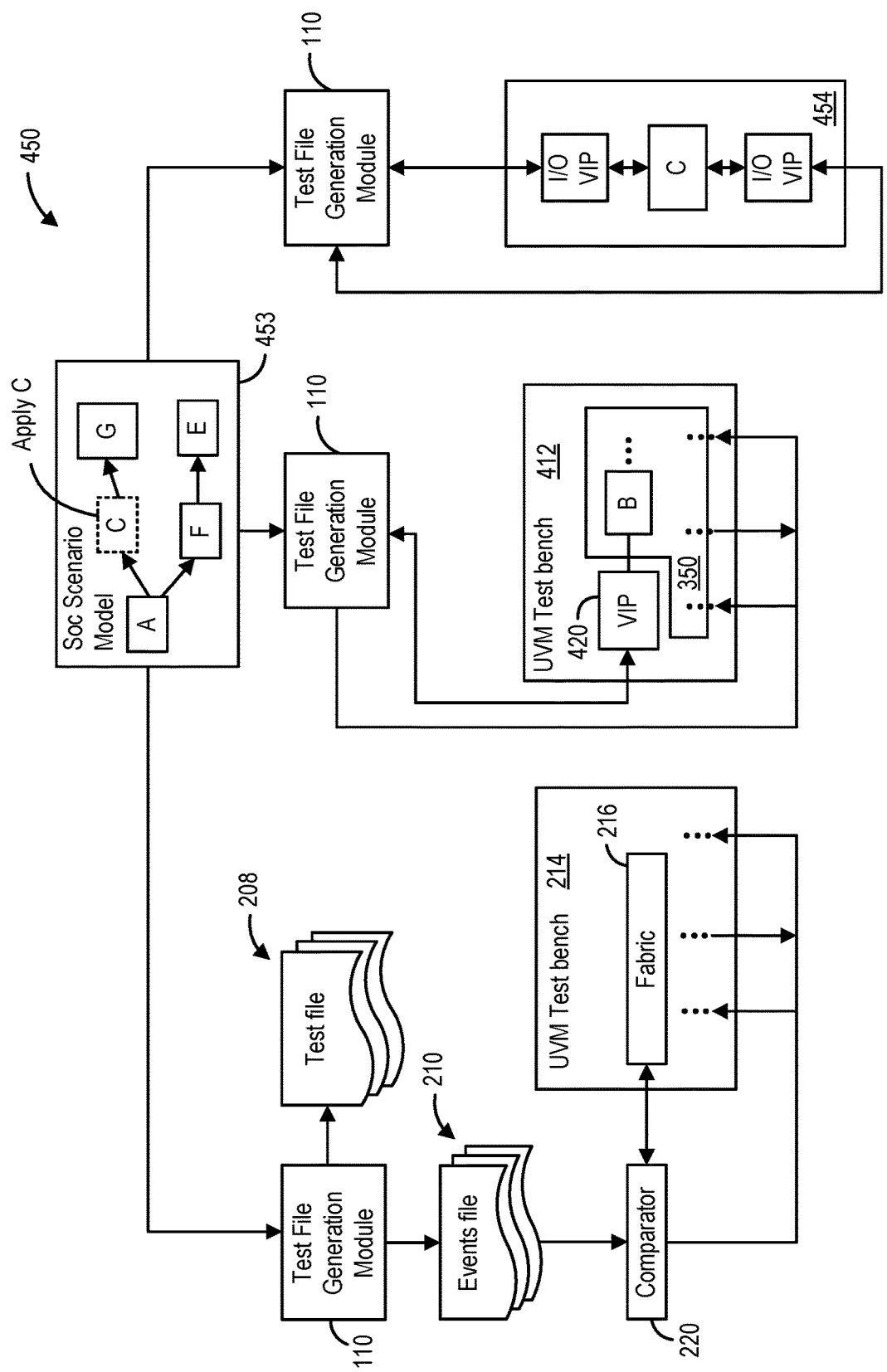
FIG. 4-2 (Multi-level Design Support)

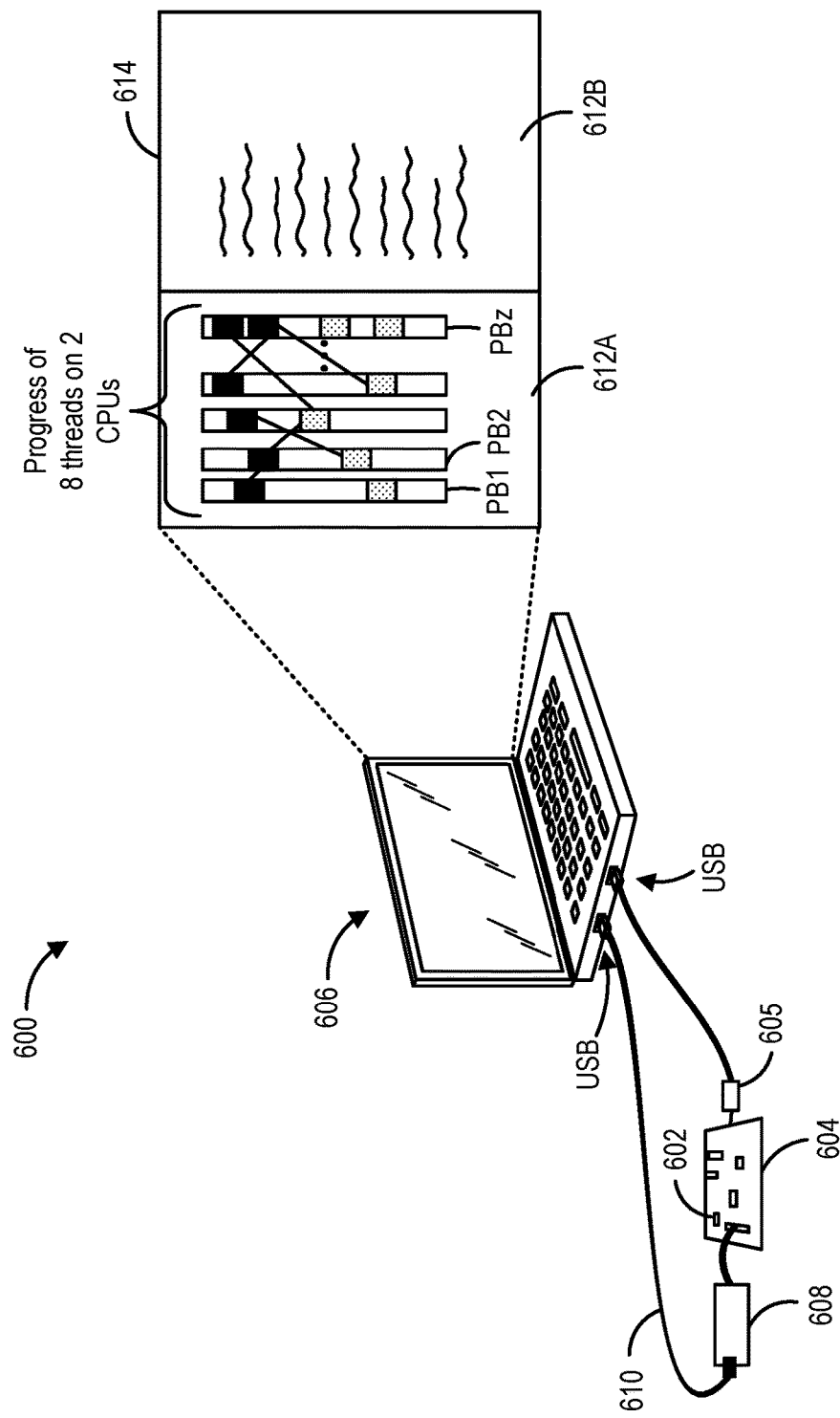
FIG. 6 (post-Si Support)

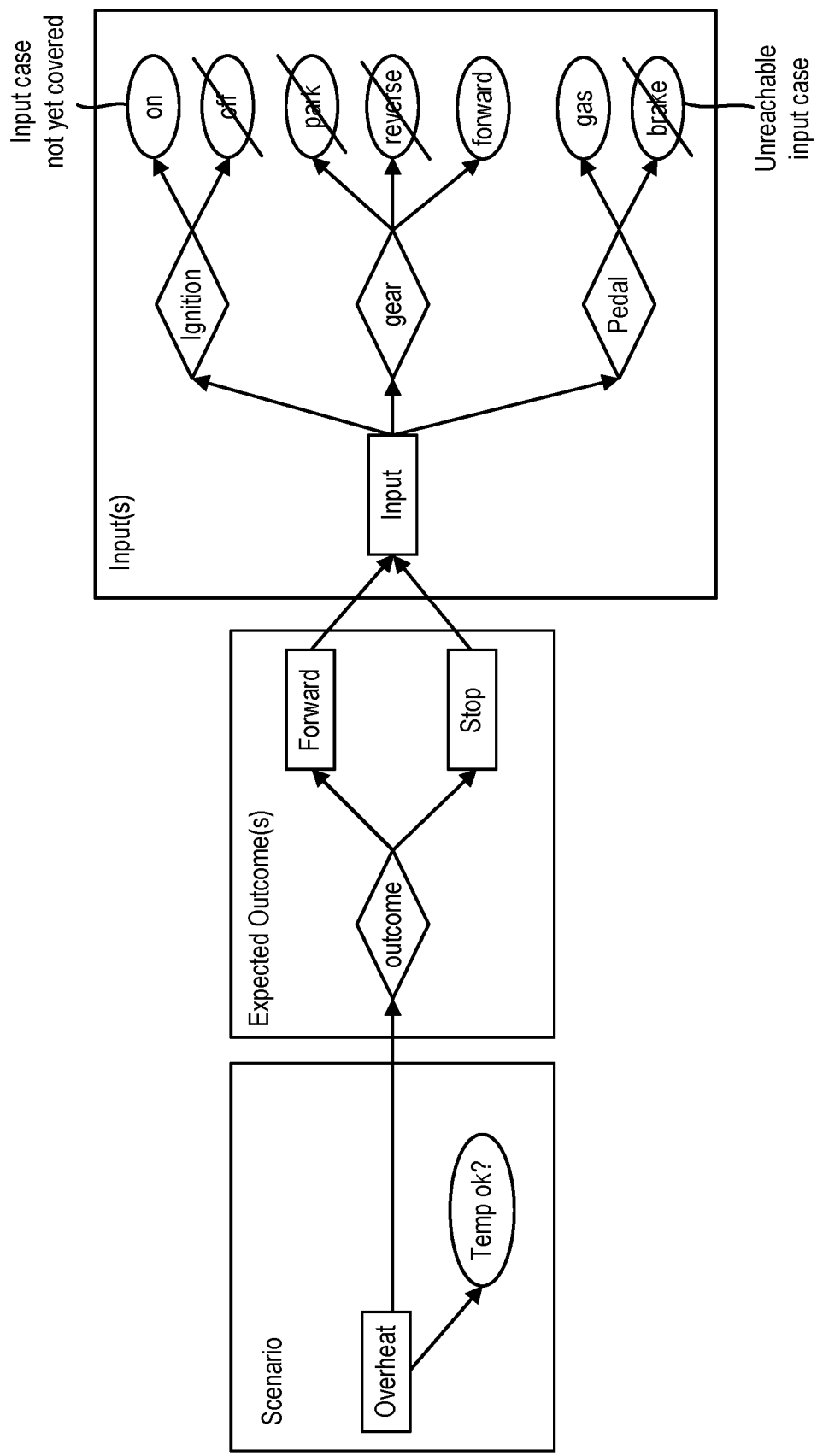
FIG. 7 (Hierarchical Scenario Model)

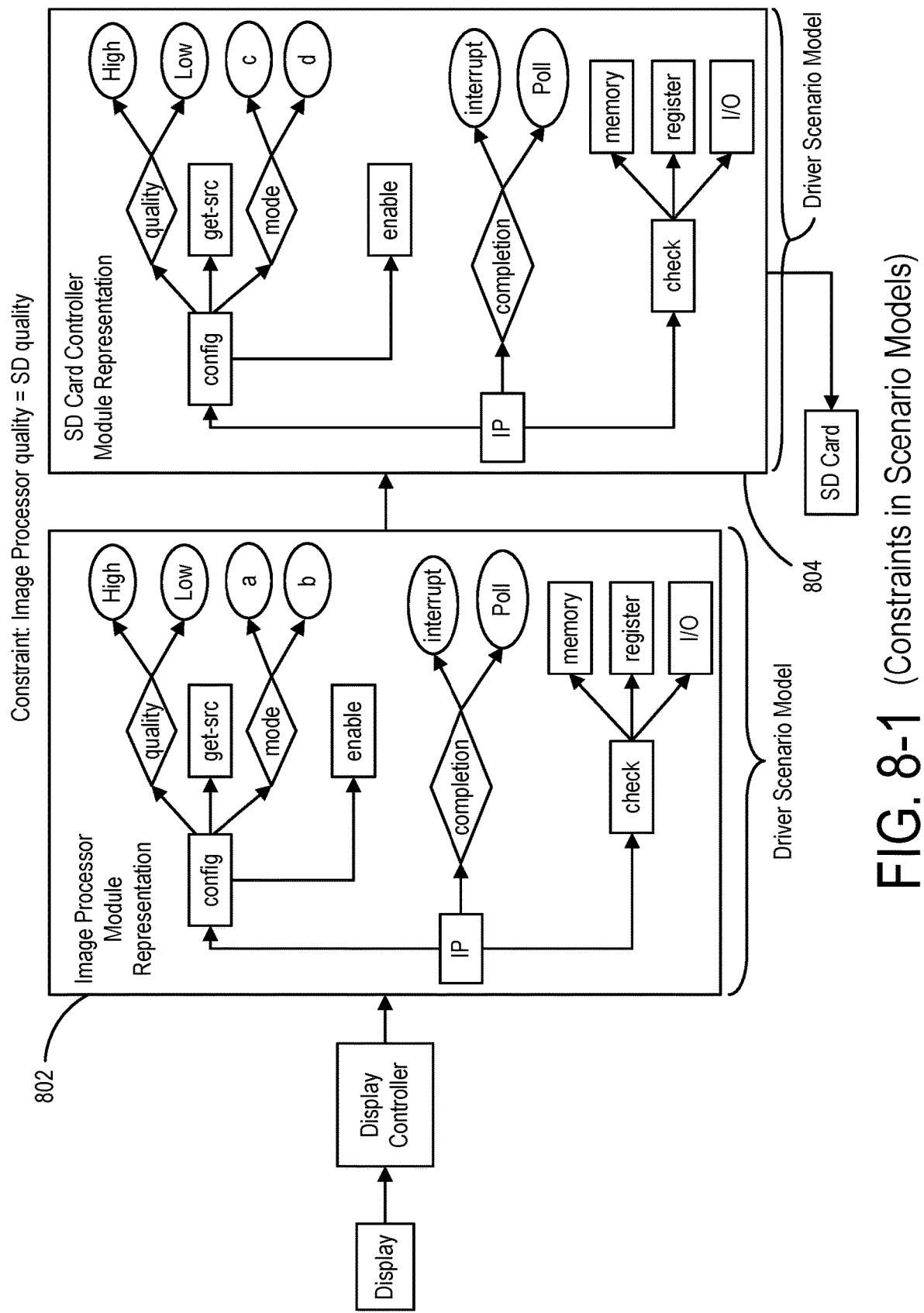
FIG. 8-1 (Constraints in Scenario Models)

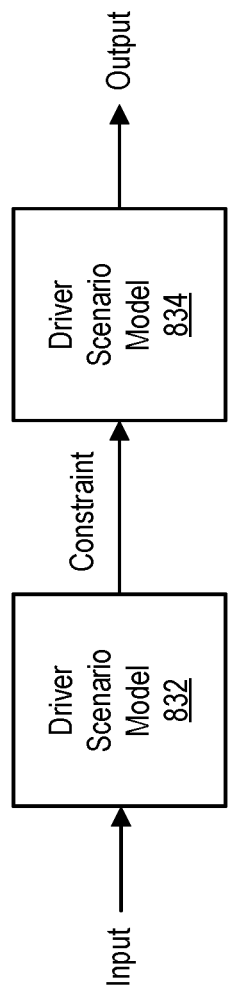
FIG. 8-2 (Constraint-Driver on right cannot drive one on left)

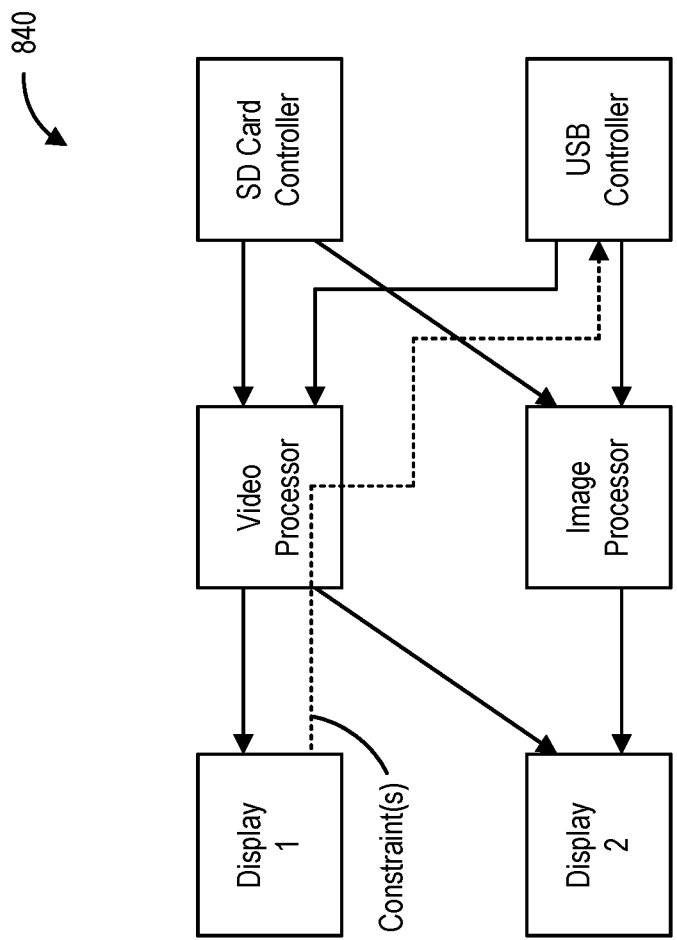
FIG. 8-3 (Use Case Driven Scenario Model)

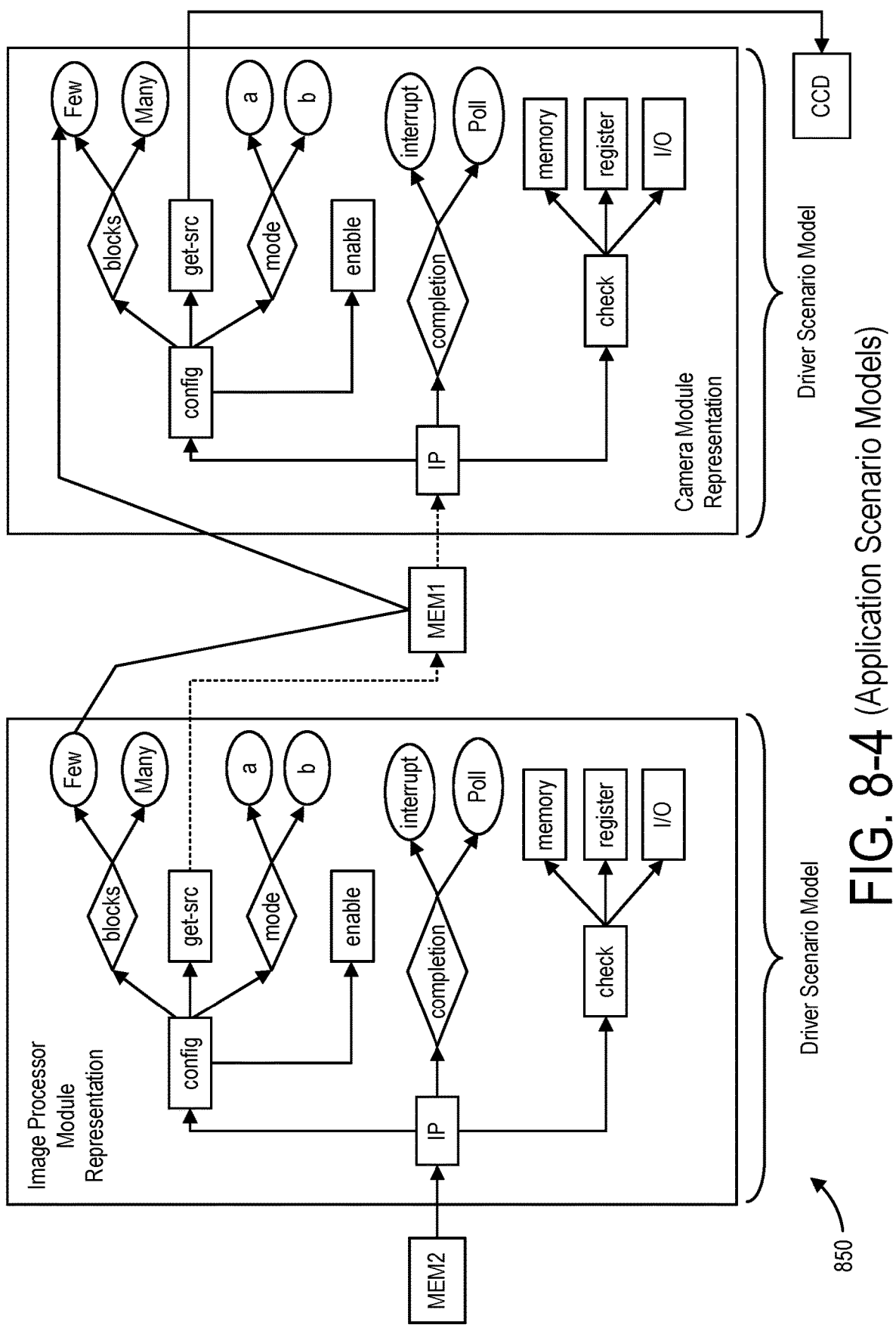
FIG. 8-4 (Application Scenario Models)

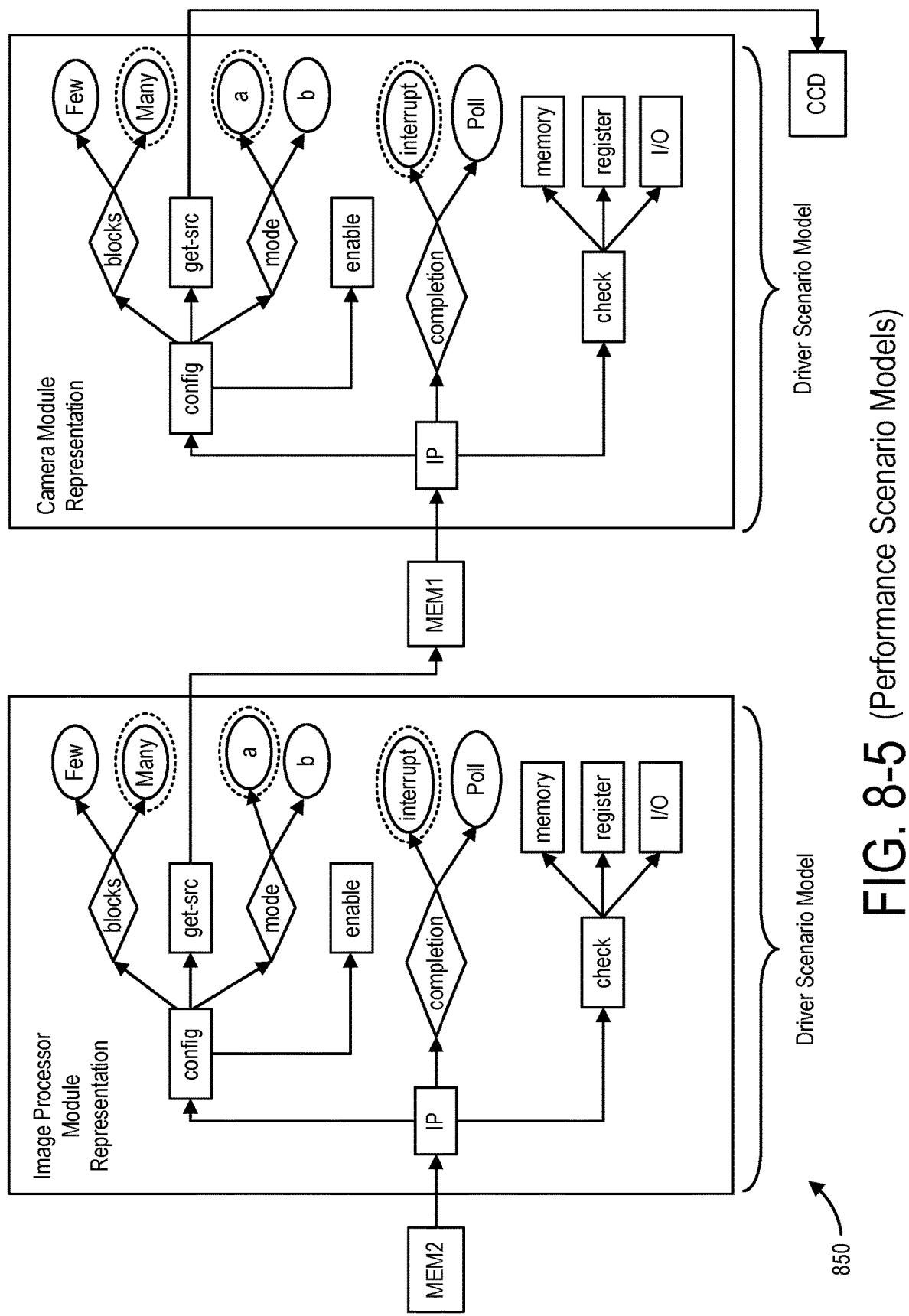
FIG. 8-5 (Performance Scenario Models)

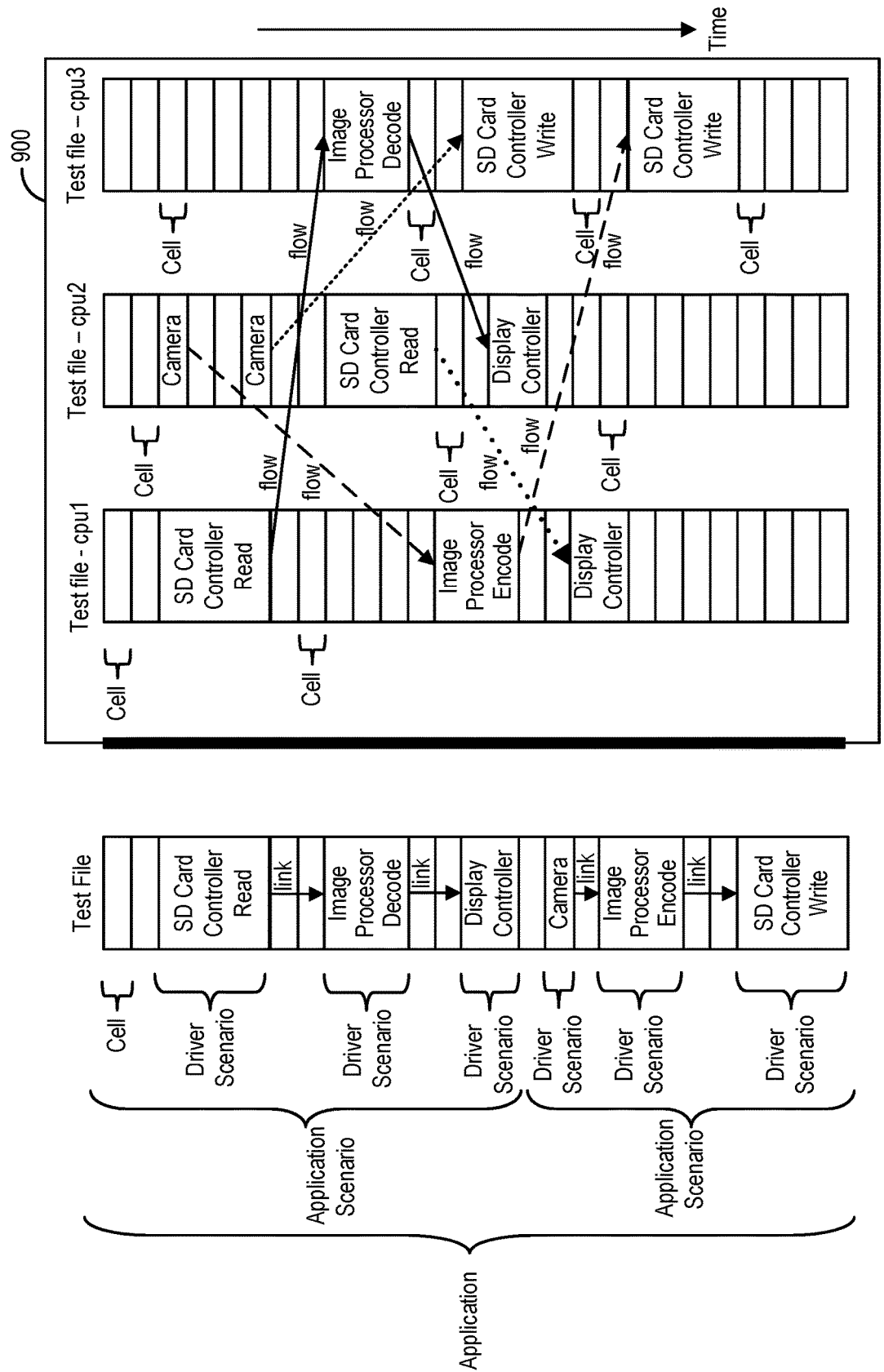
FIG. 9-1 (Generated Test C Case Multi-processor Flow)

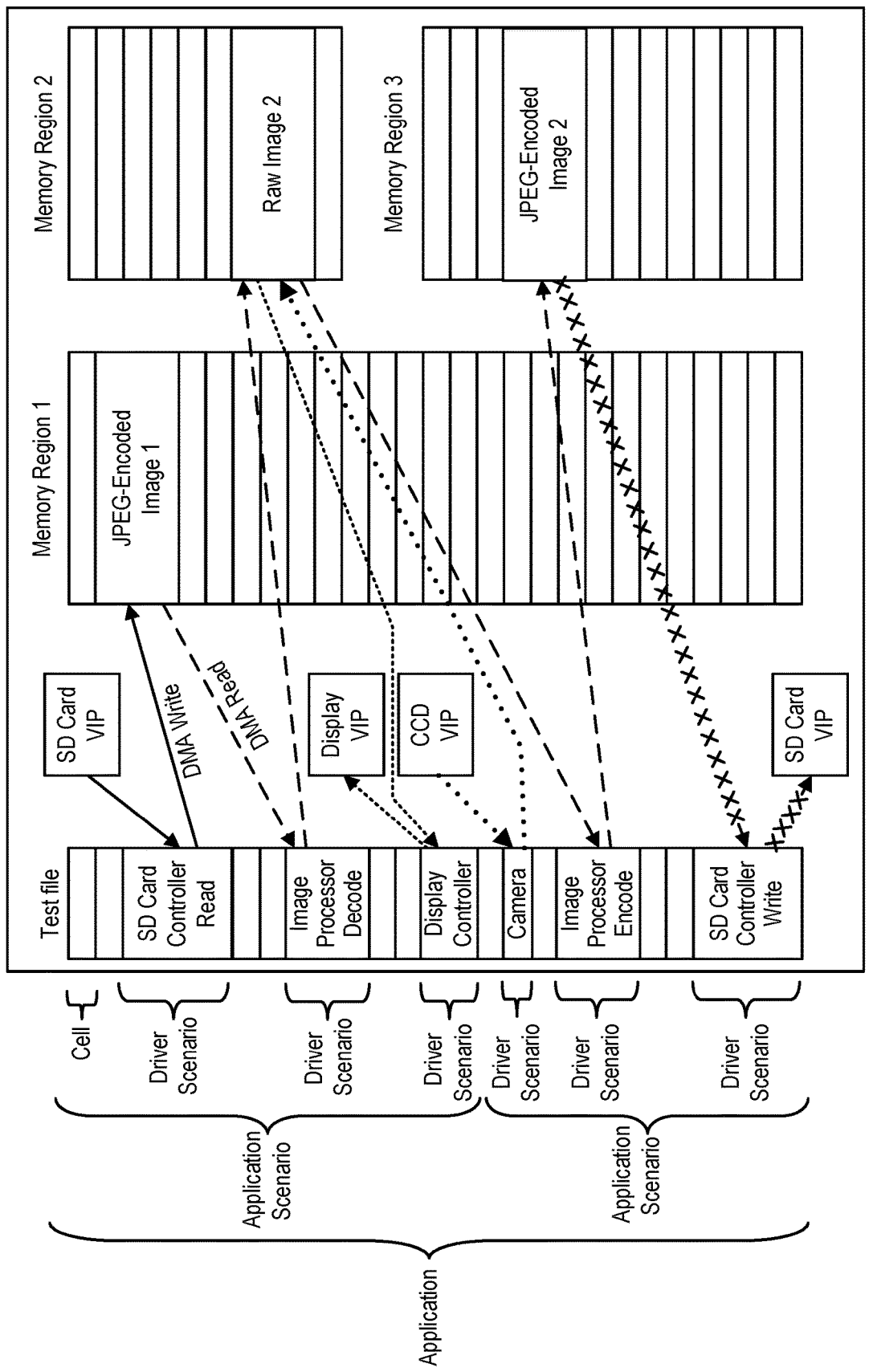
FIG. 9-2 (Generated Test C Case Multi-Memory Allocation)

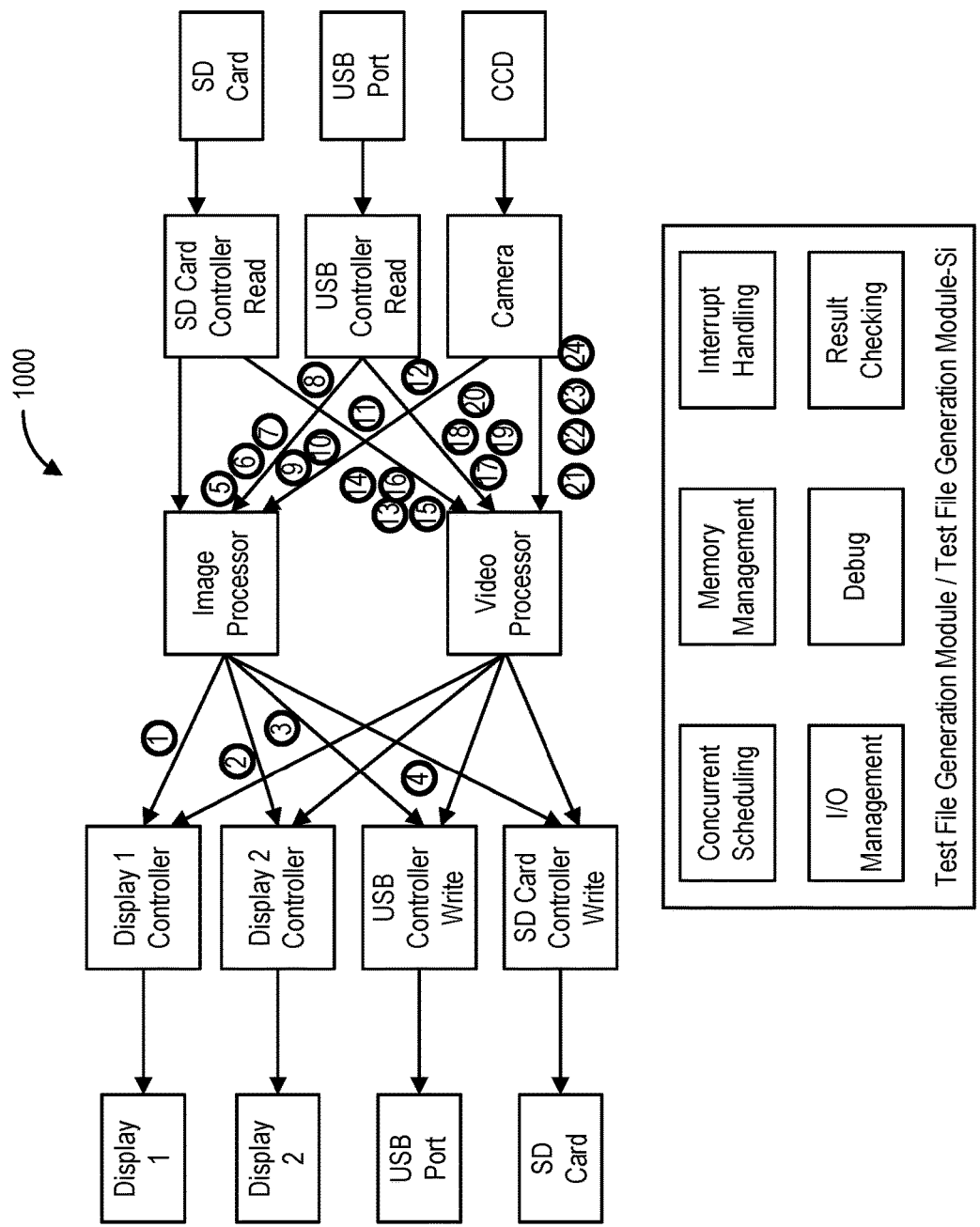
FIG. 10 (Digital Camera with Multiple Parallel Scenarios)

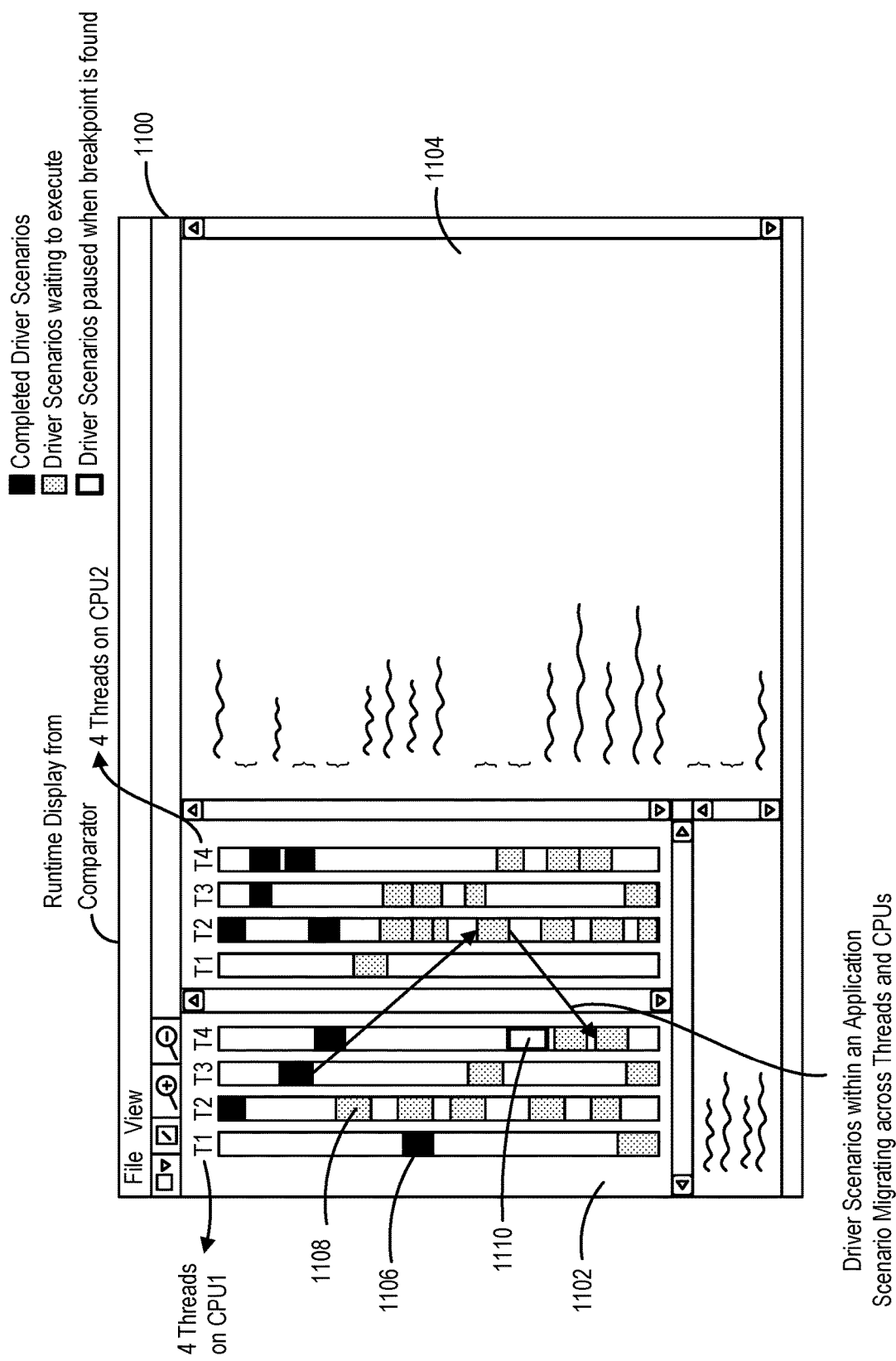
FIG. 11 (Multi-Threaded, Multi-Processor C Test Cases)

```
initial begin
    //structured to match your style of writing tests
    $trek_init ("proj_config.rc");   // Initialize Trek
    fork
        begin
            while ( ! $trek_done() ) begin      // Input Loop
                $trek_get (in_txn, in_wire);    // PLI/DPI to Trek
                my_testbench_send (in_txn);     // testbench task
                @(posedge clk_a );              // input clock domain
            end
        end
        begin
            while ( ! $trek_done() ) begin      // Output Loop
                my_testbench_recv (out_txn);    // testbench task
                $trek_check (out_txn, out_wire); // PLI/DPI to Trek
                @(posedge clk_b );              // output clock domain
            end
        end
    join
end
```

FIG. 12 (Simple Integration to Test bench)

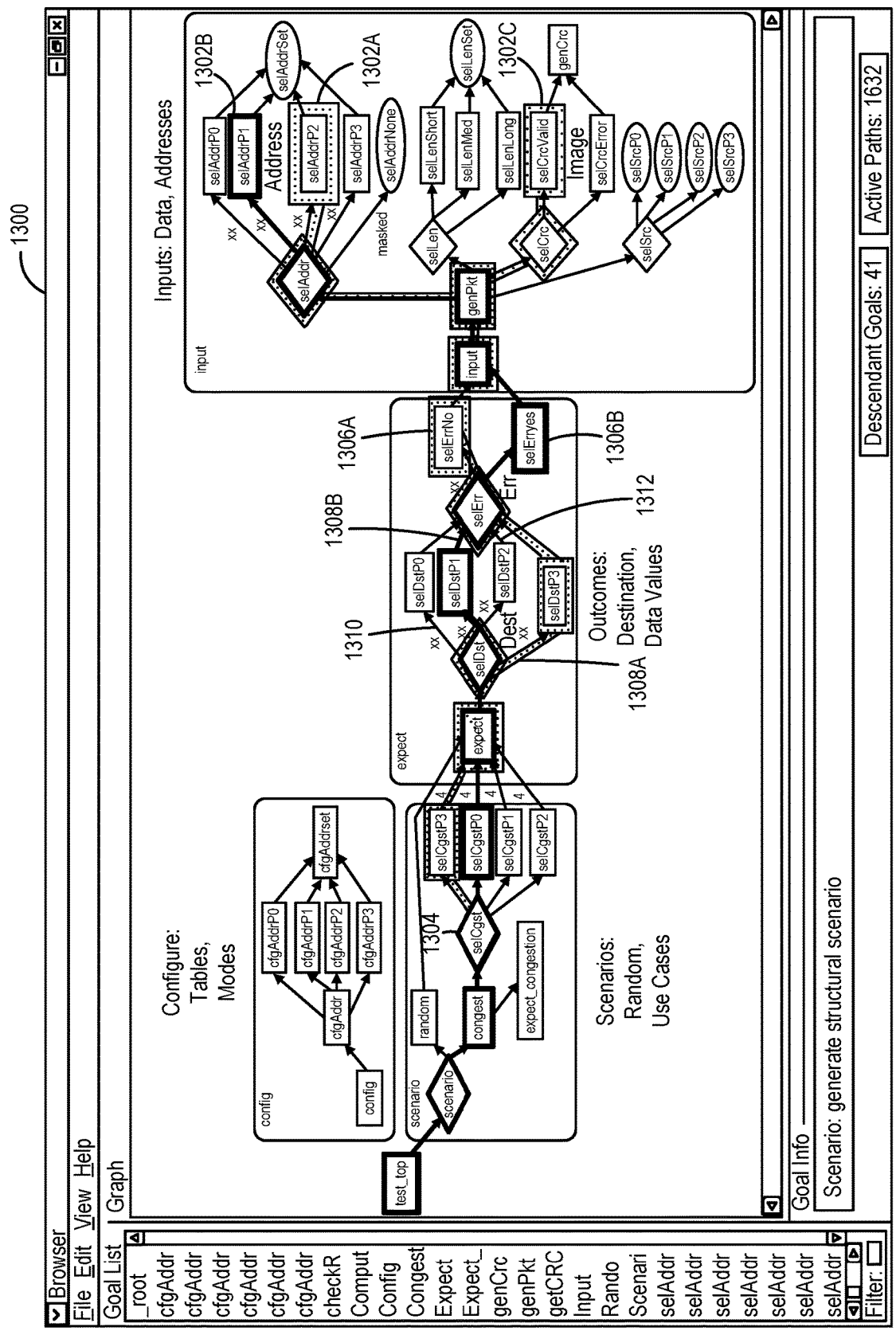
FIG. 13 (Visualize Verification Space)

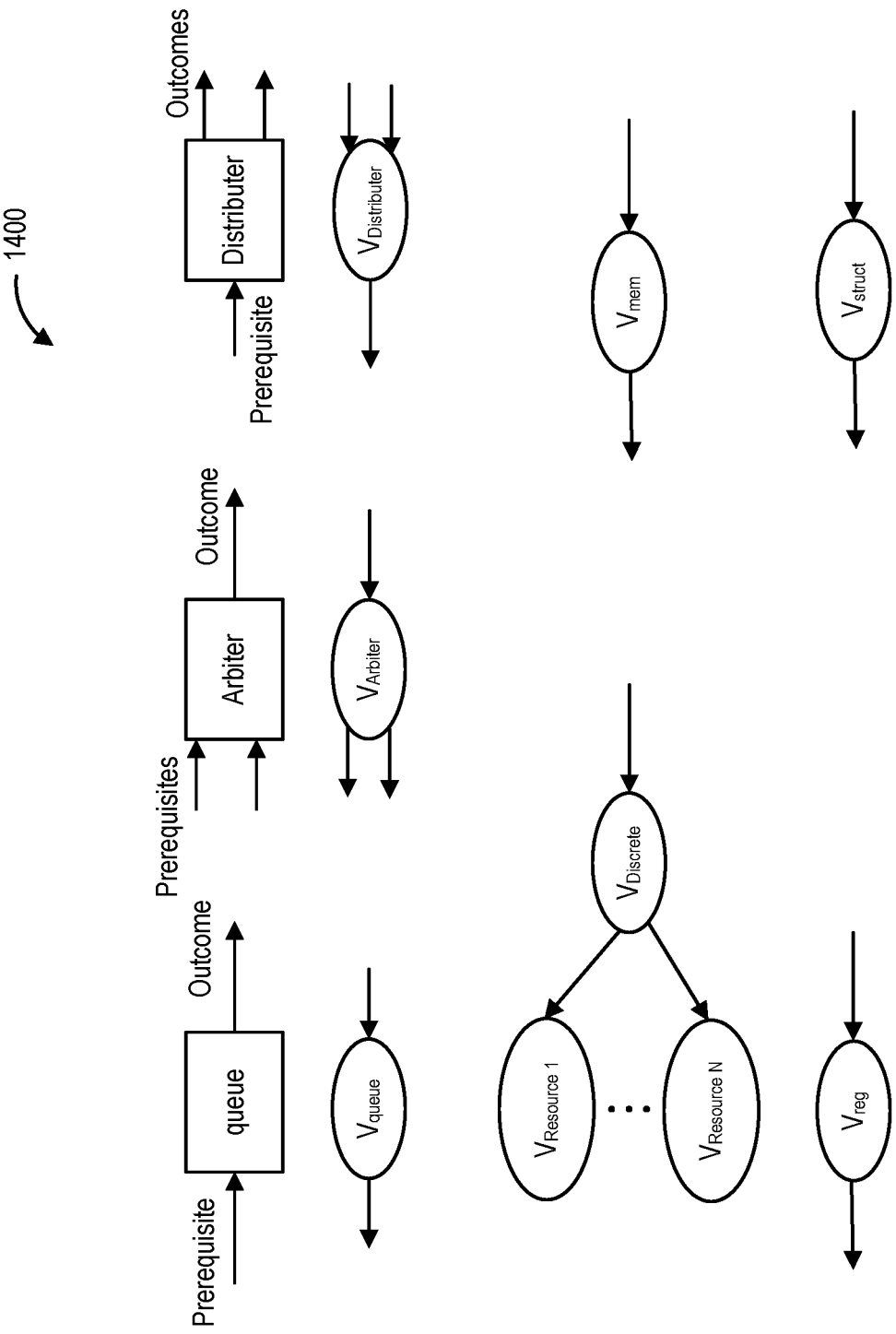
FIG. 14A (Data Flow Building Blocks)

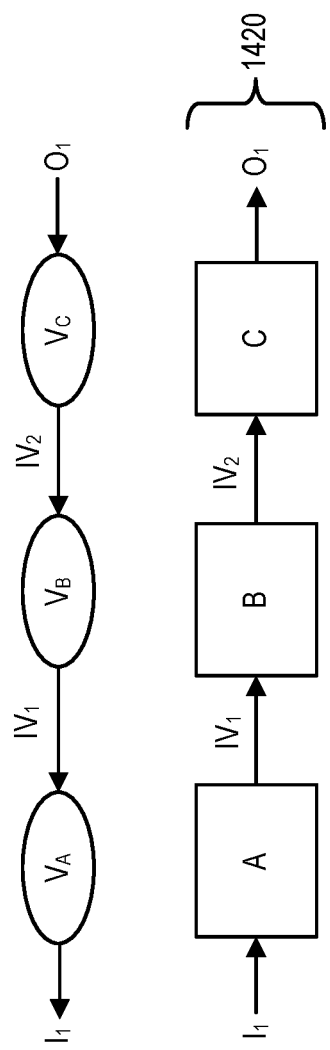
FIG. 14B (Pipeline Scenario Model)

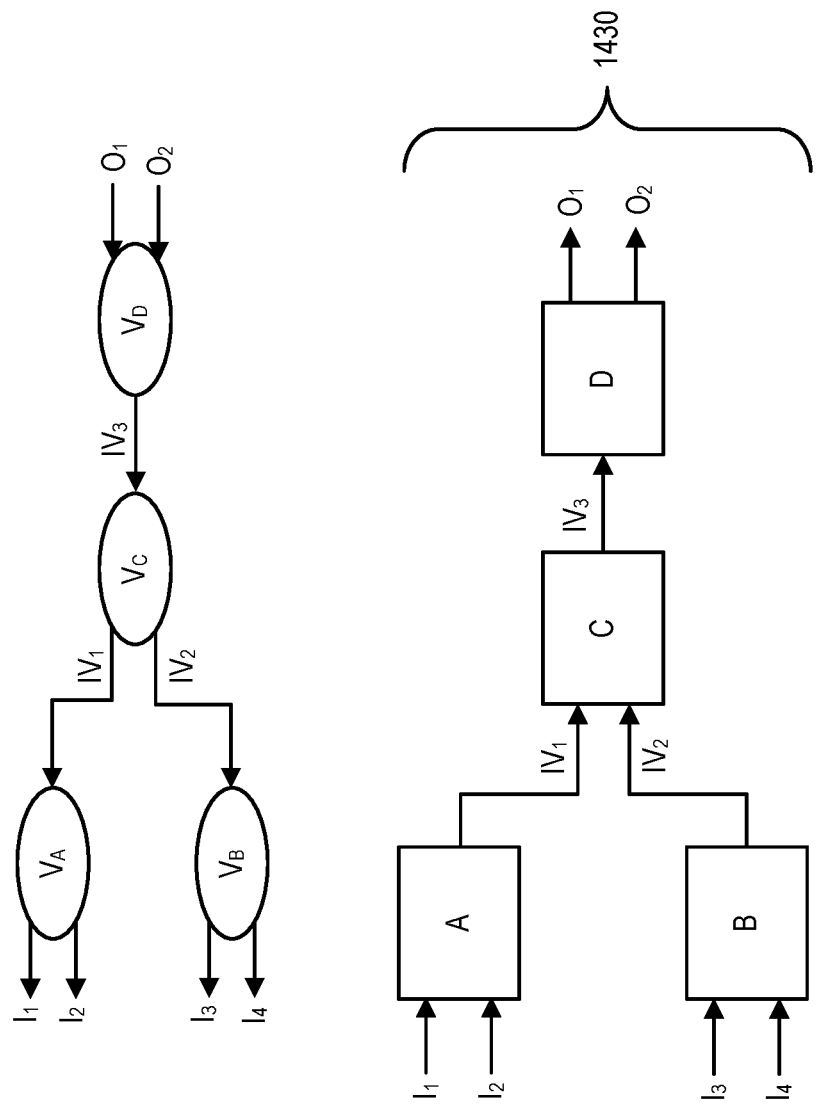
FIG. 14C (Switch Scenario Model)

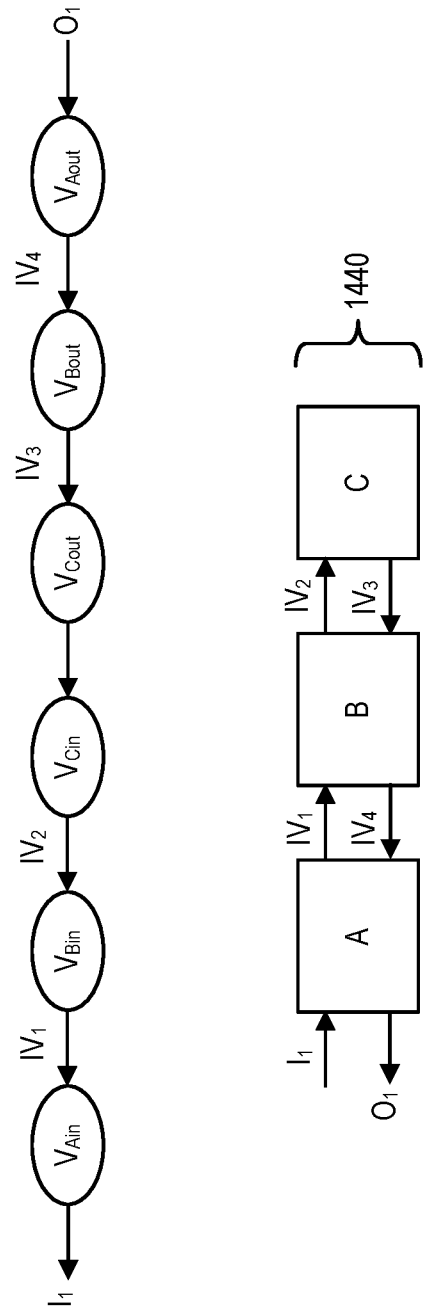
FIG. 14D (Separate Ingress & Egress Paths)

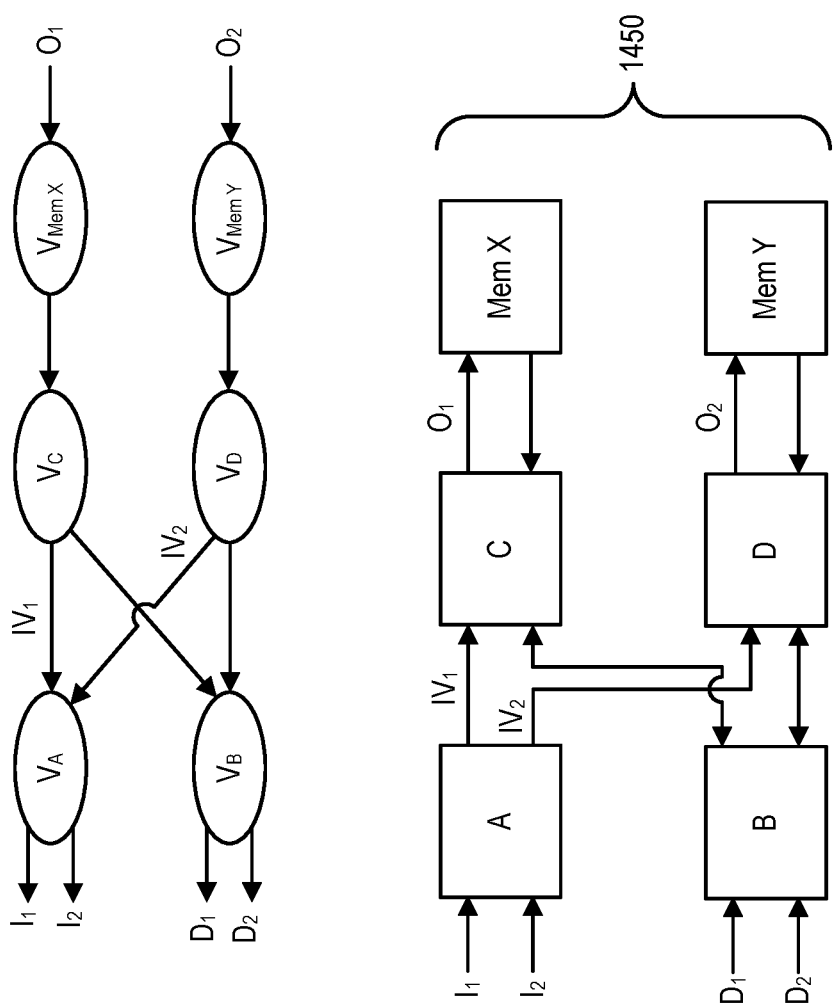
FIG. 14E-1 (Write)

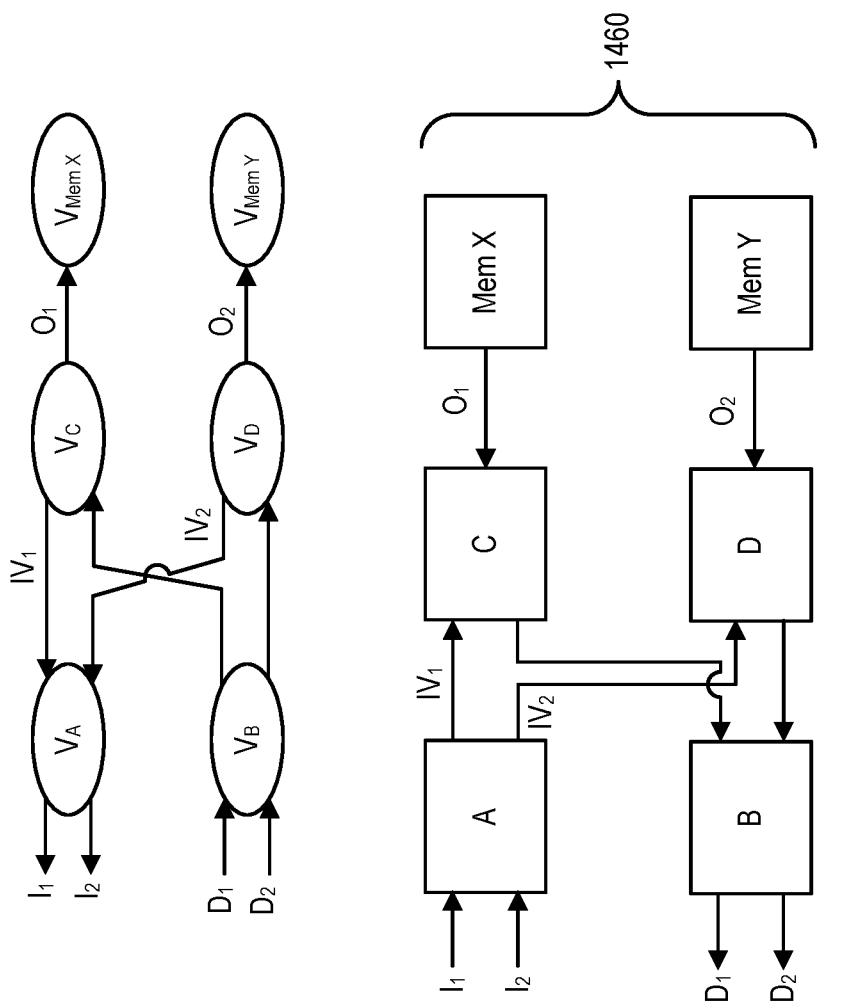
FIG. 14E-2 (Read)

DISPLAY IN A GRAPHICAL FORMAT OF TEST RESULTS GENERATED USING SCENARIO MODELS

CLAIM OF PRIORITY

This application is a continuation of and claims the benefit of and priority, under 35 U.S.C. 120, to U.S. patent application Ser. No. 14/689,687, filed on Apr. 17, 2015, and titled "DISPLAY IN A GRAPHICAL FORMAT OF TEST RESULTS GENERATED USING SCENARIO MODELS", which claims the benefit of and priority, under 35 U.S.C. 119§ (e), to U.S. Provisional Patent Application No. 61/981, 711, filed on Apr. 18, 2014, and titled "Graphics Based SOC Design Tool", both of which are hereby incorporated by reference in their entirety.

FIELD

The present embodiments relate to testing a system-on-a-chip with portable scenario models and at different horizontal and vertical levels.

BACKGROUND

A system-on-a-chip (SoC) integrates all components of a computer or another electronic system on a chip. The SoC includes software and hardware. The SoC is used with other SoCs to develop a system for performing a number of functions, e.g., printing, receiving data, sending data, receiving phone calls, playing virtual games, etc.

Hardware blocks of SoCs are designed using a software tool, e.g., a computer-aided design (CAD) tool. Also, software drivers that control the hardware blocks are integrated within the design. The SoCs are verified for operation before being sent to a foundry. The verification is performed using one or more languages, e.g., SystemVerilog, SystemC, and OpenVera. Any bugs found while verifying the SoC may be corrected.

However, the verification of operations of the SoC may be performed during a later stage of development of the SoC. Traditionally, engineers have employed simulation acceleration, emulation and/or a field programmable gate array (FPGA) prototype to verify and debug both hardware and software for SoC designs prior to tapeout. However, the acceleration, emulation, and prototyping consume a large amount of time to create. This large amount of time increases time-to-market and reduces financial revenues.

It is in this context that embodiments described in the present disclosure arise.

SUMMARY

Embodiments of the disclosure provide apparatus, methods and computer programs for testing a system-on-a-chip (SoC) with portable scenario models and at different horizontal and vertical levels. It should be appreciated that the present embodiments can be implemented in numerous ways, e.g., a process, an apparatus, a system, a device, or a method on a computer-readable medium. Several embodiments are described below.

Some engineers have verified designs using multiple efforts and tools. For example, the engineers create tests that apply a constrained random input stimulus. A separate checker is also developed to see if a design under test (DUT) behaves correctly. Also, a coverage model is created to measure if all aspects of the DUT are tested by the random input stimulus. This strategy has two draw backs. First, three different efforts are made, one to develop the random input stimulus, another to create the checker, and another to create the coverage model. Second, the random input stimulus may not exercise all functions of interest to test the DUT.

Moreover, as designs increase in complexity, a large amount of design functions are not exercised using the random input stimulus. Engineers then manually develop many test cases as sequences of stimulus that exercise the design functions. This is expensive and time consuming.

Furthermore, some verification test cases are tied to specific test benches and cannot be applied across all stages of a project. For example, the verification test cases created at an intellectual property (IP) stage of a project cannot be used at a subsystem stage and an SoC stage, e.g., a silicon full chip stage, etc., of the project, and new tests are developed at each stage. Redeveloping these tests for the different stages is expensive and time consuming.

Also, different stages of the project use test cases with different formats and mechanics. For example, a simulation stage, an emulation stage, a field programmable gate array (FPGA) prototype stage, and a final silicon stage may all use the same design, but use test cases with different formats and mechanics for efficient verification.

Also, use of different test cases for different project stages may result in a bug that is not found until a later stage, e.g., during the final silicon stage, etc., of the project. Fixing the bug delays time-to-market potentially missing a market window completely and resulting in reduced financial revenues.

In one embodiment, a method for testing the SoC or a design of the SoC is described. The method includes developing portable multiple scenario models to test various combinations of functions performed by components of the SoC. In one embodiment, the various combinations cover all or a majority of or a pre-determined number of functions that are performed by the components. The multiple scenario models include a list of functions of one or more of the combinations to be tested, and/or one or more input stimulus' to be applied to execute during the test, and/or one or more expected outcomes for comparison with the results to determine whether the one or more combinations are operational.

It should be noted that some embodiments of systems and methods described herein as being applicable to the SoC are also applicable to a design, e.g., a software model, etc., of the SoC.

In an embodiment a method includes generating a scenario model. For example, an expected output is back propagated from an output node of a function of the SoC via the function to be tested to generate an input, e.g., a stimulus, etc., of the function or via additional functions of the SoC to generate a stimulus. The stimulus that is generated is applied to test a performance scenario model.

In one embodiment, a stimulus is generated without back propagating an expected output from a function of the SoC. The stimulus that is generated is applied to test an application scenario model.

In one embodiment, a method for testing the SoC includes applying a stimulus to an input of the SoC or an input of a function within the SoC to generate a test output, and comparing the test output with an expected output to determine whether the SoC passed or failed a test.

In an embodiment, a method for generating a portable scenario model using a graph is described. The graph includes multiple sub-module representations. Each sub-module representation acts as a stimulus, or a decision-making sub-module representation, or a test output, or a functional sub-module representation.

In an embodiment, a decision-making sub-module representation is a functional block that results in more than one test output.

In one embodiment, an execution of a function sub-module representation results in all functional sub-module representations that are connected to the function sub-module representation to be evaluated.

In an embodiment, an execution of a function sub-module representation results in one or more of functional sub-module representations that are connected to the function sub-module representation to be evaluated.

In one embodiment, each scenario model, described herein, is a graph that includes a number of module representations and links between the module representations.

In an embodiment, a scenario model is generated by applying one or more constraints to a graph. For example, when a sub-module representation of the graph is executed to test the SoC, another sub-module representation of the graph cannot be executed to test the SoC. As another example, when a sub-module representation of the graph is executed to test the SoC, another sub-module representation of the graph is to be tested to test the SoC.

In one embodiment, a method is performed to determine that all input nodes of a design of an SoC or an SoC are checked based on expected outputs. For example, when an SoC has eight input nodes, it is determined by a processor that expected outputs are back propagated to reach all the eight input nodes. If some of the input nodes cannot be reached by back propagation, the input node is determined by a processor to be an illegal input node or an input node that is missing from a portable scenario model.

In an embodiment, a method includes determining a coverage of portable scenario models. A processor determines a number of paths, e.g., paths providing portable scenario models, etc., in a graph that are traversed during execution of a test of the SoC or a design of the SoC. The number of paths traversed relative to a total number of paths in the graph that may be traversed provides a coverage of portable scenario models in the graph.

In one embodiment, when a number of paths in a graph is larger than a pre-determined number to traverse during a test, a processor identifies paths that are more crucial than others for traversal during a test of the SoC or a design of the SoC. In an embodiment, instead of identifying paths, a processor identifies sub-module representations or module representations within a graph that are more crucial than other sub-module representations or module representations of the graph. The processor then identifies paths that pass through the more crucial sub-module representations or module representations. The identified paths are traversed during execution of a test of the SoC or a test of a design of the SoC.

In an embodiment, a method includes using a portable scenario model to generate test cases for test benches at each stage of the project. For example, at the IP stage, a test file generated from the portable scenario model includes a transaction using inputs and outputs of an IP block of the IP stage, and at the SoC stage includes the transaction using inputs and outputs and additional transactions that use a processor of the SoC stage and/or that use I/Os of the SoC. As another example, the portable scenario model is used to test the SoC stage. In this example, back-door memory checks, e.g., accessing data from a memory device of the SoC and checking against an expected output, etc., are performed or a CPU of the SoC is used to compute checksums of data stored in the memory device to increase a rate of testing the SoC at the SoC stage of the project. The preceding example also applies the emulator stage of the SoC or the prototype stage of the SoC. An emulator of an SoC is checked at an emulation stage of the project and a prototype of the SoC is tested at the prototype stage of the project.

In an embodiment, a method includes generating application scenario models or performance scenario models from multiple driver scenario models. For example, portable driver scenario models for individual functions, e.g., for each IP of the SoC, etc., are combined, e.g., connected together via links, etc., to define application scenario models or performance scenario models. In one embodiment, the application scenario models or the performance scenario models include application of all functions or a majority of functions of the SoC.

In one embodiment, a method includes scheduling tests, e.g., generating test files for execution, etc., across multiple processors.

In an embodiment, a consumer scenario model, e.g., a driver scenario model, etc. is scheduled to start after finish of execution of a producer scenario model, e.g., a driver scenario model, etc.

In one embodiment, multiple threads, e.g., multiple test files, etc., are executed by a processor. For example, multiple test files are scheduled to run concurrently, e.g., to be executed in a multi-tasking manner by a processor.

In an embodiment, a visual representation of a schedule showing a timing relation between the producer and consumer scenario models is displayed by a graphical processing unit on a display device.

In an embodiment, a method includes scheduling memory usage for operations within a test, e.g., conducted using a test file, etc. The memory usage involves using multiple memory regions.

In an embodiment, a visual representation of a scheduling of use of multiple memory regions is displayed by the graphical processing unit on the display device.

In one embodiment, a memory region is reused during a test based on locality of the memory region compared to other memory regions.

In an embodiment, a method includes sending messages from a test file generation module executed on a processor to a test bench agent, e.g., a bus verification intellectual property (VIP), a CPU, etc., to coordinate operations between the test file generation module and an I/O of an SoC. For example, test file generation module executes a test file to program a universal asynchronous receiver/transmitter (UART) of the SoC to transmit data, wait till the transmission is complete, and then sends a message to the test bench agent to check that the correct data was transmitted on the UART. In one embodiment, such messages are used to generate debug messages, e.g., messages indicating that the correct data was not transmitted, etc. In an embodiment, such messages are used to measure a level of concurrency that has been achieved in a test. For example, the messages are used to determine how often two power domains have powered up within a thousand cycles of each other to facilitate an indication or a lack thereof of a brown-out situation on a power grid.

In an embodiment, an expected output and a desired output are used interchangeably herein.

In one embodiment, a method for testing a system-on-a-chip (SoC) is described. The method includes receiving a file describing the SoC and parsing the file to determine one or more functions to be performed by one or more hardware components of the SoC. The SoC is fabricated on one or more chips. The method further includes receiving a desired output of the SoC and generating a test scenario model based on the desired output of the SoC and the functions to be performed. The test scenario model includes one or more module representations of the functions and includes one or more connections between two of the module representations. Each connection provides a direction of flow of data between the two module representations. The desired output acts as a performance constraint for the test scenario model. The test scenario model further includes an input of the SoC that is generated based on the desired output, the module representations, and the one or more connections. The test scenario model includes a path from the input via the module representations and the connections to the desired output. The method is executed by a processor.

In an embodiment, another method for testing an SoC is described. The method includes receiving one or more scenario models. Each scenario model provides a path of a direction of execution of one or more intellectual property (IP) blocks associated with an SoC. The method further includes generating one or more test files using the scenario models. The scenario models further include one or more inputs associated with the SoC that are generated based on one or more expected outputs associated with the SoC.

In one embodiment, yet another method for testing an SoC is described. The method includes receiving multiple scenario models. Each scenario model is used for execution of one or more intellectual property (IP) blocks along a path. The path is used for generating a test output based on a stimulus that is received at an input of the path. The method also includes executing a first test bench to execute the at least one of the scenario models to further generate one or more test outputs and executing a second test bench to execute the at least one of the scenario models to further generate one or more test outputs. The method includes comparing the test outputs generated by executing the first test bench with one or more expected outputs to determine whether a system-on-a-chip (SoC) passes a test at a first stage of a project. The method includes comparing the test outputs generated by executing the second test bench with one or more expected outputs to determine whether the SoC passes a test at a second stage of a project. The method is executed by a processor.

In one embodiment, a method includes receiving multiple application scenario models, which are generated for testing one or more systems on chips (SoCs). The application scenario models include a plurality of driver scenario models and a plurality of sequences of execution of the driver scenario models. Moreover, each application scenario model is generated by back propagating an expected output of the application scenario model to generate an input to be provided to the application scenario model during a test of the one or more SoCs. The method further includes splitting the application scenario models into a pre-determined number of computer threads. Each computer thread includes at least one but not all of the driver scenario models. The method includes splitting the sequences into a plurality of flows between the driver scenario models of the computer threads. The method includes providing for testing of the one or more SoCs the driver scenario models within the computer threads and the plurality of flows between the driver scenario models of the computer threads.

In an embodiment, a method includes receiving multiple application scenario models, which include a plurality of driver scenario models and sequences of application of the driver scenario models. The application scenario models are used for testing one or more SoCs. Moreover, each application scenario model is generated by back propagating an expected output of the application scenario model to generate an input to be provided to the application scenario model during a test of the one or more SoCs. The method further includes splitting multiple memory addresses into a plurality of memory regions. Each of the memory regions is exclusive of any other of the memory regions. Also, one of the driver scenario models of one of the application scenario models includes reading data from one of the memory regions. Another one of the driver scenario models of the one of the application scenario model includes writing data to another one of the memory regions.

In one embodiment, a system includes a memory device for storing application scenario models, which are generated for testing one or more SoCs. The application scenario models include a plurality of driver scenario models and a plurality of sequences of execution of the driver scenario models. Each application scenario model is generated by back propagating an expected output of the application scenario model to generate an input to be provided to the application scenario model during a test of the one or more SoCs. The system further includes a processor coupled to the memory device. The processor receives the application scenario models. The processor further splits the application scenario models into a pre-determined number of computer threads. Each computer thread includes at least one but not all of the driver scenario models. The processor further splits the sequences into a plurality of flows between the driver scenario models of the computer threads. The processor provides for testing of the one or more SOCs the driver scenario models within the computer threads and the plurality of flows between the driver scenario models of the computer threads.

In one embodiment, a method includes generating a graphical display of multiple computer threads. Each computer thread includes one or more driver scenario models. Each driver scenario model includes a function associated with a test of one or more SoCs. The method further includes identifying a flow of execution of the driver scenario models from one of the computer threads to another one of the computer threads. The flow of execution provides a sequence in which the one of the computer threads and the other one of the computer threads are executed.

In an embodiment, a method includes receiving multiple application scenario models, which include a first driver scenario model and a second driver scenario model and a flow of execution of the first and second driver scenario models. The application scenario models are executed for testing one or more SoCs. The method further includes assigning the first driver scenario model to a first computer thread and the second driver scenario model to a second computer thread. The method also includes providing the first driver scenario model, the second driver scenario model, the flow of execution, the assignment of the first driver scenario model to the first computer thread, and the assignment of the second driver scenario model to the second computer thread for testing a design of the one or more SoCs. The method includes generating a graphical display of the first and second computer threads to indicate the flow between execution of the first and second driver scenario models.

In one embodiment, a system includes a memory device for storing data associated with a graphical display of multiple computer threads. Each computer thread includes one or more driver scenario models. Each driver scenario model includes a function associated with a test of one or more SoCs. The system further includes a processor coupled to the memory device. The processor generates the graphical display and identifies a flow of execution of the driver scenario models from one of the computer threads to another one of the computer threads. The flow of execution provides a sequence in which the one of the computer threads and the other one of the computer threads are executed.

Some advantages of the embodiments described in the present disclosure include generation of a test file from scenario models by a processor, verification of a chip design at a driver scenario model level, and verification by a processor that a flow of data occurs between intellectual property (IP) blocks, fabric module representations, and memory device module representations.

Additional advantages of the embodiments described in the present disclosure include verification by a processor of power and clock management at one or more stages, e.g., an IP stage, a subsystem stage, an SoC stage, a simulation stage, an emulation stage, a prototyping stage, a post-silicon stage, etc., of a project of developing an SoC. For example, a system and power control module representation is executed by a processor to provide power to an IP block at the IP stage and is also executed to provide power to multiple IP blocks at the subsystem stage. An amount of the power provided is compared with an expected amount of power at each of the IP and subsystem stages to determine whether the amount of power matches or is within a predetermined range of the expected power to further determine whether the system and power control module representation is functioning at both the stages.

In one embodiment, the amount of power provided by the system and power control module representation at the IP stage is compared with the amount of power provided by the system and power control module representation at the subsystem stage to determine whether the system and power control module representation is functioning.

In an embodiment, the amount of power received by an IP block at the IP block stage is compared with the amount of power received by the IP block at the subsystem stage to determine whether the system and power control module representation is functioning.

As an example of verification by a processor of clock management at the one or more stages, a clock module representation is executed by a processor at the IP stage to determine whether a clock signal that is generated and supplied by the clock module representation matches or is within a predetermined threshold of an expected clock signal output. As another example of verification by a processor of clock management at the one or more stages, a clock module representation is executed by a processor at the simulation stage to determine whether a clock signal that is generated and supplied by the clock module representation matches or is within a predetermined threshold of an expected clock signal output. As yet another example of verification by a processor of clock management at the one or more stages, a clock module representation is executed by a processor at the subsystem stage to determine whether a clock signal that is generated and supplied by the clock module representation matches or is within a predetermined threshold of a clock signal that is generated by the clock module representation during the IP block stage.

Further advantages of the embodiments described in the present disclosure include integrating one or more scenario models into a test bench, verification by a processor of operations of one or more IP blocks at the one or more stages, and verification by a processor of a width of a bus fabric module representation. For example, to verify the width of the bus fabric module representation, it is determined whether the bus fabric module representation hangs under stress. To further illustrate, an amount of data that is greater than the width of the bus fabric module representation is passed through the bus fabric module representation to determine whether the bus fabric module representation manages the passage of data or becomes nonfunctional under stress.

Additional advantages of the embodiments described in the present disclosure include detection by a processor of failure of a memory device module representation, e.g., a memory bank module representation, a virtual memory, etc., upon access by multiple IP blocks to the memory device module representation. Another advantage of the above-described embodiments include determining by a processor whether an IP block of an SoC, or a subsystem of the SoC, or a simulation of the SoC, or an emulator of the SoC, or a prototype of the SoC, or a post-silicon SoC, or a combination thereof, hangs when there is a change in a state, e.g., a change from a low state to a high state, a change from the high state to the low state, a change from 1 to 0, a change from 0 to 1, etc., of a clock signal that is supplied by the system and power control module representation.

Another advantage of the embodiments described in the present disclosure include revelation by a processor of an address decode bug when an address of a memory device module representation is accessed by multiple IP blocks. Another advantage of the embodiments described in the present disclosure includes graphical presentation of test cases and verification. For example, the graphical presentation includes bar graphs that further include driver scenario models and a chain indicating a sequence of execution of the driver scenario models. Moreover, the driver scenario models are coded based upon whether a driver scenario model has finished execution, is waiting for execution, or is hanging. In one embodiment, the coding of the driver scenario models is based on different colors, or different patterns, or different shades of color. The graphical presentation allows a user to more quickly debug a test computer program code or a compiled computer program code than one without the graphical presentation.

Moreover, another advantage of the embodiments described in the present disclosure includes execution of scenario models to capture knowledge of an SoC at the one or more stages of the project. An additional advantage of the embodiments described in the present disclosure include generation of a large number, e.g., 1000-3000, 1500-2000, etc., of test cases, e.g., scenario models, etc., for testing an SoC at the one or more stages of the project. Such generation of the large number of test cases is difficult when done by hand.

Furthermore, an advantage of the embodiments described in the present disclosure is that the test cases are executed by multiple processors and/or in multiple threads to mimic an actual performance of an SoC. For example, when the SOC includes three processors, the test cases are generated to include three processor module representations. As another example, when the SOC executes 10 threads on one processor, the test cases are generated to include 10 threads executed by one central processing unit (CPU) module representation.

Another advantage of the embodiments described in the present disclosure include exercising with the test cases of end-to-end use of multiple driver scenario models to measure performance of the multiple driver scenario models during the end-to-end use. For example, at one end of an application scenario model of a digital camera is a driver scenario model that includes a charge-coupled device (CCD) module representation and at another end is a driver scenario model that includes a secure digital (SD) card module representation. Between the CCD module representation and the SD card module representation is a camera module representation, an image processor module representation, and an SD card controller module representation. The CCD module representation is coupled to the camera module representation, which is coupled to the image processor module representation. The image processor module representation is coupled to the SD card controller module representation.

Yet another advantage of the embodiments described in the present disclosure includes automated generation of test cases by a processor from modified scenario models. Another advantage of the embodiments described in the present disclosure includes that the test cases are optimized for rapid runtime.

An advantage of the embodiments described in the preset disclosure includes allowing a single portable scenario model that describes functions, expected outcomes and/or stimulus, instead of three separate efforts to create random stimulus, checks and a coverage model.

Another advantage of the embodiments described in the preset disclosure is that back propagating from an expected outcome via a feature, e.g., module representation, sub-module representation, functional block, etc., to generate a stimulus to create a scenario model that exercises the feature in a focused manner instead of relying on random chance to create a sequence to exercise the feature. Use of the scenario models to cover different features of the SoC to systematically satisfy a coverage target further reduces a number of redundant tests that are run.

An advantage of the embodiments described in the preset disclosure is that by using reachability analysis, e.g., generation of a stimulus from an expected outcome, etc., on the portable scenario models, it is possible to analyze an amount of verification intent that is covered by the scenario models before any tests are run. Previously, tests were run to collect coverage data to further understand a quality of test coverage.

Yet another advantage of the embodiments described in the preset disclosure is that IP driver scenario models are combined to generate application scenario models to further test interactions between the IPs, instead of having to manually develop new test cases that combine the IPs.

Another advantage of the embodiments described in the preset disclosure is that the same portable scenario model can be used to generate tests for test benches at different stages of the project, e.g., tests for I/O transactions at an IP block stage of the project, tests at the SoC stage, etc. The same portable scenario model is used to generate test cases optimized for each stage of the project without having to develop new tests.

An advantage of the embodiments described in the preset disclosure is that concurrent operations can be scheduled across a plurality of processors and/or threads.

Other aspects will become apparent from the following detailed description, taken in conjunction with the accompanying drawings.

BRIEF DESCRIPTION OF THE DRAWINGS

The embodiments may best be understood by reference to the following description taken in conjunction with the accompanying drawings.

FIG. 2A-1 is a diagram of a system for using a scenario model to determine whether the SoC failed or passed the test, in accordance with one embodiment described in the present disclosure.

FIG. 2A-2 is a continuation of the system of FIG. 2A-1, in accordance with one embodiment described in the present disclosure.

FIG. 2B-1 is a diagram of a system to illustrate an example of a test bench of FIG. 2A-2, in accordance with one embodiment described in the present disclosure.

FIG. 2B-2 is a diagram of a universal verification methodology (UVM) test bench to illustrate multiple application scenario models, in accordance with one embodiment described in the present disclosure.

FIG. 2B-3 is a diagram of a graph to illustrate multiple application scenario models, in accordance with one embodiment described in the present disclosure.

FIG. 2B-4 is a diagram of a graph to illustrate an application scenario of power management, in accordance with one embodiment described in the present disclosure.

FIG. 3 is a diagram of a system to illustrate use of driver scenario models, and use of an application scenario model, in accordance with one embodiment described in the present disclosure.

FIG. 4-1 is a diagram of a system to illustrate horizontal and vertical integration of an SoC scenario model in various stages of a project of developing a post-silicon SoC, in accordance with one embodiment described in the present disclosure.

FIG. 4-2 is a diagram of a system to illustrate multi-level design support, in accordance with one embodiment described in the present disclosure.

FIG. 6 is a diagram of a system for testing a post-silicon SOC, in accordance with one embodiment described in the present disclosure.

FIG. 7 is a diagram of a graph to illustrate a scenario model, one or more expected outputs of the scenario model, and generation of one or more inputs of the scenario model based on one or more constraints, in accordance with one embodiment described in the present disclosure.

FIG. 8-1 is a diagram of a graph for illustrating a constraint of a driver scenario model affecting another driver scenario model, in accordance with one embodiment described in the present disclosure.

FIG. 8-2 is a diagram of a system for illustrating a manner in which a driver scenario model provides a constraint to another driver scenario model, in accordance with one embodiment described in the present disclosure.

FIG. 8-3 is a diagram of a system to illustrate use of one or more constraints to control processing performed by a video processor module representation, in accordance with one embodiment described in the present disclosure.

FIG. 8-4 is a diagram of a graph for illustrating use of an application scenario model that includes memory device module representations for storing data to be used by intellectual property (IP) blocks, in accordance with one embodiment described in the present disclosure.

FIG. 8-5 is a diagram of an embodiment of graph to illustrate a performance scenario model, in accordance with one embodiment described in the present disclosure.

FIG. 9-1 is a diagram of a graph to illustrate a division of a scenario across multiple central processing units (CPUs), in accordance with one embodiment described in the present disclosure.

FIG. 9-2 is a diagram of a graph to illustrate use of memory device module representations to store data for access by one or more driver scenario models, in accordance with one embodiment described in the present disclosure.

FIG. 10 is a diagram of a system for illustrating execution of multiple scenario models in parallel by a processor or by multiple CPUs or by execution of multiple threads, in accordance with one embodiment described in the present disclosure.

FIG. 11 is a diagram of a display screen to illustrate use of multiple threads and multiple CPUs to execute a number of scenario models, in accordance with one embodiment described in the present disclosure.

FIG. 12 is a diagram of a computer program code to enable integration of SOC scenario models into a test bench, in accordance with one embodiment described in the present disclosure.

FIG. 13 is a diagram of a screen shot for illustrating visualization of one or more paths of a number of scenario models, in accordance with one embodiment described in the present disclosure.

FIG. 14A is a diagram of a system to illustrate generation of a verification space from a description of a component of an SoC, in accordance with one embodiment described in the present disclosure.

FIG. 14B is a diagram of a system to illustrate generation of a stimulus from an expected output of a pipeline scenario model, in accordance with one embodiment described in the present disclosure.

FIG. 14C is a diagram of a system to illustrate generation of stimuli from expected outputs of a switch scenario model, in accordance with one embodiment described in the present disclosure.

FIG. 14D is a diagram of a system to illustrate generation of a stimulus from an expected output of a pipeline scenario model, in accordance with one embodiment described in the present disclosure.

FIG. 14E-1 is a diagram of a scenario model to illustrate generation of verification spaces for performing a write operation, in accordance with one embodiment described in the present disclosure.

FIG. 14E-2 is a diagram of a scenario model to illustrate generation of verification spaces for performing a read operation, in accordance with one embodiment described in the present disclosure.

DETAILED DESCRIPTION

The following embodiments describe systems and methods for testing a system-on-a-chip (SoC) with scenario models and at different horizontal and vertical levels. It will be apparent that the present embodiments may be practiced without some or all of these specific details. In other instances, well known process operations have not been described in detail in order not to unnecessarily obscure the present embodiments.

In one embodiment, the SoC is an integrated circuit (IC) that integrates all components, e.g., a memory device, a processor, an input/output, a bus, etc., of a computer or another electronic system into a chip. For example, the SoC includes digital, analog, mixed-signal, and often radio-frequency functions-all on a chip substrate. In an embodiment, the SoC includes a microcontroller.

In an embodiment, instead of the SoC, a system-in-package (SIP) is used. The SIP includes a number of chips in a single package. In a number of embodiments, instead of the SoC, a package-on-package stacking is used during circuit board assembly. For example, the package-on-package stacking includes the SoC chip, which further includes processors and numerous digital peripherals, and comes in a ball grid package with lower and upper connections. The lower balls connect to the board and various peripherals, with the upper balls in a ring holding memory buses used to access memory devices, e.g., a flash memory, a register, a flip-flop, a virtual memory, a read-only memory (ROM), and a random access memory (RAM). Other examples of memory devices include a read-only memory, a volatile memory, a non-volatile memory, a redundant array of storage disks, a hard disk, etc.

Figure 1A:
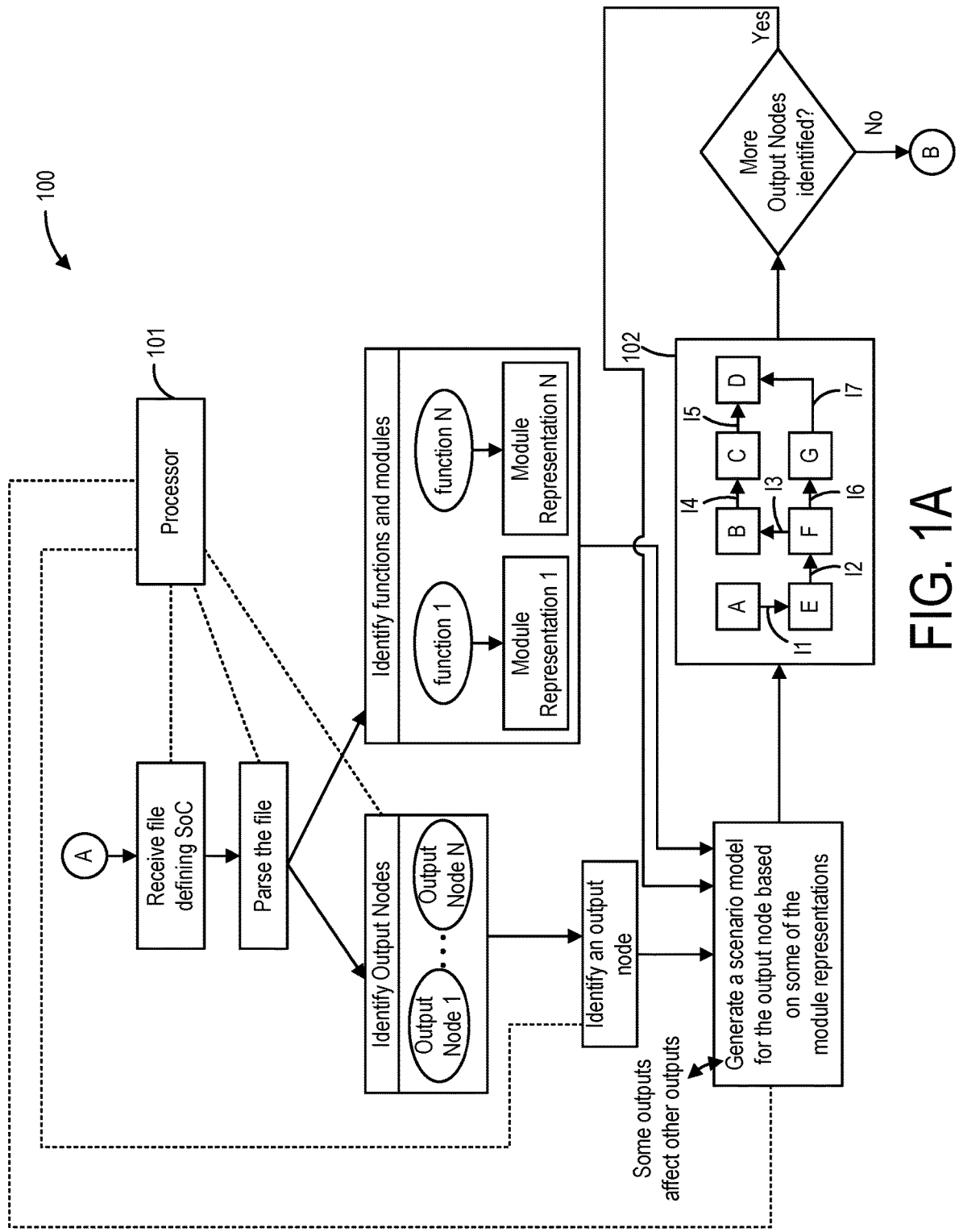
FIG. 1A is a diagram of a system for illustrating use of scenario models in testing a system-on-a-chip (SoC), in accordance with one embodiment described in the present disclosure.
Figure 1B:
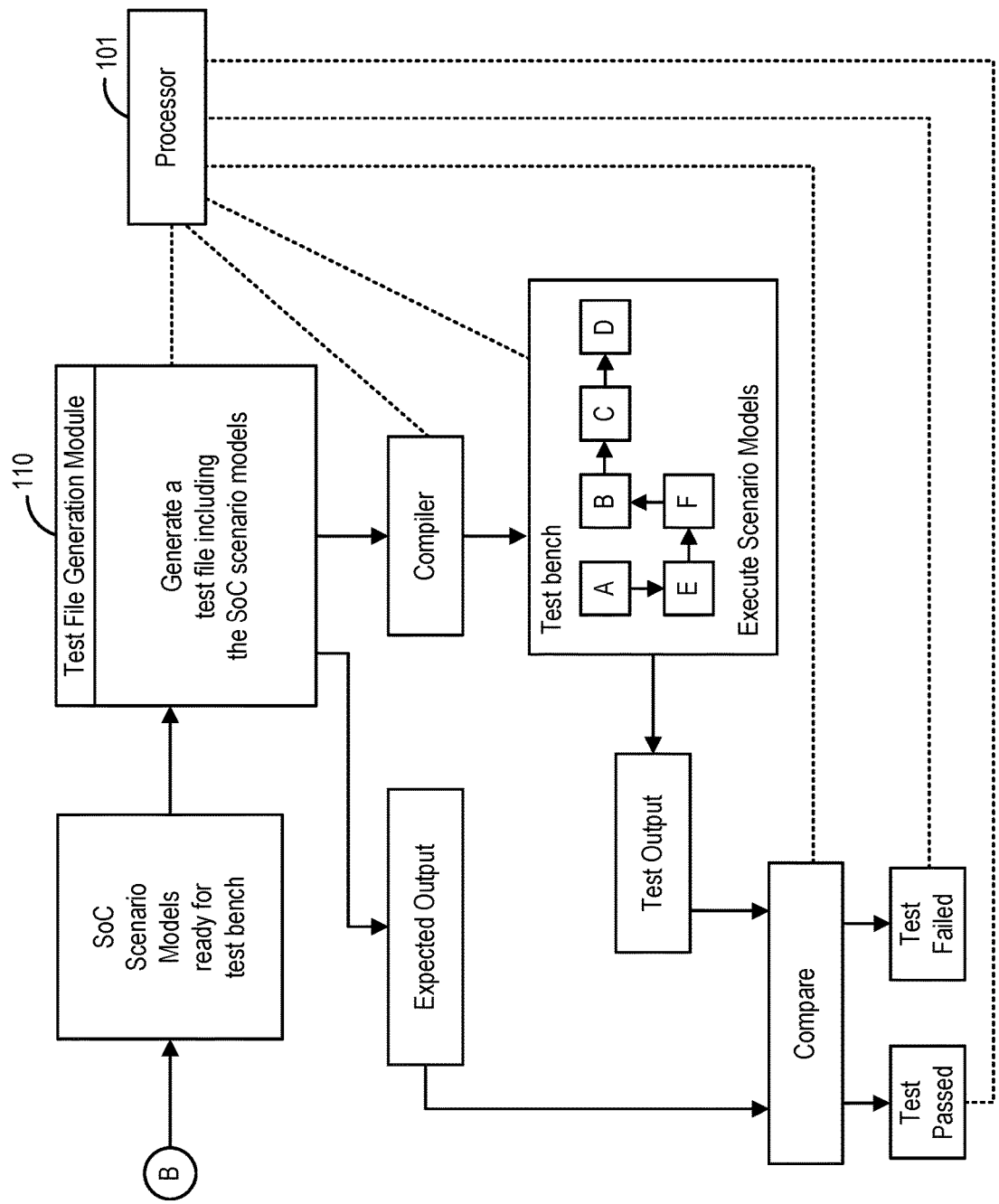
FIG. 1B is a continuation of the system of FIG. 1A, in accordance with one embodiment described in the present disclosure.

FIGS. 1A and 1B are diagrams of an embodiment of a system 100 for illustrating use of scenario models in testing the SoC. The system 100 includes a processor 101 that receives a file. Examples of a processor include a microcontroller, an application specific integrated circuit (ASIC), a programmable logic device (PLD), a central processing unit (CPU), etc.

The file defines the SoC. For example, the file includes a description of components of the SoC, connections between the components, one or more output nodes of each component, one or more input nodes of each component, functions performed by the components, and functions performed by the connections. Examples of the components include a processor, a page translation unit, a cache, a clock, a power management device, a memory device, a controller, an input/output (I/O) device, a bus, a fabric, a switch, a charge-coupled device (CCD), etc.

In one embodiment, the description of the components of the SOC in the file is in a programming language, e.g., a C+ programming language, a C++ programming language, etc. In an embodiment, the description of the SoC is performed using graphics that show the components and connections between the components.

The processor 101 parses the file to identify the output nodes of each component, and to further identify the functions of the components. Examples of the output nodes include output node 1, output node 2, and so on until output node N, where N is a number of the components. Moreover, examples of the functions include a function 1, a function 2, and so on until a function N.

In one embodiment, each component performs more than one function, e.g., a primary function, a secondary function, etc., and has a number of output nodes that matches the number of functions performed by the component. In the embodiment, a number of functions performed do not match a number of components. For example, the number of functions, e.g., M functions, etc., performed by a component is greater than or less than a number of the components, where M is an integer greater than one.

In an embodiment, functions of components of the SoC are received by the processor 101 from the user via an input device, which is coupled to the processor 101 via an input/output interface, e.g., a universal serial bus (USB) interface, a parallel port, a serial port, etc.

The processor 101 generates a module representation for each function. For example, upon parsing the file, the processor 101 generates a module representation 1 for the function 1 and generates a module representation N for the function N. As another example, the processor 101 generates a module representation that portrays a read controller corresponding to a function of reading data from a memory device. As yet another example, the processor 101 generates a module representation that describes an image encoder for a function of encoding image data. The modules 1 thru N form a graphical layout.

Each module representation is connected by the processor 101 to one or more output nodes, e.g., the output node 1, the output node 2, etc., based on a relationship between a corresponding component and one or more outputs, e.g., signals, data, values, etc., of the component. An output is generated by a component by performed one or more functions. Examples of outputs of a module representation include an image that is displayed on a display device, an image that is stored in a memory device, and multimedia that is stored in a memory device or is displayed on a display device, etc. Examples of multimedia include a combination of audio and video, or a combination of an image and audio, a combination of an animation and audio, a picture in a picture, etc. The connection between the module representation and one or more of the output nodes is performed to include the one or more of the output nodes as a part of the module representation. For example, upon determining that a component of the SoC has two outputs, the processor 101 integrates a module representation of the component with two output nodes, e.g., an output node 1-1 and an output node 1-2. It should be noted that in an embodiment, the output nodes 1-1 and 1-2 are sub-nodes of the output node 1. As another example, upon determining that a component of the SoC produces a number of outputs, the processor 101 integrates a module representation of the component with the same number of output nodes.

The processor 101 identifies an output node from the output nodes that are connected to the module representations. The output node identified is an output associated with an application of one or more functions of the SoC. For example, the processor 101 identifies the output node N, which is generated by displaying an image on a display device. As used herein, examples of a display device include a display device of a camera, a display device of a computer, a display device of a cell phone, a display device of a smart phone, a display device of a tablet, etc. Further examples of a display device include a liquid crystal display (LCD), a light emitting diode (LED) display, a plasma display, etc. As another example, the processor 101 identifies the output node 1, which is generated from an application of capturing an image and storing the image in a memory device.

It should be noted that in an embodiment, some of the output nodes 1 thru N affect one or more of the remaining of the output nodes 1 thru N. For example, an output at one of the output nodes 1 thru N adds a constraint to an output at another one of the output nodes 1 thru N. Both the output at the output node that affects the output at the other output node of the 1 thru N output nodes by adding the constraint and the output that is affected are associated with the same application. To further illustrate, when an output at one of the output nodes 1 thru N is achieved, an output at another one of the output nodes 1 thru N cannot be achieved. As another illustration, when a high quality picture is displayed on a display device, a low quality image cannot be displayed on the display device. As yet another illustration, when a car is controlled to be turned on, the car cannot be controlled to be turned off. As another illustration, at a time a cell phone screen is displaying a video, the cell phone screen cannot display another video.

In one embodiment, an output at one of the 1 thru N output nodes that affects an output at another output node of the 1 thru N output nodes by adding the constraint and the output that is affected are associated with different applications. For example, when a camera is displaying an image, the camera cannot capture an image. As another example, when a cell phone is displaying a video, the cell phone cannot capture another video of an environment surrounding the user. The user operates the cell phone.

The processor 101 uses one of the 1 thru N output nodes that is identified and a number of applications to be achieved to generate a number of scenario models for the output node. Examples of the scenario models include a performance scenario model, an application scenario model, a driver scenario model (DSM), etc. Examples of the applications include storing an image, capturing an image, writing, reading, encoding an image, decoding an image, transferring an image, any of the functions described herein, a combination of the functions described herein, etc.

In an embodiment, the processor 101 combines two or more of the functions to generate an application from the combination. In one embodiment, an application to be performed using the one or more of the module representations 1 thru N is received from the user via the input device.

It should be noted that a performance scenario model is similar to the application scenario model except that in the performance scenario model, a test output is compared with an expected output to determine whether an SoC or a design of the SoC passed a test. In the application, no such comparison is performed after generating a test output and the test output is manually analyzed. Examples of the performance scenario model, the application scenario model, and the driver scenario model are provided below.

A scenario model is generated based on the one of the 1 thru N output nodes that is identified, one of more of the module representations 1 thru N, and the one or more applications of an SoC. For example, the processor 101 retrieves the Nth output node that is identified from a memory device, provides a seed as an expected output of the Nth output node to achieve an application, and applies a function of the Nth module representation having the Nth output node to generate an input at an input node of the Nth module representation. Examples of the seed include an image, image data, multimedia data, video, video data, an expected output, etc. As another example, when an application is that of capturing and storing an image, the seed is the image. As yet another example, when an application is that of writing data to a memory device, the seed is the data. In one embodiment, the seed is provided within the file that is parsed by the processor 101. In an embodiment, the seed is provided by the user via the input device to the processor 101. The input node of the Nth module representation is an output node of the (N−1)th module representation.

The processor 101 further determines based on a function that precedes a function performed by the Nth module representation, the application, and the seed that the (N−1)th module representation is to be connected to the Nth module representation. The input at the input node of the Nth module representation is further used by the processor 101 as an output of the (N−1)th module representation. An input at an input node of the (N−1)th module representation is generated by the processor 101 based the output at the output node of the (N−1)th module representation. In such a manner, the processor 101 back propagates the output at the output node of the Nth module representation to achieve an application.

The processor 101 back propagates the output at the output node of the Nth module representation to generate the scenario model, which includes a group of the N module representations and links between a number of the N module representations. To illustrate, the processor 101 generates the scenario model as a group of the Nth module representation and the (N−1)th module representation, and a link between the (N−1)th module representation and the Nth module representation. In one embodiment, a link has a direction opposite to that of the back propagation. For example, a link is forward propagating between the (N−1)th module and the Nth module representation when an input of the Nth module is back propagated to generate an input, e.g., a stimulus, etc., of the (N−1)th module representation. To further illustrate, a link points from the (N−1)th module to the Nth module when an input of the Nth module is back propagated to generate an input of the (N−1)th module representation. In an embodiment, a link is bi-directional.

As another example of generation of the scenario model, the processor 101 retrieves from a memory device module representation, a quality of a decoded image to be displayed on a display device, generates a display controller module representation to facilitate rendering of the decoded image on the display device, determines that a decoder module representation be connected to the display controller module representation to decode encoded image data to achieve the quality of the decoded image, and connects the decoder module representation to the display controller module representation. The processor 101 generates decoded image data at an input node of the display controller module representation based on the quality of the decoded image to be displayed and based on the decoded image data generates the encoded image data at the input of the decoder module representation. In this example, the display controller module representation is an example of the Nth module representation and the decoder module representation is an example of the (N−1)th module representation. The processor 101 generates the scenario model as a group of the decoder module representation and the display controller module representation and a link connecting the decoder module representation to the display controller module representation.

An example of the scenario model is illustrated as a scenario model 102 in FIG. 1A. The scenario model 102 includes module representations A, B, C, D, E, F, and G. For example, the module representation D is an example of the Nth module representation and the module representation C or G is an example of the (N−1)th module representation. Moreover, the scenario model 102 includes links 11, 12, 13, 14, 15, 16, and 17, each of which is an example of a direction of flow.

The processor 101 determines whether additional output nodes of the SoC are identified from the parsed file. In response to determining that the additional output nodes are identified from the parsed file, the processor 101 generates additional scenario models for additional applications of the SoC from the additional output nodes in a manner similar to that described above.

In one embodiment, an output of the Nth module representation is back propagated by the processor 101 via the Nth module representation to generate an input of the Nth module representation. Similarly, the input, which is an output of the (N−1)th module representation is back propagated by the processor 101 via the (N−1)th module representation to generate an input of the (N−1)th module representation. By progressively generating an input of a module representation from an output of the module representation, a stimulus, e.g., an input, etc., of a scenario model is determined by the processor 101.

As shown in FIG. 1B, the scenario models that are to be executed by a test bench are generated by the processor 101 from the parsed file. It should be noted that in one embodiment, scenario models are generated manually by the user via an input device, e.g., a keyboard, a stylus, a mouse, a touch screen, a keypad, etc., of a computing device in which the processor 101 is implemented. For example, the scenario models, as described herein, are generated by the user and received by the processor 101 from the user to generate one or more test files. Examples of the computing device include a desktop computer, a laptop computer, a cell phone, a smart phone, a tablet, etc.

In one embodiment, one or more test files store one or more scenario models to facilitate availability of the one or more scenario models to a computer program, e.g., a test bench, etc. In an embodiment, one or more test files are modified or deleted by using a computing device.

In an embodiment, multiple test files are compiled by the processor 101 or by another processor to generate a compiled file, which is provided by the processor 101 to a test file generation module 110.

In one embodiment, a module, as used herein, is a computer software that is executed by a processor or is hardware or a combination thereof. Examples of a hardware of a module include an ASIC, a PLD, etc.

The processor 101 executes the test file generation module 110 to parse a compiled file that includes the scenario models to further generate one or more test files. Each test file includes a scenario model. For example, the processor 101 parses a compiled file that includes multiple scenario models to generate a test.c file or a test.C file that includes one the scenario models, and to further generate another test.c file or a test.C file that includes another one of the scenario models. The processor 101 executes a compiler program to compile each test file into a compiled file.

The compiled files generated from the test files are provided by the processor 101 to a test bench program. The test bench program is a virtual environment used to verify functioning or soundness of the scenario models. In one embodiment, the test bench program is executed by the processor 101. In another embodiment, the test bench program is executed by a processor other than the processor 101 that generates a compiled file.

In an embodiment, the test bench program executes module representations of the components of the SoC. A path from an input node of one of the module representations to an output node of the same or another module representation is provided by a scenario model to the test bench program.

The test bench program is executed to execute the scenario models. For example, the processor 101 provides an input that is determined as the input of the Nth module representation from the output at the Nth output node as a stimulus to execute one of the scenario models. As another example, the processor 101 provides an input that is determined as the input of the (N−1)th module representation from the output at the (N−1)th output node as a stimulus to execute one of the scenario models. As another example, the processor 101 provides an input that is determined at the input of the 1st module representation from an output at the 1st output node as a stimulus to execute one of the scenario models.

When the test bench program is executed, a number of test outputs are generated by the processor 101. For example, when the test bench program is executed, a test output is generated at the Nth output node based on the stimulus provided to the Nth module representation. As another example, upon execution of the test bench program, a test output is generated at the (N−1)th output node based on a stimulus provided as an input to the (N−1)th module representation. As yet another example, upon execution of the test bench program, a test output is generated at the Nth output node based on a stimulus provided as an input to the (N−1)th module representation. As still another example, in response to execution of the test bench program, a test output is generated at the Nth output node based a stimulus provided as an input to the 1st module representation.

In an embodiment, a number of stimulus' provided is equal to a number of applications of the SoC. For example, when the SoC is to be tested for a decoding application and an encoding application, two stimulus's are provided. In this example, one stimulus includes an encoded image to test the decoding application and another stimulus includes a decoded image to test the encoding application.

The processor 101 compares the test output to a corresponding expected output. The processor 101 parses a compiled file that is generated from a test file to retrieve the one or more expected outputs. It should be noted that an expected output corresponds to the test output when the expected output is at the same node as that of the test output. For example, an expected output at the Nth output node corresponds to a test output when the test output is at the Nth output node.

The processor 101 determines whether a test passed or failed based on a result of the comparison of the test output with the corresponding expected output. For example, the processor 101 determines whether the test output matches the corresponding expected output. Upon determining that the test output matches the corresponding expected output, the processor 101 determines that the test passed. On the other hand, upon determining that the test output does not match the corresponding expected output, the processor 101 determines that the test failed. As another example, the processor 101 determines whether the test output is within a pre-determined threshold of the corresponding expected output. The pre-determined threshold is provided by the user via the input device to the processor 101. In one embodiment, the processor 101 randomly generates the pre-determined threshold. Upon determining that the test output is within the pre-determined threshold of the corresponding expected output, the processor 101 determines that the test passed. On the other hand, upon determining that the test output is outside the pre-determined threshold of the corresponding expected output, the processor 101 determines that the test failed.

Figures 2, 2A:
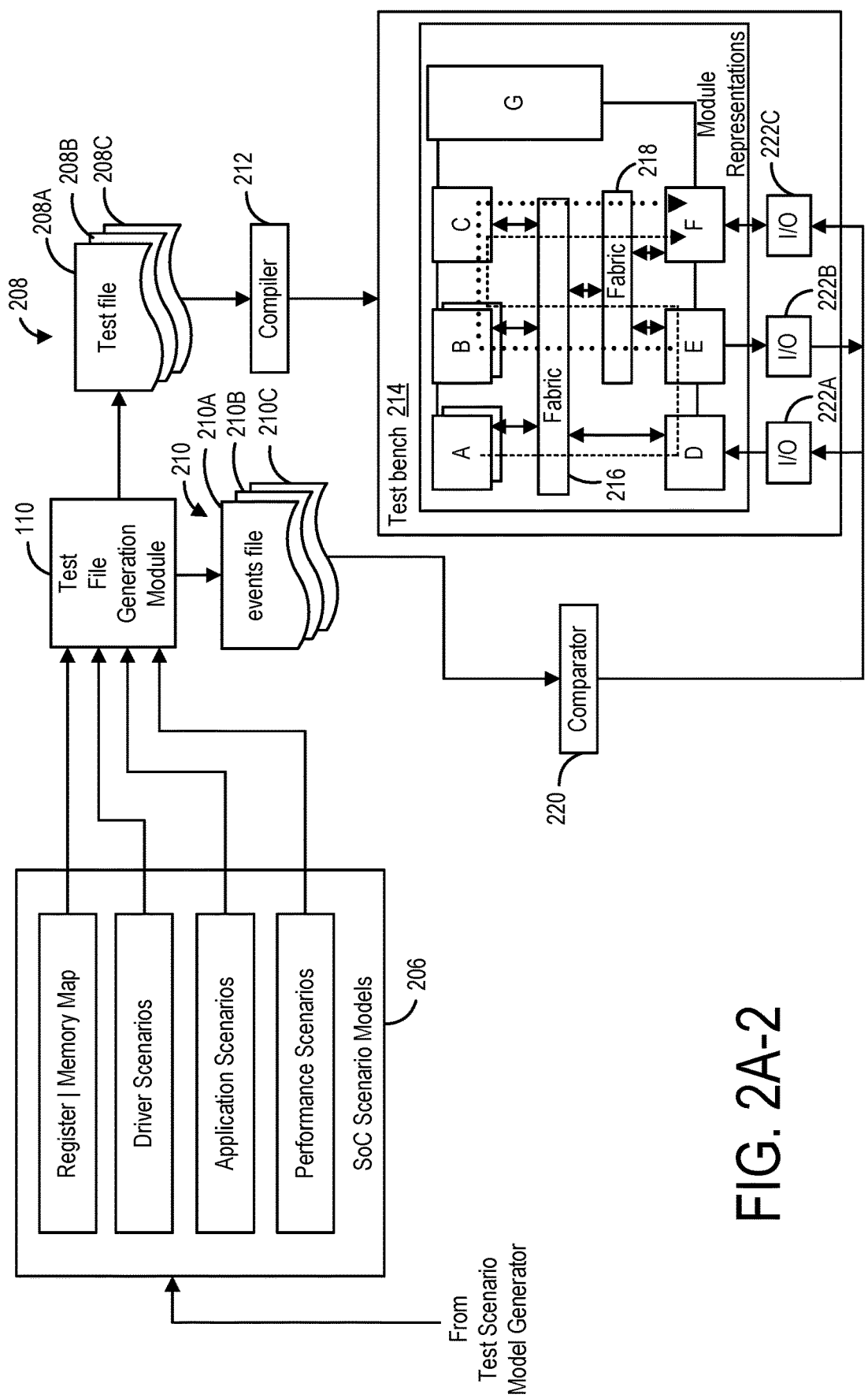
Figures 1, 2B:
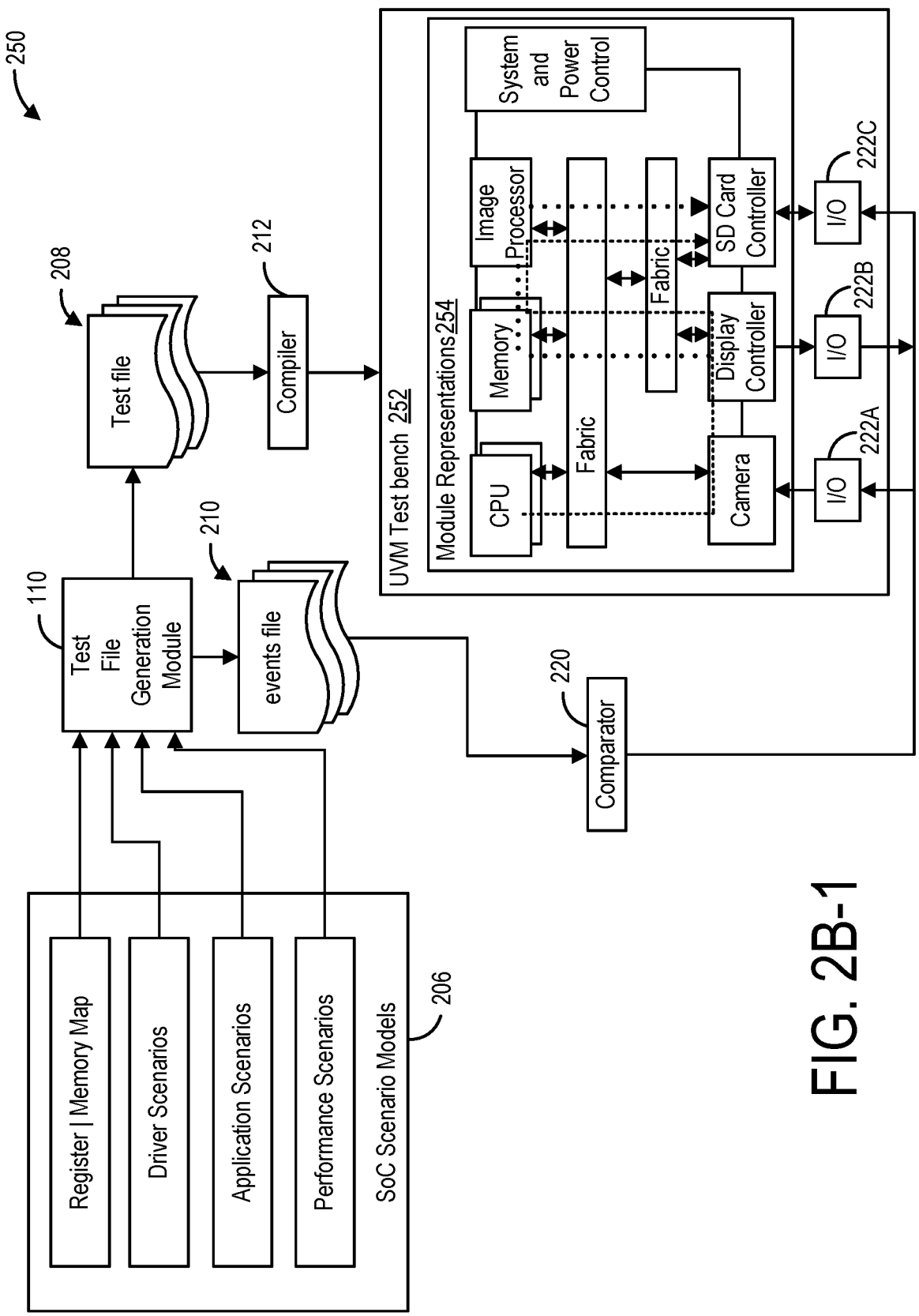

FIGS. 2A-1 and 2A-2 are diagrams of an embodiment of a system 200 for using the scenario model to determine whether the SoC failed or passed the test. The system 200 includes a file 202 that defines the SoC. The file 202 is parsed by the processor 101 to identify functions of the components of the SoC, to generate the N module representations based on the functions and one or more applications of the SoC, and to generate links between the N module representations based on the functions and one or more applications of the SoC. Moreover, the file 202 is parsed by the processor 101 to identify one or more expected outputs, e.g., seeds, etc. A test scenario model generator 204 that is executed by the processor 101 generates a compiled file that includes one or more scenario models 206 (shown in FIG. 2A-2) from the N module representations and the links between the N module representations. The expected outputs are provided by the processor 101 to the test scenario model generator 204.

The scenario models 206 include a memory map, e.g., a link, etc., between a module representation and a memory device module representation, e.g., an address, a set of addresses. As an example, a memory map includes identifications of registers and fields that support each intellectual property (IP) block, and available instances of each memory device module representation with available base addresses of the memory device module representations. In one embodiment, an IP block is a module representation except for a memory device module representation. As another example, a memory map includes a cache line size of a cache module representation that supports an IP block, a number of cache lines of the cache module representation, set associativity of the cache module representation, a cache index hash function of the cache module representation, etc. The memory device module representation is used for storing an input or an output of an IP block. It should be noted that a function of a memory device module representation is to store an input or an output. The scenario models 206 further include one or more driver scenario models, one or more application scenario models, and one or more performance scenario models.

In one embodiment, the scenario models 206 include a number of driver scenario models, or a number of application scenario models, or a number of performance scenario models, or one or more stimulus', or one or more expected outputs, or a combination thereof.

In an embodiment, an application scenario model includes a number of driver scenario models. As an example, a driver scenario model is a model of a function that is used with other functions of an application scenario model. In one embodiment, a performance scenario model includes a number of driver scenario models.

In an embodiment, a scenario model that is of a lower level than a higher level model provides randomized services to the higher level model and the higher level model applies a number of constraints to the lower level models. For example, an output of an application scenario model applies a constraint on a driver scenario model, which is included within the application scenario model. In this example, the driver scenario model is not executed or is executed based on limited data values as a result of the constraint. As yet another example, a performance scenario model is at a higher level than an application scenario mode, which is at a higher level than a driver scenario model.

When one or more scenario models are generated before a test that applies the scenario models is executed using a test bench, constraints associated with a driver scenario model is generated before the test is executed. This prior generation of scenario models and of constraints yields tests that are individual, light-weight, repeatable, and simple to debug.

In an embodiment, one of the scenario models 206 includes obtaining a response from an IP block that is powered down or disabled. The IP block is powered down when the IP block is not provided power by a system and power control module representation, which is further described below.

The test file generation module 110 receives the scenario models 206 in a compiled file and parses the compiled file to generate one or more test files 208. For example, the test files 208 include a test file 208A, a test file 208B, and a test file 208C. Each test file 208A, 208B, and 208C includes a scenario model. For example, the test file 208A stores one of the scenario models 206, the test file 208B stores another one of the scenario models 206, and the test file 208C stores yet another one of the scenario models 206.

In one embodiment, a test file includes any number, e.g., one, two, three, etc. of scenario models, etc.

In an embodiment, an event file, further described below, includes a number of expected outputs associated with the number of scenario models.

A hierarchy of the lower and higher levels of the scenario models 206 is used by the test file generation module 110 for generation of the one or more test files 208. For example, one test file stores a driver scenario model and another test file stores an application scenario model that includes the driver scenario model. As another example, one test file stores a performance scenario model and another test file stores an application scenario model.

In one embodiment, a first test file generated by the test file generation module 110 is compiled by a first compiler executed by the processor 101 and a second test file generated by the test file generation module 110 is compiled by a second compiler executed by the processor 101 or by another processor. For example, the first test file is compiled by a compiler of the processor 101 simultaneous with or sequential to compiling of the second test file by another compiler of the processor 101. The compilation of each of the test files 208 by a different compiler is for a design of the SoC in which multiple processors are used. One of the multiple processors executes a function of or within a scenario model that is stored in the first test file and compiled by the first compiler and another one of the multiple processors executes a function of or within another scenario model that is stored in the second test file and compiled by the second compiler.

Examples of the one or more test files 208 include a C file and a C++ file. Other examples of the one or more test files 208 include a Fortran file, an Assembly language file, a distribution application specific language (DASL) file, a D file, an objective-C file, etc., to name a few. It should be noted that in one embodiment, the one or more test files 208 are generated in any other programming language.

In one embodiment, each of the one or more test files 208 is executed randomly by the processor 101 as a micro-kernel running randomized applications, e.g., driver scenario models, etc. Each of the one or more test files 208 when executed randomly calls a number of driver scenario models that is a portion of an application scenario model or a performance scenario model.

In one embodiment, each test file 208A, 208B, and 208C stores a different type of scenario model. For example, the test file 208A stores an application scenario model, the test file 208B stores a driver scenario model, and the test file 208C stores a performance scenario model. In an embodiment, each test file stores the same type of scenario models. For example, the test file 208A stores an application scenario model, the test file 208B stores another application scenario model, and the test file 208C stores yet another application scenario model.

Moreover, the test file generation module 110 parses the compiled file that includes the scenario models 206 to generate one or more events files 210, e.g., an event file 210A, an event file 210B, and an event file 210C. Each of the event files 210 includes a number of expected outputs. For example, the event file 210A includes an expected output for the same type of a scenario model as that of the event files 210B and 210C. To illustrate, the event file 210A includes an expected output of an application scenario model, the event file 210B includes an expected output for another application scenario model, and the event file 210C includes an expected output for yet another application scenario model. As another illustration, the event file 210A includes an expected output of a driver scenario model, the event file 210B includes an expected output for another driver scenario model, and the event file 210C includes an expected output for yet another driver scenario model. As another example, the event file 210A includes an expected output for a different type of scenario model than that of the event files 210B and 210C. To illustrate, the event file 210A includes an expected output of an application scenario model, the event file 210B includes an expected output for a driver scenario model. As another illustration, the event file 210A includes an expected output of a driver scenario model and the event file 210C includes an expected output for a performance scenario model.

Each event file is associated with a corresponding test file. For example, the event file 210A stores an expected output of a scenario model that is stored within the test file 208A, the event file 210B stores an expected output of a scenario model that is stored within the test file 208B, and the event file 210C stores an expected output of a scenario model that is stored within the test file 208C.

In an embodiment, an event file is associated with multiple test files. For example, the event file 210A stores an expected output of a scenario model that is stored within the test file 208A, stores an expected output of a scenario model that is stored within the test file 208B, and stores an expected output of a scenario model that is stored within the test file 208C.

In one embodiment, each event file includes a number of event identifications (IDs), which are further explained below.

The test files 208 are compiled by a compiler 212 to generate one or more compiled files. The compiler 212 is executed by the processor 101. In an embodiment, the compiler 212 is executed by a processor other than the processor 101. The compiled files are provided by the compiler 212 to a test bench 214, which is executed by the processor 101 or by another processor of a computing device.

In an embodiment, a first one of the test files 208 is compiled by a different compiler than a compiler that is used to compile a second one of the test files 208 to generate compiled files for a test bench of the SoC in which multiple processors are used. A module representation, within the test bench, of one of the processors is used to execute at least a portion of a scenario model stored within the first one of the test files 208 and a module representation, within the test bench, of another one of the processors is used to execute at least a portion of a scenario model within the second one of the test files 208.

In one embodiment, a test bench, as described herein, is executed by a processor other than the processor 101 that generates one or more test files. This separation saves a number of CPU cycles of the processor 101 used and reduces load on the processor 101. In an embodiment, a memory device used to store one or more test files is other than a memory device used to store a test bench described herein.

The compiled files that are compiled by the compiler 212 are provided to the test bench 214 to further execute one or more of the module representations A, B, C, D, E, F, and G and/or to execute a fabric 216 and/or to execute a fabric 218. A number of the module representations A, B, C, D, E, F, and G executed within the test bench 214 depends on whether the module representations are designated for execution in the one or more scenario models 206. It should be noted that each fabric 216 and 218 includes one or more links between two or more of the module representations A, B, C, D, E, F, and G. The test bench 214 further includes a number of I/O module representations.

In some embodiments, the test bench 214 is executed by a processor, e.g., a CPU, other than the processor 101. In various embodiments, the test bench 214 is executed by the processor 101.

A comparator 220 is executed by the processor 101 or by another processor of a computing device. In one embodiment, the comparator 220 is generated using a test programming language, e.g., SystemVerilog language, hardware description layer (HDL) language, etc. The comparator 220 receives the events files 210.

In one embodiment, the events files 210 include stimuli. The comparator 220 parses the events files 210 to determine the stimuli and provides the stimuli to one or more I/O module representations of the test bench 214. For example, the comparator 220 provides the stimuli to one or more I/O module representations 222A and 222C of the test bench.

In an embodiment, each test file 208A, 208B, and 208C includes a stimulus for testing an SoC or a design of the SoC. For example, the test file 208A includes a stimulus for providing to a first scenario model, the test file 208B includes a stimulus for providing to a second scenario model, and the test file 208C includes a stimulus for providing to a third scenario model.

Upon receiving stimuli from the comparator 220 or from the compiled file that is received from the compiler 212, the test bench 214 executes one or more scenario models to generate a number of test outputs. For example, as illustrated using a dashed line in the test bench 214, the test bench 214 forward propagates a stimulus from an input node of a module representation A and applies a function of the module representation A to the stimulus to generate an output at an output node of the module representation A. The dashed line provided a direction of execution of a path. The stimulus is received from the comparator 220. The output at the output node of the module representation A is forward propagated by the test bench 214 via the fabric 216 to an input node of a module representation D. The test bench 214 applies a function of the module representation D to the output receive at the input node of the module representation D to generate an output at an output node of the module representation D. The test bench 214 forward propagates the output at the output node of the module representation D via a link to an input node of a module representation E. The test bench 214 further applies a function of the module representation E to the output received at the input node of the module representation E to generate an output at an output node of the module representation E. The output at the output node is forward propagated by the test bench 214 via the fabrics 218 and 216 to an input node of a module representation B.

Continuing with the example, the test bench 214 applies a function of the module representation B to the output received at the input node of the module representation B to generate an output at an output node of the module representation B. The test bench 214 also forward propagates the output at the output node of the module representation B via a link to an input node of a module representation C. Thereafter, the test bench 214 applies a function of the module representation C to the output received at the input node of the module representation C to generate an output at an output node of the module representation C. The output at the output node of the module representation C is forward propagated by the test bench 214 via the fabrics 216 and 218 to an input node of a module representation F. The test bench 214 applies a function of the module representation F to the output received at the input node of the module representation F to generate an output at an output node of the module representation F. The output at the output node F is forward propagated as a test output by the test bench 214 via the I/O module representation 222C to the comparator 220.

As another example, as illustrated using a dotted line in the test bench 214, the test bench 214 forward propagates a stimulus from an input node of the module representation E and applies a function of the module representation E to the stimulus to generate an output at an output node of the module representation E. The dotted line provides a direction of execution of a path. The stimulus is received from the comparator 220. The output at the output node of the module representation E is forward propagated by the test bench 214 via the fabrics 216 and 218 to an input node of the module representation B. The test bench 214 applies a function of the module representation B to the output received at the input node of the module representation B to generate an output at an output node of the module representation B. The test bench 214 forward propagates the output at the output node of the module representation B via a link to an input node of the module representation C. The test bench 214 further applies a function of the module representation C to the output received at the input node of the module representation C to generate an output at an output node of the module representation C.

Continuing with the example, the output at the output node of the module representation C is forward propagated by the test bench 214 via the fabrics 216 and 218 to an input node of the module representation F. The test bench 214 applies a function of the module representation F to the output receive at the input node of the module representation F to generate an output at an output node of the module representation F. The output at the output node F is forward propagated as a test output by the test bench 214 via the I/O module representation 222C to the comparator 220.

It should be noted that in one embodiment, as indicated by the dashed line in FIG. 2A-2, the forward propagation from the module representation A via the module representations D, E, B, C, and F is an example of a first performance scenario model or an application scenario model. In this embodiment, as indicated by the dotted line in FIG. 2A-2, the forward propagation from the module representation E via the module representations B and C to the module representation F is an example of a second performance scenario model or an application scenario model.

The comparator 220 compares the test outputs received from the I/O module representation 222C with corresponding expected outputs that are parsed by the comparator 220 from the events files 210 to generate a result, e.g., test fail, test pass, etc. For example, upon determining that a first one of the test outputs received from the I/O module representation 222C matches the expected output of the event file 210A or are within a corresponding pre-determined threshold of the expected output and upon determining that a second one of the test outputs received from the I/O module representation 222C matches an expected output within the event file 210B or are within a corresponding pre-determined threshold of the corresponding expected output, the comparator 220 determines that both the first and second performance scenario models passed a test. On the other hand, upon determining that the first test output does not match or is not within the pre-determined threshold of the expected output of the event file 210A, the comparator 220 determines that the first performance scenario model failed a test and upon determining that the second test output does not match or is not within the pre-determined threshold of the expected output of the event file 210B, the comparator 220 determines that the second performance scenario model failed a test.

In an embodiment, when both the first and second performance scenario models pass a test, the SoC scenario models 206 pass a test. In one embodiment, when one or both the first and second performance scenario models fail a test, the SoC scenario models 206 fail a test.

In one embodiment, a test output corresponds to an expected output when both the test output and the expected output have an event ID. For example, the test file generation module 110 generates the one or more events files 210, which include event IDs for each expected output. Also, the test file generation module 110 generates the one or more test files 208, which include the event IDs. When a scenario model is executed within a test bench, one of the event IDs is generated and then sent with a test output having the event ID to the comparator 220. The comparator 220 determines the corresponding expected output when the event ID received from the test bench matches that of expected output. In an embodiment, each event ID is mapped to a scenario model by the processor 101.

In one embodiment, the comparator 220 determines which scenario model to execute based on an event ID of the scenario model. For example, the comparator 220 randomly identifies an event ID mapped to a scenario model and sends a signal to the test bench including the event ID for execution of the scenario model in the test bench.

In an embodiment, the comparator 220 is executed by a processor other than the processor 101 and/or a processor that executes a test bench. This saves CPU cycles by offloading result checks to the comparator 220. In one embodiment, the one or more events files 210 are stored in a memory device other than a memory device that stores a test bench and/or a memory device that stores the one or more test files 208.

In one embodiment, one or more test files, described herein, store a variety of information e.g., a sequence in which register operations are performed, a sequence in which IP blocks are driven, memory addresses that are to be used to perform a test, functions performed by components of an SoC to which a test is to be applied, a test bench identifier that identifies a test bench used to test the SoC, a manner of logging messages regarding passage or failure of the test, a manner of checking data, etc.

In one embodiment, a number of test files are generated in a manner described above for different test benches and for different SoCs. The generation of the test files allows for easy re-use of the test files.

In an embodiment, the SoC scenario models 206 mimic a hierarchy of services that are provided by an operating system, e.g., a Linux™ operating system, an Android™ operating system, a Windows™ operating system, a Unix operating system, a Chromium™ operating system, an OS X™ operating system, etc.

In one embodiment, the comparator 220 generates one or more debug messages that indicate a result of a comparison between a test output and an expected output. For example, upon determining that a test output does not match a corresponding expected output, the comparator 220 generates a message indicating the same or that a test failed.

In an embodiment, the comparator 220 stores a debug message within one or more files. For example, the comparator 220 stores a message indicating that a scenario model of a file failed a test below or adjacent to the scenario model.

In one embodiment, a comparison performed by the comparator 220 is performed by the test bench 214 instead of by the comparator 220. In this embodiment, expected outputs that are within the events files 210 are instead stored within the test files 208. For example, an expected output of a scenario model is stored within the test file 208A that includes the scenario model. As another example, an expected output of a scenario model is stored within the test file 208B that includes the scenario model.

In one embodiment, the SoC scenario models 206 include memory allocation of one or more memory devices or of one or more memory device module representations. For example, when data is accessed from a memory device module representation and/or is written to a memory device module representation and a limited number of memory device module representations are available for use with the SoC scenario models 206, one or more of the memory device module representations are assigned to an IP block for writing data or for reading data.

In an embodiment, the SoC scenario models 206 include handling of interrupts. For example, when a first one of the SoC scenario models 206 is being executed, a second one of the SoC scenario models 206 interrupts the first SoC scenario model. The processor 101 executes the second SOC scenario model before finishing execution of the first SOC scenario model.

In one embodiment, the first SoC scenario model is executed by a first processor, e.g., the processor 101, and the second SoC scenario model is executed by a second processor of the computing device.

In an embodiment, a first computer thread executed by the processor 101 includes the first SoC scenario model and a second computer thread executed by the processor 101 includes the second SoC scenario model.

In one embodiment, the SoC scenario models 206 include management of I/Os and I/O module representations. For example, an I/O module representation is used to transfer test output and/or expected output. When a limited number of I/O module representations is available for use with the SoC scenario models 206, the I/O module representations are managed based on a time of transfer of outputs. To further illustrate, a module representation waits to use an I/O module representation before another module representation completes sending or receiving an output via the I/O module representation.

In an embodiment, the SoC scenario models 206 include debugging of an SoC or of modules within a test bench. The debugging is performed based on a result of a test. For example, when a test fails, the processor 102 executes the SoC scenario models 206 to debug a module within a test bench. The debugging is performed to fix the module to further facilitate passing of the test by the module.

In an embodiment, one of the event files 210 stores an expected output of a scenario model and one of the test files 208 stores the scenario model. In this embodiment, another one of the event files 210 stores another expected output of another scenario model and another one of the test files 208 stores the other scenario model.

In some embodiments, the test file generation module 110 and the compiler 212 are executed by a processor that executes the test bench 214. For example, instead of the processor 101 executing the test file generation module 110 and another processor executing the compiler 212, both the test file generator module 110 and the compiler 212 are executed by a processor that executes the test bench 214.

It should be noted that in one embodiment, the test file generation module 110 is executed by a processor, the compiler 212 is executed by another processor, and the test bench 214 is executed by yet another processor.

FIG. 2B-1 is a diagram of an embodiment of a system 250 to illustrate an example of the test bench 214 of FIG. 2A-2. The system 250 is similar to the system 200 of FIGS. 2A-1 and 2A-2 except that the system 250 includes a universal verification methodology (UVM) test bench 252, which is an example of the test bench 214 (FIG. 2A-2). The UVM test bench 252 is a register transfer level (RTL) abstraction that is generated using the test programming language. UVM is a methodology for verifying designs of integrated circuit (IC) chips. In an embodiment, UVM includes a library that brings automation to a SystemVerilog language, such as, sequences and data automation features. Examples of the data automation features include packing, copying, comparing, etc.

The UVM test bench 252 includes module representations 254, which are examples of module representations of components of a digital camera. The module representations 254 include a CPU module representation, a memory device module representation, an image processor module representation, a camera module representation, a display controller module representation, and a secure digital (SD) card module representation. The module representations 254 further include fabrics 216 and 218, and a system and power control module representation. The system and power control module representation provides power to the image processor module representation, the memory device module representation, the CPU module representation, the SD card controller module representation, the display controller module representation, and the camera module representation, and manages the provision of power. It should be noted that the CPU module representation is an example of the module representation A (FIG. 2A-2), the memory device module representation is an example of the module representation B (FIG. 2A-2), the image processor module representation is an example of the module representation C (FIG. 2A-2), the camera module representation is an example of the module representation D (FIG. 2A-2), the display controller module representation is an example of the module representation E (FIG. 2A-2), the SD card module representation is an example of the module representation F (FIG. 2A-2), and the system and power control module representation is an example of the module representation G (FIG. 2A-2).

In an embodiment, a module representation includes sub-module representations and sub-links between the sub-module representations. For example, the camera module representation includes an analog-to-digital (A-to-D) converter sub-module representation, a gain amplifier sub-module representation, and a clock sub-module representation. A digital end of the A-to-D converter sub-module representation is connected via a sub-module link to the gain amplifier sub-module representation, which is connected via a link to the CPU module representation and via another link to the display controller module representation. An analog end of the A-to-D converter sub-module representation is connected via a sub-link to a charge-coupled device (CCD). Moreover, the clock sub-module representation is connected via a link to the CCD to provide a clock signal to the CCD.

The CCD converts light energy, e.g., photons, etc., into electrical energy, e.g., electrons, etc. The A-to-D converter performs a function of converting analog data that is received from the CCD into a digital signal that includes digital data. The gain amplifier sub-module representation performs a function of amplifying a magnitude of the digital signal. In an embodiment, the clock sub-module representation performs functions of generating and providing a clock signal to the camera module representation and/or to other module representations that are connected to the camera module representation.

In one embodiment, the comparator 220 is connected to one or more of the module representations A, B, C, D, E, F, and G (FIG. 2A-2) that are being executed within a test bench to provide one or more stimulus' to the one or more module representations and/or to receive one or more test results from the one or more module representations. For example, the comparator 220 is connected to the processor module representation, and/or the memory device module representation, and/or the CPU module representation, and/or the SD card controller module representation, or the display controller module representation, and/or the camera module representation, and/or the system and power control module representation. To further illustrate, a test file includes a scenario model to be executed by one or more module representations of a test bench. The one or more module representations of the test bench are programmed to perform a function. The function indicates that the one or more module representations provide a signal to the comparator 220 to receive data from the comparator 220. Upon receiving the signal, the comparator 220 provides the data to the one or more module representations of the test bench connected to the comparator 220 to facilitate execution of the scenario model within the test bench. The scenario model is executed to test the one or more module representations. The comparator 220 receives a test output generated by the module representations based on the scenario model within a test file and compares the test output with an expected output.

In an embodiment, the comparator 220 receives the test output from a memory location of a memory device of the computing device. The test output is stored in the memory location by one or more module representations of the test bench. A processor that executes the test bench is coupled to the memory device.

In one embodiment the comparator 220 receives the test output from a memory queue of one or more memory devices of the computing device. The test output is stored in the memory queue by one or more module representations of the test bench. To illustrate, during an emulation stage of a project, which is further described below, the comparator 220 requests, at pre-determined intervals, a processor executing the test bench to pause execution of the test bench to read the test output from the memory queue at the pre-determined intervals. The processor that executes the test bench is coupled to the one or more memory devices having the memory queue.

In an embodiment, the comparator 220 receives the test output from a memory queue within an I/O interface, e.g., a UART, etc., between the comparator 220 and a processor that executes the test bench. The test output is stored within the memory queue of the I/O interface by one or more module representations of the test bench. The processor that executes the test bench is coupled to the I/O interface.

In one embodiment, the comparator 220 receives the test output, e.g., messages, etc., from a log file stored in a memory device that is coupled to a processor executing the test bench. The test output is stored in the log file by one or more module representations of the test bench. The test output is post-processed by the comparator 220 after execution of the test bench is completed to generate the test output. The processor that executes the test bench is coupled to the memory device.

FIG. 2B-2 is a diagram of an embodiment of the UVM test bench 252 to illustrate multiple application scenario models. One of the application scenario models is illustrated in dashed lines in FIG. 2B-2. The application scenario model is of storing an image that is displayed on a display device into an SD card. As shown by the dashed lines, an image from the display device is read by the display controller module representation via an I/O module representation to generate image data. The image data is sent by the display controller module representation via the fabrics 218 and 216 to the memory device module representation for storage. The image processor module representation retrieves the image data stored in the memory device module representation and processes, e.g., encodes, etc., the image data to generate encoded image data. The encoded image data is sent from the image processor module representation via the fabrics 216 and 218 to the SD card controller module representation. The SD card controller module representation writes the encoded image data to the SD card via an I/O module representation.

Moreover, another one of the application scenario models is illustrated by solid lines. The application scenario model is that of retrieving an image from the SD card to display on the display device. The SD card controller module representation reads via an I/O module representation the encoded image data that is stored in the SD card. The SD card controller module representation sends the encoded image data to the image processor module representation via the fabrics 216 and 218. The image processor module representation decodes the encoded image data and provides the decoded image data to the memory device module representation for storage. The display controller module representation reads the decoded image data from the memory device module representation via the fabrics 216 and 218 and sends the decoded image data via an I/O module representation to the display device. The display device receives the decoded image data and renders the decoded image data for displaying an image.

Figure 3:
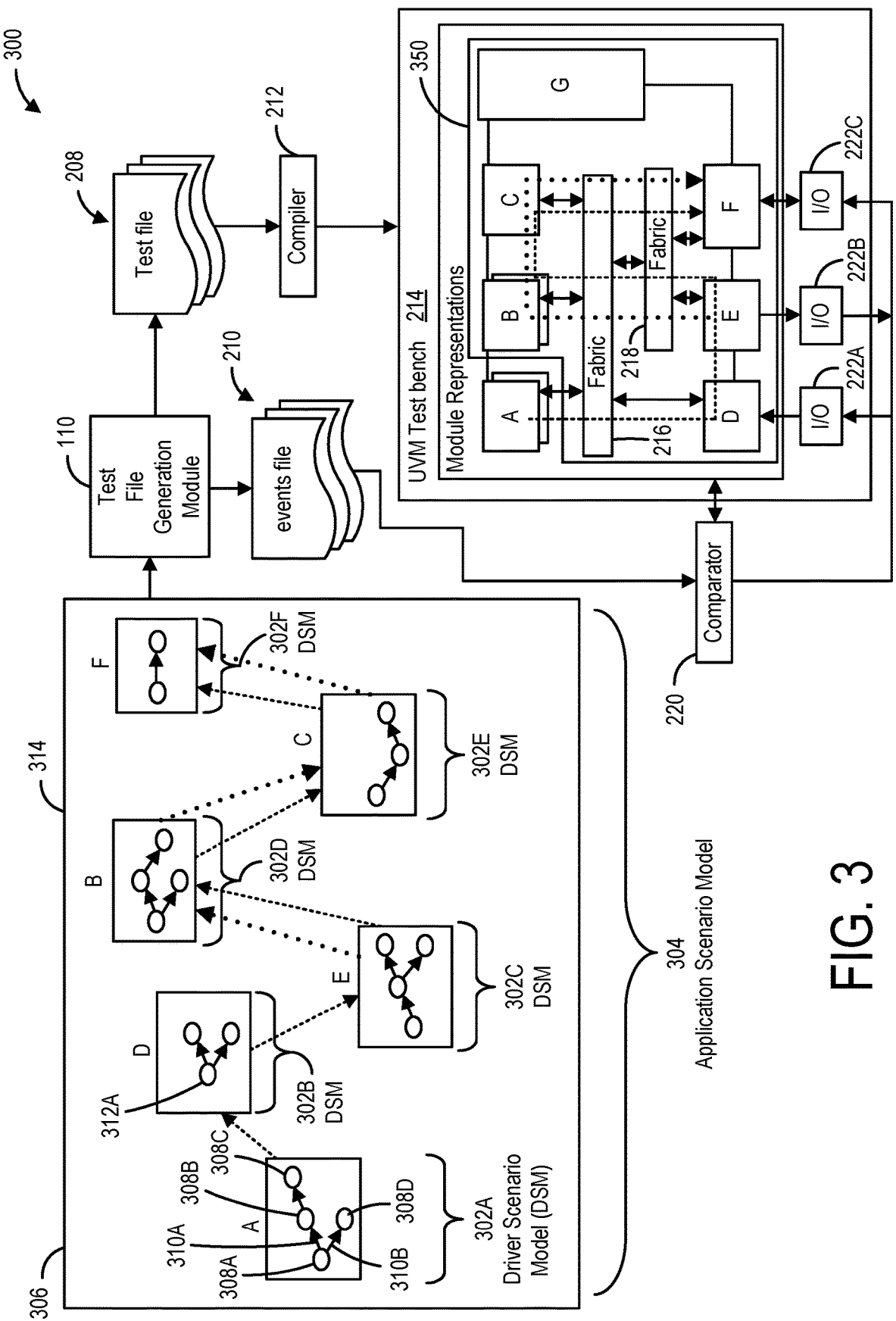

FIG. 2B-3 is a diagram of an embodiment of a graph 260 to illustrate multiple application scenario models. A first one of the application scenario models is reading encoded image data from an SD card and decoding the encoded image data for display of an image on a display device. An SD card controller module representation reads the encoded image data from the SD card and provides the encoded image data to an image processor module representation. The image processor module representation decodes the encoded image data to generate decoded image data. A display controller module accesses the decoded image data from the image processor module representation and sends the decoded image data to the display device for display of an image.

A second one of the application scenario models is reading the encoded image data from the SD card for display of an encoded image on the display device. In one embodiment, instead of reading the encoded image data, decoded image data that is stored in the SD card is read. The SD card controller module representation reads the encoded image data from the SD card. The display controller obtains the encoded image data from the SD card controller module representation and provides the encoded image data to the display device for display of the encoded image on the display device.

A third one of the application scenario models is capturing image data and encoding the image data for storage in an SD card. A CCD captures image data by converting photons into electrons. A camera module representation processes, e.g., converts from an analog form into a digital form, provides a gain, etc., to the image data that is captured and provides the processed image data to the image processor module representation. The image processor module representation encodes the processed image data to generate encoded image data. The SD card controller module representation obtains the encoded image data from the image processor module representation and writes the encoded image data to the SD card.

A fourth one of the application scenario models is capturing image data and storing the image data. The CCD module representation captures the image data. The camera module representation processes the image data that is captured to generate processed image data. The SD card controller module representation obtains the processed image data from the camera module representation and writes the processed image data to the SD card.

A fifth one of the application scenario models is capturing image data and displaying the image data. The CCD module representation captures the image data. The camera module representation processes the image data that is captured to generate processed image data. The display controller module representation accesses the processed image data from the camera module representation and displays the processed image data as an image on the display device.

FIG. 2B-4 is a diagram of an embodiment of a graph 270 to illustrate an application scenario of power management. The system and power control module representation is an IP block that manages two power domains, D0 and D1. The power domain D0 includes providing or removing power from the camera module representation. Moreover, the power domain D1 includes providing or removing power from the image processor module representation, the SD card controller module representation, and/or the display controller module representation.

The power management application scenario is generated by the processor 101 based on a use application scenario to be tested by the UVM test bench 252 (FIG. 2B-2). For example, upon determining by the processor 101 that the use application scenario does not involve using the camera module representation, the processor 101 determines that power is not to be provided by the system and power control module representation to the camera module representation. The provision of power to the camera module representation is not made a part of the power management application scenario by the processor 101. Moreover, the processor 101 determines that the use application scenario involves decoding imaged data or encoding image data, or reading image data from the SD card or writing image data to the SD card, or displaying an image. Upon determining that the use application scenario involves decoding imaged data or encoding image data, the processor 101 determines that the power management application scenario involves provision of power by the system and power control module representation to the image processor module representation. Similarly, upon determining that the use application scenario involves reading image data from the SD card or writing image data to the SD card, the processor 101 determines that the power management application scenario involves provision of power by the system and power control module representation to the SD card controller module representation. Moreover, upon determining that the use application scenario involves displaying an image, the processor 101 determines that the power management application scenario involves provision of power by the system and power control module representation to the display controller module representation.

FIG. 3 is a diagram of an embodiment of a system 300 to illustrate use of use of driver scenario models (DSMs) 302A, 302B, 302C, 302D, 302E, and 302F, and use of an application scenario model 304. The driver scenario model 302A is executed within the module representation A, the driver scenario model 302B is executed within the module representation D, the driver scenario model 302C is executed within the module representation E, the driver scenario model 302D is executed within the module representation B, the driver scenario model 302E is executed within the module representation C, and the driver scenario model 302F is executed within the module representation F. Each driver scenario model 302A, 302B, 302C, 302D, 302E, or 302F includes one or more sub-module representations. For example, the driver scenario model 302A includes a sub-module representation 308A, a sub-module representation 308B, a sub-module representation 308C, and a sub-module representation 308D. When a driver scenario model includes multiple sub-module representations, the driver scenario model includes sub-links between the sub-module representations. For example, a sub-link 310A connects the sub-module representation 308A to the sub-module representation 308B and a sub-link 310B connects the sub-module representation 308A to the sub-module representation 308D. An example of a sub-module representation includes a decision making sub-module representation that is executed by the processor 101 to make a decision between a number of choices. Another example of a sub-module representation includes a choice made after a decision.

The application scenario model 304 includes the driver scenario models 302A, 302B, 302C, 302D, 302E, and 302F and links between the driver scenario models. For example, the application scenario model 304 includes the driver scenario models 302A, 302B, 302C, 302D, 302E, and 302F, a link between the model 302A and the model 302B, a link between the model 302B and the model 302C, a link between the model 302C and the model 302D, a link between the model 302D and the model 304E, and a link between the model 302E and the model 302F.

It should be noted that the sub-module representation 308A receives a expected output at an output node of the driver scenario model 302A. The sub-module representation 308A is executed by the processor 101 to generate an intermediate output to be provided to the sub-module representation 308B for further processing and to generate another intermediate output to be provided to the sub-module representation 308D for further processing. In this manner, the expected output at the output node of the driver scenario model 302A is back propagated via the driver scenario model 302A to generate one or more test inputs at one or more input nodes of the driver scenario model 302A. The test input to driver scenario model 302A is the expected output of driver scenario model 302B. The expected outputs are provided to a sub-module representation 312A of the driver scenario model 302B for further processing and back propagation. In this manner the expected output at the output node of the driver scenario model 302A is propagated via the driver scenario models 302B, 302C, 302D, 302E, and 302F to generate one or more test inputs at one or more input nodes of the driver scenario model 302F.

It should further be noted that the module representations B, C, D, E, F, and G of the UVM test bench 214 and connections between the module representations form a group 350.

The application scenario model 304 is a part of an SoC scenario model 314, which is an example of one of the SoC scenario models 206 (FIG. 2A-2).

FIG. 4-1 is a diagram of an embodiment of a system 400 to illustrate horizontal and vertical integration of an SoC scenario model 402 in various stages of the project of developing a post-silicon SoC. The horizontal and/or vertical integration allows for an increase in a return on investment from generating the SoC scenario models 206 (FIG. 2B-1). The SoC scenario model 402 is an example of one of the SoC scenario models 206. The SoC scenario model 402 includes a driver scenario model 404. In one embodiment, the driver scenario model 404 is not a portion of the SoC scenario model 402.

The test file generation module 110 identifies the driver scenario model 404 from a compiled file and provides the driver scenario model 404 to a UVM test bench 406. The UVM test bench 406 includes an IP block that is coupled to an I/O module representation 408 and to another I/O module representation 410. It should be noted that in one embodiment, an I/O IP block is a bus verification intellectual property (VIP). In an embodiment, a VIP provides an abstraction of a stimulus and monitoring used to verify functioning, e.g., operability, etc., of a module representation. Each of the module representations A, B, C, D, E, F, and G (FIG. 3) is an example of the IP block.

In one embodiment, instead of providing the driver scenario model 404 to the UVM test bench 406, the test file generation module 110 generates a file that includes the driver scenario model 404 and the file is compiled to generate a compiled file. The compiled file is provided to the UVM test bench 406 for execution.

The IP block is tested in the UVM test bench 406 when the processor 101 applies the driver scenario model 404 to the UVM test bench 406. For example, a stimulus is provided to the IP block via the I/O module representation 410. The UVM test bench 408 is executed by the processor 101 to apply a function of the IP block to the stimulus to generate a test output. The test output is retrieved via the I/O module representation 408 and compared with an expected output to determine whether the IP block passed a test. The UVM test bench 406 is executed by the processor 101 for testing the driver scenario model 404 at an IP stage of the project.

In one embodiment, the scenario model 404 is a portion of the scenario model 402 and is extracted by the test file generation module 110 from the scenario model 402.

The SoC scenario model 402 is identified from a compiled file by the test file generation module 110 and is provided by the test file generation module 110 to a UVM test bench 412. The UVM test bench 412 is similar to the test bench 214 (FIG. 2A-2) except that in the UVM test bench 412 the CPU module representation 214 is replaced with a bus VIP. In one embodiment, the bus VIP 420 is less costly to build than the CPU module representation of the UVM test bench 214. Also, the bus VIP 420 allows for greater throughput, faster simulation, and easier debug than that allowed by the CPU module representation 214.

In one embodiment, instead of providing the SoC scenario model 402 to the UVM test bench 412, the SoC scenario model 402 is identified from a compiled file by the test file generation module 110 to generate a test file and the test file is compiled by a compiler to generate a compiled file. The compiled file generated from the test file is provided by the compiler to the UVM test bench 412.

In an embodiment, a bus VIP and a bus functional module (BFM) are used interchangeably herein.

In an embodiment, the bus VIP 420 provides a lesser amount of functionality compared to that of the CPU module representation in the UVM test bench 214 and the bus VIP 420 is easier to construct and use compared to construction and use of the CPU module representation. The bus VIP 420 is connected to the module representation B and to the fabric 216.

The SoC scenario model 402 identified from a compiled file by the test file generation module 110 and provided to the UVM test bench 412 is also provided to the test bench 214. It should be noted that the UVM test bench 412 is applied to the SoC scenario model 402 at a subsystem stage of the project and the UVM test bench 214 is applied to the SoC scenario model 402 at an SoC stage of the project. It should be noted that the IP, the subsystem, and the SoC stages are simulation stages of the project.

In one embodiment, instead of providing the SoC scenario model 402 to the UVM test bench 214, the compiled file generated based on the test file that is created by the test file generation module 110 and provided to the UVM test bench 412 is also provided to the test bench 214.

The vertical integration is provided when the same driver scenario model 404 is applied at the IP, subsystem and SoC levels of the project. Moreover, the vertical integration is provided when the same SoC scenario model 402 is applied at the subsystem and SoC levels of the project.

Also, the SoC scenario model 402 is identified from a compiled file by a test file generation module 452, and the SoC scenario model 402 is provided by the test file generation module 452 to an emulator of the post-silicon SoC. The test file generation module 452 is executed by the processor 101 or by another processor. The emulator is tested using the SoC scenario model 402.

In one embodiment, instead of providing the SoC scenario model 402 to the emulator, the compiled file that includes the SoC scenario model 402 is parsed by a test file generation module 452 to generate a test file, and the test file is compiled by the test file generation module 452 to generate a compiled file. The compiled file generated from the test file is provided to the emulator of the post-silicon SoC In one embodiment, the emulator is a hardware, e.g., silicon chip, silicon chip with integrated circuits, etc., or software or both that duplicates the functions of the post-silicon SoC. When the emulator is hardware, it is controlled by the processor 101 or by another processor. In this embodiment, a behavior of the emulator closely resembles that of the post-silicon SoC. The testing of the emulator is performed using the SoC scenario model 402 at the emulation stage of the project.

Moreover, the scenario model 402 that is identified by the test file generation module 452 from a compiled file is provided by the processor 101 to a prototype of the post-silicon SoC. In one embodiment, the prototype of the post-silicon SoC is more customized to the post-silicon SoC than the emulator. For example, the emulator is commercially available and has a limited number of sizes of memory devices and the post-silicon SoC is built in a lab with a higher variety of sizes of memory devices. As another example, the emulator has buses that have a limited number of speeds of transfer of data and the prototype includes custom designed buses that operate at a higher number of speeds of data transfer. The prototype is tested using the same scenario model 402 used to test the emulator. The testing of the prototype using the SoC scenario model 402 is performed at a prototyping stage of the project. In an embodiment, during the prototyping stage, instead of the prototype, the post-silicon SoC is used directly to enable the user to test the post-silicon SoC at a real-world operating frequency of the post-silicon SoC with real-world stimulus.

Furthermore, the SoC scenario model 402 used to test the emulator and the prototype is also used to test the post-silicon SoC. The testing of the post-silicon SoC is performed using the SoC scenario model 402 at a post-silicon stage of the project.

In one embodiment, instead of providing the SoC scenario model 402 to the prototype of the post-silicon Soc, the compiled file that includes the SoC scenario model 402 is parsed by the test file generation module 452 to generate a test file, and the test file is compiled by the test file generation module 452 to generate a compiled file. The compiled file generated from the test file is provided to the prototype of the post-silicon SoC.

In an embodiment, instead of providing the SoC scenario model 402 to the post-silicon Soc, the compiled file that includes the SoC scenario model 402 is parsed by the test file generation module 452 to generate a test file, and the test file is compiled by the test file generation module 452 to generate a compiled file. The compiled file generated from the test file is provided to the post-silicon SoC. In one embodiment, a scenario model that is used to test the emulator, the prototype, and the post-silicon SoC is similar to a scenario model that is applied to the UVM test bench 214 and to the UVM test bench 412 except that the scenario model for the emulator, the prototype, and the post-silicon SoC excludes expected outputs. The expected outputs are stored within a memory device of the emulator, or the prototype, or the SoC. In this embodiment, the emulator is made of hardware or a combination of hardware and software.

In one embodiment, a scenario model that is used to test the UVM test bench 214, the emulator, the prototype, and the post-silicon SoC is stored within a different test file for provision to each of the UVM test bench 214, the emulator, the prototype, and the post-silicon SoC. For example, the SoC scenario model 402 is stored within a test file that is provided to the UVM test bench 214, the SoC scenario model 402 is stored within another test file that is provided to test the emulator, the SoC scenario model 402 is stored within yet another test file that is provided to test the prototype, and the SoC scenario model 402 is stored within still another test file that is provided to test the post-silicon SoC.

The horizontal integration is provided when the SoC scenario model 402 is used to test the emulator, the prototype, and the post-silicon SoC, and the UVM test bench 214.

It should be noted that in one embodiment, a re-use of SoC scenario models at various stages of the project results in a structured approach to SoC function verification. For example, each component of an SoC is individually tested and tested in conjunction with use of other components of the SoC. To further illustrate, when each driver scenario model is individually tested, each component of an SoC is individually tested at a software level, and when each application scenario model is tested, use of the component with one or more of remaining components of the SoC is tested at a software level.

In one embodiment, the SoC scenario model 402 includes a module representation of a processing function of a CPU, and the processing function is performed by the bus VIP 420 of the test bench 412 or by the CPU module representation of the test bench 214.

In an embodiment, the same direction of execution of a path is used within both the UVM test bench 412 and the UVM test bench 214. For example, a direction of execution of a path that is shown by the dashed line in FIG. 2A-2 is used in both the UVM test bench 412 and the UVM test bench 214.

In one embodiment, a test file is not generated by the test file generation module 110 and is not provided to a UVM test bench, e.g., the UVM test bench 412, the UVM test bench 454, etc. A VIP, e.g., bus VIP 420, I/O VIP, etc., of the UVM test bench is not able to execute a computer program, e.g., a scenario model, etc., but is able to follow instructions, e.g., Assembly language instructions, etc. The instructions are generated by the test file generation module 110 based on a scenario model. For example, an instruction includes reading a register, writing to a register, reading from a memory address, moving data, jumping to a memory address, initiating a variable, resetting a register, enabling a module representation, disabling a module representation, changing a configuration of a module representation, changing a configuration of a sub-module representation, changing a manner in which a sub-module representation completes execution of its function, etc. To further illustrate, an instruction includes a function of a sub-module representation. The instructions are received from the test file generation module 110 by the VIP of the UVM test bench. Moreover, the test file generation module 110 does not generate an event file for providing to the UVM test bench. The VIP of the UVM test bench executes the instructions to generate a test result. The test result is received from the VIP by the test file generation module 110 and a comparison of the test result with an expected output is performed by the test file generation module 110 to determine whether an SoC passed a test based on a scenario model. The scenario model is constructed based on the SoC.

Comparatively, in one embodiment, a CPU of the UVM test bench 214 receives a compiled file that includes the scenario model and executes the scenario model to generate a test output. The test output is compared by the comparator 220 with an expected output of one of the events files 210 to determine whether the SoC passed a test.

FIG. 4-2 is a diagram of an embodiment of a system 450 to illustrate multi-level design support. An SOC scenario model 453 is generated. The SoC scenario model 453 is an example of one of the SoC scenario models 206 (FIG. 2B-1). The SoC scenario model 453 includes a driver scenario model that further includes use of the C module representation and further includes use of the remaining module representations A, B, E, F, G, and H.

The SoC scenario model 453 is provided within a compiled file to the test file generation module 110. The test file generation module 110 parses the compiled file to generate a test file having the driver scenario model that includes use of the C module representation and the test file is compiled to test the driver scenario model in a UVM test bench 454, which is an example of the UVM test bench 406 (FIG. 4-1). The test file excludes the remaining module representations A, B, E, F, G, and H.

In one embodiment, the test file generation module 110 parses the compiled file to identify a scenario model, which is provided to the UVM test bench 454 for testing without generating a test file including the scenario model.

The test file that stores the scenario model 453 is compiled by a compiler. The compiled test file is provided by the compiler to the UVM test bench 412 for applying the scenario model 453.

In one embodiment, instead of the compiled test file, the scenario model 453 is provided by the test file generation module 110 to the UVM test bench 412 for applying the scenario model 453.

Moreover, the same compiled file that is provided to the UVM test bench 412 is provided to the UVM test bench 214. Furthermore, the one or more events files 210 are generated by the test file generation module 110 from the scenario model 453. One or more test outputs generated from the UVM test bench 214 are compared by the comparator 220 to corresponding one or more expected outputs to determine whether an SoC passed a test.

It should be noted that the same scenario model 453 is used to generate test files for different test benches 214, 412, and 454.

In an embodiment, the test file generation module 110 generates different events files and different test files for different test benches. For example, the test file generation module 110 generates one or more test files for the test bench 454 and generates one or more test files for the UVM test bench 412. Each test file for the test bench 454 includes a scenario model that is executed within the test bench 454. Comparatively, each test file for the UVM test bench 412 includes a scenario model that is executed within the UVM test bench 412. As another example, the test file generation module 110 generates one or more event files for the test bench 454 and generates one or more events files for the UVM test bench 412. Each events file for the test bench 454 includes an expected output for a scenario model that is executed within the test bench 454. Comparatively, each events file for the UVM test bench 412 includes an expected output for a scenario model that is executed within the UVM test bench 412.

In one embodiment, the use of the scenario model 453 in the UVM test bench 214 to generate one or more test outputs, which are compared to corresponding expected outputs, is an application of a performance scenario model. On the other hand, use of the scenario model 453 in the UVM test bench 412 is an application of an application scenario model. It should be noted that in this embodiment, there is no comparison of test outputs generated using the test bench 412 with expected outputs to determine whether a performance constraint is achieved.

Figure 5:
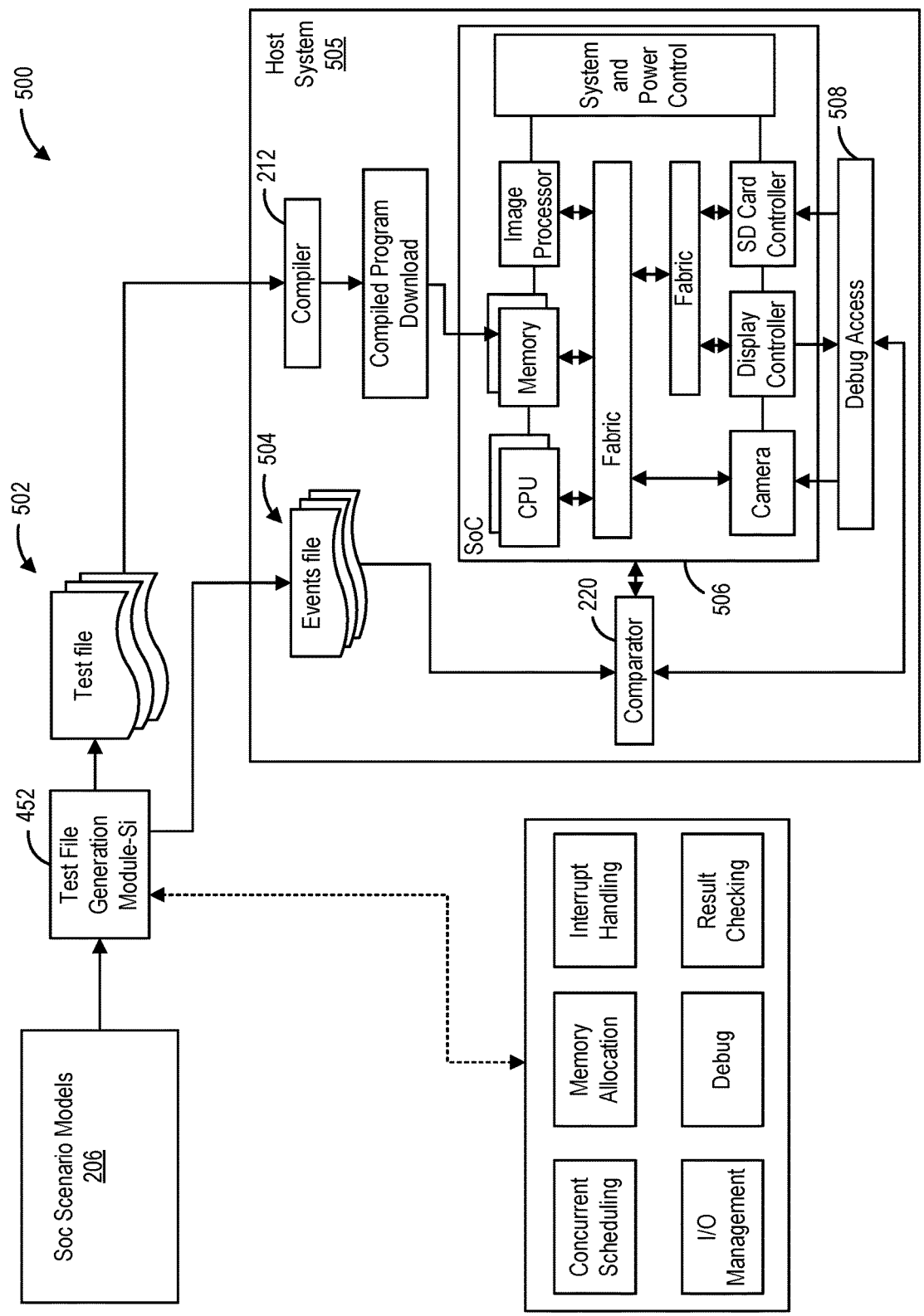
FIG. 5 is a diagram of a system to illustrate use of an SoC scenario models to test an SoC, in accordance with one embodiment described in the present disclosure.

FIG. 5 is a diagram of an embodiment of a system 500 to illustrate use of the SoC scenario models 206 to test a post-silicon SoC, e.g., an SoC 506, etc. The SoC 506 is a hardware chip that includes integrated circuits, e.g., a CPU, a memory device, an image processor, fabrics, a camera, a display controller, and an SD card controller, etc., are located.

In one embodiment, the SoC scenario models 206 are used to test the emulator or the prototype instead of or in addition to testing the post-silicon SoC. The SoC scenario models 206 are provided to the test file generation module 452, which generates a test file for each of the SoC scenario models 206. In one embodiment, a test file stores any number of scenario models.

The test file generation module 452 generates one or more test files 502 and each test file stores one of the SoC scenario models 206 and/or one or more stimulus' associated with the SoC scenario model. Moreover, the test file generation module 452 identifies one or more expected outputs from the SoC scenario models 206 in a manner similar to that described above with reference to FIG. 1A. The test file generation module 452 generates one or more events files 504 that include the expected outputs identified from the SoC scenario models 206. It should be noted that in one embodiment, the test file generation module 452 performs the operations of concurrent scheduling, memory allocation, interrupt handling, I/O management, debugging, and/or result checking on the SoC scenario models 206 to generate the one or more test files 502 and/or the one or more events files 504.

The one or more events files 504 are provided by a processor of a host system 505 to the comparator 220, which is also executed by the processor of the host system 505. The comparator 220 parses the one or more events files 504 to identify one or more expected outputs. Examples of the host system 505 include a desktop computer, a laptop computer, a computing device, a tablet, a smart phone, a smart television, etc. In one embodiment, the host system 505 is implemented on a circuit board.

In one embodiment, the compiled file includes one or more stimulus' for stimulating an input node of an integrated circuit of the SoC 506.

The one or more test files 502 are provided to the compiler 212. In one embodiment, the compiler is executed by the processor of the host system 505. In an embodiment, the processor 101 is the processor of the host system 505.

The compiler 212 generates a compiled file from the one or more test files 502 and provides the compiled file to an SoC 506. When the compiled file is downloaded to the SoC 506, the SoC scenario models 206 are executed by the processor of the host system 505. The execution of the SoC scenario models 206 include applying the one or more stimulus' to one or more input nodes of an integrated circuit of the SoC 506. The one or more stimulus' are received within the compiled file.

In one embodiment, the one or more stimulus' are received from the comparator 220 via a debug access 508. In this embodiment, the one or more stimulus' are included within the one or more events files 504 by the test file generation module 452.

In an embodiment, the debug access 508 includes one or more I/Os.

In one embodiment, an I/O is an interface that has logic to interpret an address of an integrated circuit of the SOC 506 and to interpret an address of the comparator 220. In one embodiment, an I/O converts serial data to parallel data and vice versa.

The application of the SoC scenario models 206 to the SoC 506 generates one or more test outputs. The one or more test outputs are provided by the processor of the host system 505 via the debug access 508 to the comparator 220. The comparator 220 compares the one or more test outputs with corresponding one or more expected outputs to determine whether the SoC 506 passed a test. For example, upon determining that one of the test outputs does not match or is not within the pre-determined threshold of a corresponding one of the expected outputs, the comparator 220 determines that the SOC 506 failed the test. As another example, upon determining that one of the test outputs matches a corresponding one of the expected outputs or is within the pre-determined threshold of a corresponding one of the expected outputs, the comparator 220 determines that the SOC 506 passed the test.

It should be noted that in one embodiment, the SOC 506 is located outside the host system 505. For example, the SOC 506 connected to the host system 505 via a USB port, or a parallel port, or a serial port, etc., of the host system 505.

In one embodiment, the scenario models 206 include concurrent scheduling, e.g., execution, etc., of two or more scenario models. For example, the processor 101 concurrently executes two application scenario models of the scenario models 206. In an embodiment, the scenario models 206 include concurrent scheduling of two or more driver scenario models. In one embodiment, the scenario models 206 include concurrent scheduling of two or more performance scenario models.

In an embodiment, the scenario models 206 include concurrent scheduling of an application scenario model and a driver scenario model. In this embodiment, execution of the driver scenario is not a part of execution of the application scenario model.

In one embodiment, the scenario models 206 include concurrent scheduling of a performance scenario model and an application scenario model. In this embodiment, execution of the application scenario model is not a part of execution of the performance scenario model.

In an embodiment, the scenario models 206 include concurrent scheduling of a performance scenario model and a driver scenario model. In this embodiment, execution of the driver scenario model is not a part of execution of the performance scenario model.

In one embodiment, an application scenario model is similar to a performance scenario model except that there is no comparison between a test output of the application scenario and an expected output of the application scenario model. In an embodiment, a driver scenario model tests a single integrated circuit and/or a single module representation.

In one embodiment, scheduling is concurrent when scheduling is performed at the same time or substantially at the same time, e.g., within a pre-determined time range, etc.

In one embodiment, the comparator 220 is connected to a part of the SoC 506 to provide a stimulus to the part and/or to receive a test result from the part. For example, the comparator 220 is connected to the CPU, and/or the memory device, and/or the image processor, and/or the fabrics, and/or the camera, and/or the display controller, and and/or the SD card controller, or a system and power controller. To further illustrate, a test file includes a scenario model to be executed by one or more parts of the SoC 506. The one or more parts of the SoC 506 are programmed by the scenario model to perform one or more corresponding functions. The one or more corresponding functions indicate that the one or more parts provide a signal to the comparator 220 to receive data, e.g., a stimulus, etc., from the comparator 220. Upon receiving the signal, the comparator 220 provides the data to the one or more parts of the SoC 506 connected to the comparator 220 to facilitate execution of the scenario model by a test bench, which includes the one or more parts. The scenario model is executed to test the one or more parts of the SoC 506. The comparator 220 receives a test output generated by the one or more parts of the SoC 506 based on the scenario model within a test file and compares the test output with an expected output.

In an embodiment, a test file includes a condition for execution of an arbitrary operation. An example of the condition includes a change in an environmental condition, e.g., temperature, pressure, etc., surrounding an SoC. The arbitrary operation is stored within an event file that corresponds to the test file. An example of an arbitrary operation includes an operation that is not executed using a scenario model, which is stored within the test file. To illustrate, an arbitrary operation includes generating an indication to disconnect a wire on a circuit board, or resetting a dual in-line memory module (DIMM) on a circuit board, etc. The DIMM is an example of an SoC. The arbitrary operation is generated from a computer program code that is written by the user. Moreover, the condition within the test file is also generated from a computer program code that is written by the user. The processor of the host system 505 determines whether the condition is satisfied. Upon determining that the condition is satisfied, the arbitrary operation is accessed by the processor of the host system 505 from the events file and executed to determine an output. In an embodiment, the output is provided to the user, e.g., displayed via a display device of the host system 505, via speakers of the host system 505, etc., to indicate to the user to perform a manual operation, e.g., disconnecting a wire on a circuit board, etc. In one embodiment, the processor of the host system 505 sends a signal to the DIMM to reset the DIMM.

FIG. 6 is a diagram of an embodiment of a system 600 for testing an SoC 602. The SoC 602 is an example of the SoC 506 (FIG. 5). The SoC 602 is located on a circuit board 604. The circuit board 604 is connected via a universal asynchronous receiver transmitter (UART) 605 and a first USB port to a computing device 606. In one embodiment, the processor 101 is a processor of the computing device 606.

The circuit board 604 is further connected via an in-circuit emulator 608, e.g., a joint test action group (JTAG) emulator, etc., and a debugger interface 610 to a second USB port of the computing device 606. A compiled file that includes the SoC scenario models 206 (FIG. 5) is loaded from the computing device 606 to the SoC 602 via the second USB port of the computing device 606, the debugger interface 610 and the in-circuit emulator 608. The SOC 602 is tested using the SoC scenario models 206 to generate one or more test outputs. The test outputs are provided via the UART 605 and the first USB port to the computing device 606.

In one embodiment, a compiled file that includes the SoC scenario models 206 is loaded from the computing device 606 to the SoC 602 via the first USB port and the UART 605.

The test outputs are provided to the comparator 220 (FIG. 5). The comparator 220 provides the test outputs to a graphical processing unit (GPU) of the computing device 606 for display of one or more of progress bars PB1, PB2, and PBz on a portion 612A of a display screen 614 of the computing device 606, where z is an integer greater than zero.

In one embodiment, eight progress bars are displayed on the display screen 614 of the computing device 606. Four of the eight progress bars show progress of execution of four threads on one CPU, e.g., the processor 101, etc., of the computing device 606 and the remaining four progress bars show progress of execution of four threads on another CPU of the computing device 606. When a first thread includes a driver scenario model that is next in sequence to a driver scenario model of a second thread, the first thread is a consumer thread and the second thread is a producer thread. Moreover, another portion 612B of the display screen 614 displays a portion of a computer program code of one of the test files 502 (FIG. 5) or a portion of a compiled file generated from the test file.

In an embodiment, a thread is a subset, e.g., a smallest sequence, etc., of computer instructions that is managed independently by a scheduler. One or more threads are part of a process and share resources, e.g., time share resources, time division multiplex resources, etc., and different processes do not share the resources. Examples of resources include memory devices, addresses within one or more memory devices, etc. In one embodiment, threads of a process share instructions, e.g., operands, operands and data, etc., of the process.

In one embodiment, when a test is executed on an SoC or the prototype of the SoC or the emulator of the SoC, the SoC or the emulator or the prototype is not able to communicate with the comparator 220. An application programming interface (API), e.g., a C API, a C++ API, etc., is applied by the computing device 606 between the SoC or the emulator or the prototype and the comparator 220 to enable the SoC or the emulator or the prototype and the comparator to communicate with each other.

In an embodiment, a checking protocol, e.g., checksum, cyclic redundancy check (CRC), etc., is performed by Test File Generation Module-Si 452 on expected output data to be generated by the SoC 602 to generate a first result which is stored in Events file 504. The checking protocol is applied on the actual output data by a processor of the SoC 602 to generate a second result. The first and second results are compared with each other by the computing device 606 to determine whether there is a match between the first and second results. Upon determining that the first and second results match, the computing device 606 determines that the SoC 602 passed a test and on the other hand, upon determining that the first and second results do not match each other, the computing device 606 determines that the SoC 602 did not pass the test. In one embodiment, the second result is stored within a memory device of the SoC 602 for providing to the computing device via the UART 605. In an embodiment, the second result is provided to the computing device 606 via the UART 605 without storing the second result within the memory device of the SoC 602 to save memory device space on the SOC 602.

In one embodiment, data is received in an order by the computing device 606 from multiple channels that are coupled to a component of an SoC. The order of data is checked by a processor of the computing device 606 against a pre-stored order to determine whether the data is received according to the pre-stored order.

FIG. 7 is a diagram of an embodiment of a graph 700 to illustrate a scenario model, e.g., one of the scenario models 206 (FIG. 2A-2), etc., one or more expected outputs of the scenario model, and one or more inputs of the scenario model. Applying the scenario model facilitates a test by the processor 101 or by another processor whether a vehicle is overheating.

The processor 101 or another processor determines that expected outputs of the test include that the vehicle keeps moving forward or that the vehicle stops. The one or more inputs of the scenario model are constrained from execution by the processor 101 based on the expected outputs of the scenario model. For example, the one or more inputs are limited to an ignition of the vehicle being on, the vehicle being in a drive gear, and gas paddle being applied to achieve the expected output that the vehicle keeps moving forward. To test the vehicle, the vehicle is driven in the drive gear, the ignition is on, and the gas paddle is applied. In this example, the one or more inputs do not include the ignition being off, the vehicle being in park, the vehicle being in a reverse gear, and applying a brake to the vehicle. As another example, the one or more inputs are limited to an ignition of the vehicle being on and a brake paddle being applied to achieve the expected output that the vehicle stops. To test the vehicle, the ignition is on and the brake paddle is applied. In this example, the one or more inputs do not include the applying the gas paddle to the vehicle.

The one or more inputs generated after applying constraints are then used as one or more stimulus' by the processor 101 or by another processor to test the vehicle for overheating. The one or more stimulus' are used to generate one or more test outputs, which are compared to the expected outputs. For example, when a test output is that the vehicle moves forward for a period of time of performance of the test, the vehicle passes the test. As another example, when a test output is that the vehicle has stopped during performance of the test, the vehicle fails the test.

FIG. 8-1 is a diagram of an embodiment of a graph 800 for illustrating a constraint of a driver scenario model 802 affecting another driver scenario model 804. The driver scenario model 802 is that of an image processor module representation or of an image processor. For example, the driver scenario model 802 is generated based on functions performed by an image processor of an SoC. Moreover, the driver scenario model 804 is that of an SD card controller module representation or of an SD card controller. For example, the driver scenario model 804 is generated based on functions performed by an SD card controller of an SOC.

Each driver scenario model 802 and 804 includes sub-modules. For example, the driver scenario model 802 includes a configuration sub-module that is executed by the processor 101 to configure the driver scenario model 802. The configuration of the driver scenario model 802 is done to achieve a quality of encoding or decoding image data. Moreover, the configuration of the driver scenario model 802 is done to enable or disable functionality of the driver scenario model 802. As another example, the driver scenario model 804 includes a configuration sub-module that is executed by the processor 101 to configure the driver scenario model 804. The configuration of the driver scenario model 804 is done to achieve a quality of image data that is stored in an SD card by the driver scenario model 804. Moreover, the configuration of the driver scenario model 804 is done to enable or disable functionality of the driver scenario model 804.

As yet another example, the driver scenario model 802 includes a completion sub-module. The completion sub-module is executed to determine whether a function executed by the driver scenario model 802 is completed. The completion is indicated by the driver scenario model 802 either by waiting for an interrupt or by changing a status of a status bit. In one embodiment, the completion is sequentially followed by or preceded by checking of a memory device module representation that is connected to the driver scenario model 802 or an I/O module representation that is connected to the driver scenario model 802.

As another example, the driver scenario model 804 includes a completion sub-module. The completion sub-module is executed to determine whether a function executed by the driver scenario model 804 is completed. The completion is indicated by the driver scenario model 804 either by waiting for an interrupt or by changing a status bit. In one embodiment, the completion is sequentially followed by or preceded by checking of a memory device module representation that is connected to the driver scenario model 804 or an I/O module representation that is connected to the driver scenario model 804.

As another example, the driver scenario model 802 includes a check sub-module. The check sub-module is executed to determine whether a memory device module representation of the driver scenario model 802 is to be checked, or a register module representation of the driver scenario model 802 is to be checked, or and I/O module representation of the driver scenario model 802 is to be checked. As another example, the driver scenario model 804 includes a check sub-module. The check sub-module is executed to determine whether a memory device module representation of the driver scenario model 804 is to be checked, or a register module representation of the driver scenario model 804 is to be checked, or and I/O module representation of the driver scenario model 804 is to be checked.

As yet another example, each of the driver scenario models 802 and 804 includes a get-source module that is executed by the processor 101. The get-source module of the driver scenario model 802 is executed to invoke functionality of the driver scenario model 804.

It should be noted that a quality of image data stored by the driver scenario model 804 in an SD card provides a constraint to a quality of encoding or decoding performed by the driver scenario model 802.

In one embodiment, a driver scenario model is accessed, instead of being generated, from a library of driver scenario models, e.g., C code sequences, etc., by the processor 101. In an embodiment, a driver scenario model is accessed from the library and then customized by the processor 101 or by the user to generate a semi-customized driver scenario model. In one embodiment, a driver scenario model is generated by the processor 101 or by the user to generate a customized driver scenario model.

In an embodiment, an application scenario model is formed by a combination of the driver scenario models 802 and 804. Constraints are applied across the driver scenario models 802 and 804 to generate the application scenario model. The constraints are applied to achieve an expected outcome to further generate a stimulus.

It should be noted that each of quality sub-module representation, mode sub-module representation, and completion sub-module representation is an example of a decision point. Each decision at a decision point is made by the processor 101 to lead to one or more paths in a data flow, e.g., a scenario model, etc. An outcome of a decision is a vertex, e.g., an output, etc. For example, each of high, low, a, b, interrupt, and poll is an example of a vertex.

Moreover, a selection of a vertex either by the processor 101 or by the user via an input device results in a constraint in that another vertex cannot be reached during execution of a scenario model. For example, when a selection is received that the driver scenario model 802 is to complete its execution based on an interrupt, the driver scenario model 802 cannot complete execution via polling. As another example, when a selection is received that the driver scenario model 804 is to store image data having high quality, the driver scenario model 804 cannot store image data having a low quality. Such graphical based constraints result in rapid solving of complex scenario models compared to algebraic constraints.

FIG. 8-2 is a diagram of an embodiment of a system 830 for illustrating a manner in which a driver scenario model 834 provides a constraint to another driver scenario model 832. The driver scenario model 834 applies the constraint on the driver scenario model 832 to facilitate generation of an output by the driver scenario model 832. The output is generated from an input applied to the driver scenario model 832. Also, the output is applied as a constrained input by the driver scenario model 832 to the driver scenario model 834. The driver scenario model 834 generates an output, e.g., a test output, etc., when the constrained input is applied.

FIG. 8-3 is a diagram of an embodiment of a system 840 to illustrate use of one or more constraints to control processing performed by a video processor module representation. Examples of processing performed by the video processor module representation include encoding, decoding, scaling, playing a video, etc.

Parameters of a display device 1 provide a constraint to the video processor module representation. Examples of the parameters of a display device include a display resolution of the display device, a size of the display device, a processing speed of a GPU of the display device, a size of a memory device of the display device, etc. For example, an aspect ratio of the display device 1 controls a size of an image that is displayed on the display device 1. The size of the image is achieved by processing performed by the video processor module representation. As another example, a display resolution of the display device 1 controls an image resolution of an image that is displayed on the display device 1.

Moreover, parameters of the video processor module representation constrain a USB controller module representation. Examples of parameters of the video processor module representation include a video resolution, an image size, a rate with which video data is encoded or decoded, a rate at which a size of a video is changed, etc. Examples of parameters of the USB controller module representation include a speed of transfer of image data, a speed of transfer of video data, serial transfer of data, parallel transfer of data, etc.

The parameters of the video processor module representation control the parameters of the USB controller module representation. For example, when a rate of encoding or decoding video data is greater than a pre-determined limit, a rate of transferring the video data from the USB controller module representation to the video processor module representation is greater than a pre-determined value. As another example, when a rate of encoding or decoding video data is less than the pre-determined limit, a rate of transferring the video data from the USB controller module representation to the video processor module representation is less than the pre-determined value.

The system 840 also illustrates various application scenario models. One of the application scenario models includes receiving video data from the SD card controller module representation and processing the video data. The processing of the video data is performed by the video processor module representation. Furthermore, the processed video data is sent by the video processor module representation to the display device 1, which renders the video data to display a video.

Another one of the application scenario models includes receiving image data from the SD card controller module representation and encoding or decoding the image data. The encoding or decoding is performed by the image processor module representation. Furthermore, the decoded or encoded image data is sent by the image processor module representation to a display device 2, which renders the image data to display an image.

Yet another one of the application scenario models includes receiving video data from the USB controller module representation and processing the video data. For example, the video data is received via a USB port module representation from a computer or a mobile device, e.g., a cell phone, a smart phone, a tablet, etc. The processing of the video data is performed by the video processor module representation. Furthermore, the processed video data is sent by the video processor module representation to the display device 1, which renders the video data to display a video.

Another one of the application scenario models includes receiving image data from the USB controller module representation and encoding or decoding the image data. The encoding or decoding is performed by the image processor module representation. Furthermore, the decoded or encoded image data is sent by the image processor module representation to the display device 2, which renders the image data to display an image.

FIG. 8-4 is a diagram of an embodiment of a graph 850 for illustrating use of an application scenario model that further uses memory device module representations for storing data to be used by IP blocks. Examples of the IP blocks include any of the module representations A through G (FIG. 3). In the application scenario model, the image processor module representation retrieves one or more constraints from a memory device module representation MEM2. Moreover, a configuration sub-module representation of the image processor module representation is executed by the processor 101 or by another processor to constrain the image processor module representation based on the one or more constraints accessed from the memory device module representation MEM2. For example, the configuration sub-module representation of the image processor module representation is executed to confine a quality of decoding or encoding based on the constraint retrieved from the memory device module representation. As another example, the configuration sub-module representation of the image processor module representation is executed to determine that a quality of encoding or decoding will be lower than a pre-set value.

The constraint regarding the quality of encoding or decoding is transferred from the image processor module representation to the memory device module representation MEM1. The constraint regarding the quality of encoding or decoding is retrieved from the memory device module representation MEM1 by a configuration sub-module representation of the camera module representation. Based on the retrieved determination, the configuration sub-module representation of the camera module representation is executed by the processor 101 or by another processor to determine that a quality of processing done by the camera module representation will be lower than a predetermined quality. Examples of the processing done by the camera module representation are described as functions performed by the camera module representation above. The quality of processing is applied to an image captured by the CCD. The constraint regarding the quality of encoding or decoding retrieved from the memory device module representation MEM1 by the configuration sub-module representation of the camera module representation constrains the quality of processing performed by the camera module representation.

In one embodiment, the configuration sub-module representation of the image processor module representation is executed to determine that a quality of encoding or decoding will be greater than the pre-set value. The determination is transferred from the image processor module representation to the memory device module representation MEM1. The determination is retrieved by the configuration sub-module representation of the camera module representation. Based on the retrieved determination, the configuration sub-module representation of the camera module representation is executed by the processor 101 or by another processor to determine that a quality of processing done by the camera module representation will be greater than a pre-determined quality.

FIG. 8-5 is a diagram of an embodiment of the graph 850 to illustrate a performance scenario model. The performance scenario model constraints the application scenario model of FIG. 8-4 to create representative benchmark tests. For example, the performance scenario model includes a constraint that completion of execution of the image processor module representation is indicated by waiting for an interrupt from a processor. A completion sub-module of a module representation is executed during completion of a function performed by the module representation. As another example, the performance scenario model includes a constraint that the configuration sub-module of the image processor module representation be configured to encode or decode with a quality that is greater than the pre-set value.

As another example, the performance scenario model includes a constraint that the configuration sub-module of the image processor module representation be configured to encode or decode in mode a. Examples of a mode of encoding or decoding image data include a deferred mode in which image data is encoded or decoded after a pre-determined time period, a current mode in which image data is encoded or decoded as soon as the image data is stored in a memory device module representation, etc.

The constraints regarding completion of execution of the image processor module representation, the mode of operation of the image processor module representation, and a quality of encoding or decoding by the image processor module representation are stored within the memory device module representation MEM1. The constraints stored within the memory device module representation MEM1 are used to constrain configuration and/or completion of an operation of the camera module representation. For example, the constraint regarding the interruption of the image processor module representation triggers a constraint within the camera module representation. The constraint triggered includes that when a completion sub-module of the camera module representation is executed by the processor 101 or by another processor, the camera module representation is interrupted by another driver scenario model. As another example the constraint regarding the quality of encoding or decoding by the image processor module representation triggers a constraint within the camera module representation. The constraint triggered includes that the configuration sub-module of the camera module representation be configured to process image data with a quality that is greater than a pre-determined quality.

As yet another example, the constraint regarding the mode of encoding or decoding by the image processor module representation triggers a constraint within the camera module representation. The constraint triggered includes that the configuration sub-module of the camera module representation be configured to process image data in a mode a. Examples of a mode of processing image data using the camera module representation include a deferred mode in which image data is processed by the camera module representation after a pre-determined time period, or a current mode in which image data is processed by the camera module representation as soon as the image data is stored in a memory device module representation, etc.

The constraints of the camera module representation are used to define constraints of the CCD module representation.

Other examples of a constraint of a module representation include checking a memory of the module representation, checking a register of the module representation, checking an I/O of the module representation, enabling the module representation to perform an operation, disabling the module representation from performing an operation, etc.

FIG. 9-1 is a diagram of an embodiment of a graph 900 to illustrate a division of an application scenario across multiple CPUs, e.g., a CPU1, a CPU2, and a CPU3, etc., during a test. In an embodiment, each CPU1, CPU2, and CPU3 is a CPU module representation, e.g. a VIP, etc., of a test bench. In one embodiment, each CPU1, CPU2, and CPU3 is a computer-generated model, e.g., a design, etc., of a CPU within a test bench. In one embodiment, the graph 900 is displayed on the portion 612A (FIG. 6) of the computing device 606. Three CPUs of a computing device are used to execute multiple application scenario models and/or a number of driver scenario models. The three CPUs interact with each other to apply one or more application scenario models and/or a number of driver scenario models.

In one application scenario model, a driver scenario model in which the camera module representation processes image data is executed by the CPU2. Then, as indicated by a dashed arrow, in the application scenario model, the processed image data is encoded by a driver scenario model that includes the image processor module representation. The driver scenario model that encodes the processed image data is executed by the CPU1. Thereafter, as indicated by another dashed arrow, in the application scenario, the encoded image data is sent to a driver scenario model that includes the SD card controller module representation for writing to an SD card. The SD card controller module representation is executed by the CPU 3.

Moreover, in another application scenario model, a driver scenario model in which the SD card controller module representation reads image data from an SD card is executed by the CPU1. Then, as indicated by a solid arrow, in the application scenario model, the read image data is decoded by a driver scenario model that includes the image processor module representation. The driver scenario model that decodes the image data is executed by the CPU3. Thereafter, as indicated by another solid arrow, in the application scenario, the decoded image data is sent to a driver scenario model that includes the display controller module representation. The display controller module representation is executed by the CPU2.

Furthermore, in yet another application scenario, a driver scenario model in which the SD card controller module representation reads image data from an SD card is executed by the CPU2. Then, as indicated by a dotted arrow, in the application scenario, the read image data is received by a driver scenario model that includes the display controller module representation for display on a display device.

It should be noted that each empty region between driver scenario models that are displayed in the graph 900 is a cell. A cell indicates a time during which a driver scenario model is not being executed by the processor 101 or by another processor.

It should also be noted that a timeline progresses along the graph 900 vertically from top to bottom. For example, a driver scenario model in which the SD card controller module representation reads image data from an SD card is executed simultaneously with, e.g., at the same time, etc., a driver scenario model in which the camera module representation processes image data. As another example, image data is processed by the camera module representation during a time period in which image data is read by the SD card controller module representation. As yet another example, a driver scenario model in which an SD card controller module representation reads image data from an SD card is executed simultaneously with, e.g., at the same time, at substantially the same time, etc., another driver scenario model in which an SD card controller module representation reads image data from the same or another SD card. To further illustrate, an SD card controller module representation reads data from a memory region, e.g., a memory bank, a set of memory addresses, a set of consecutive memory addresses, etc., of an SD card simultaneous with reading by another SD card controller module representation of data from a memory region of the same or another SD card.

In one embodiment, simultaneous, as used herein, means during a time or at the same or substantially at the same time. For example, two operations are performed simultaneously when one operation is performed during performed of the other operation. As another example, two operations are performed simultaneously when one of the operations is performed within a pre-determined time interval of initiating performance of another one of the operations and before the other one of the operations has finished execution.

It should further be noted that in one embodiment, when a first CPU executes a driver scenario model that is next in sequence to a driver scenario model executed by a second CPU, the first CPU is a consumer CPU and the second CPU is a producer CPU.

In one embodiment, instead of one or more CPUs executing one or more scenario models, execution of the scenario models is divided among multiple threads that are executed by one or more CPUs, e.g., CPUs of a computing device, CPUs of an SoC, etc. As an example, a driver scenario model of an application scenario model is scheduled by the processor 101 to be executed within one thread and another driver scenario model of the application scenario model is scheduled by the processor 101 to be executed within another thread. For example, execution of driver scenario models encompassed within two application scenario models is split into execution of multiple threads by the processor 101. To further illustrate, one of the driver scenario models is executed within a first thread and another one of the driver scenario models is executed within a second thread. As another example, the driver scenario models that are executed by the CPU1 in FIG. 9-1 are executed within a first computer thread, the driver scenario models that are executed by the CPU2 in FIG. 9-1 are executed within a second computer thread, and the driver scenario models that are executed by the CPU3 in FIG. 9-1 are executed within a third computer thread.

The division to be performed of a scenario model into multiple threads is designated within a test file or within multiple test files by the processor 101. For example, the processor 101 designates that a test file that includes multiple scenario models be divided into multiple test files and each of the multiple test files includes one or more driver scenario models of one or more of the scenario models. A sequence of execution of driver scenario models within a scenario model becomes a flow, e.g., a schedule, etc., when the scenario model is split between multiple threads or between multiple CPUs for execution during a test.

In one embodiment, the processor 101 designates, e.g., identifies, etc., in one or more test files a CPU or a thread that is to execute a driver scenario model of an application scenario model. For example, the processor 101 designates within a test file that a driver scenario model in which the camera module representation processes image data is to be executed by the CPU2 or within a computer thread 2 and a driver scenario model for encoding processed image data is to be executed by the CPU1 or within a computer thread 1.

In an embodiment, a CPU executes any number of driver scenario models, or any number of application scenario models, or any number of performance scenario models.

In one embodiment, a memory device is allocated to a CPU and access to the memory device is blocked to other CPUs.

In an embodiment, a memory device is allocated to a scenario model and access to the memory device is blocked to other scenario models.

In one embodiment, the CPU1 is a master CPU that executes a driver scenario model first and the execution triggers one or more driver scenario models in one or more of the other CPUs2 and 3. In an embodiment, execution of all of the CPU1, the CPU2, and CPU3 is controlled by a master CPU. In this embodiment, the master CPU does not execute a driver scenario model and co-ordinates an order of execution of a number of driver scenario models by the CPU1, CPU2, and CPU3.

In an embodiment, the CPU1 communicates with an IP block to perform a task, e.g., a transaction, a read transaction, a write transaction, an encoding operation, a decoding operation, a capturing image operation, a displaying image operation, etc. The CPU1 waits for the IP block to finish the transaction, either by polling for a done bit or by waiting for an interrupt from the IP block. The CPU1 also waits for a result of the task from the IP block and then checks the result against an expected outcome, which is stored in a memory device. The IP block is executed by another CPU.

In one embodiment, a processing capability of the CPU1 is used by a large number of IP blocks. Each IP block executes a thread on the CPU1 and a task performed by one IP block is distinguished from a task performed by another IP block. In this embodiment, one thread is mutex protected from another thread. For example, a spinlock is used by each thread to determine whether a producer operation has finished execution. The thread determines whether the spinlock is available before initiating its own execution. The thread waits for the other thread to finish execution before its own execution. In an embodiment, instead of the mutex protection, a memory device is allocated to a thread for a pre-set time or until the thread finishes execution.

In an embodiment, processing capability of the CPU1 is used by a large number of IP blocks. Each IP block acts a state machine, each of which emulates the behavior of a thread.

In an embodiment, a number of the CPUs1, 2, and 3 is the same as a number of CPUs in an SoC. In one embodiment, a number of threads executed by one or more of the CPUs1, 2, and 3 is the same as a number of threads executed within an SoC.

In one embodiment, execution of a driver scenario model by a first thread generates a constraint. As a result of the constraint, another driver scenario model cannot be executed by a second thread. In this embodiment, both the threads are executed using the same CPU. In an embodiment, both the threads are executed using different CPUs.

FIG. 9-2 is a diagram of an embodiment of a graph 920 to illustrate use of memory regions in one or more memory devices to store data for access by one or more driver scenario models during a test. In one embodiment, the graph 920 is displayed on the portion 612A (FIG. 6) of the computing device 606. In one embodiment, a memory region is a range of memory addresses of a memory device, e.g., a memory device used during execution of a test bench program, etc. For example, a memory region 1 is a first range of addresses in a memory device and a memory region 2 is a second range of addresses in the memory device. The first range does not overlap the second range. In an embodiment, the memory region 1 is a range of addresses in a memory device and the memory region 2 is a range of addresses in another memory device.

The processor 101 splits memory addresses of one or more memory devices into multiple memory regions for use during a test of an SoC or a model of the SoC.

In one embodiment, a manner in which memory addresses of one or more memory devices are to be split is designated in a test file. For example, a test file is generated by the processor 101 to include that memory addresses be split into the memory region 1, the memory region 2, and the memory region 3 during a test in which a scenario model is executed.

In one application scenario model illustrated by solid arrows, a driver scenario model that includes the SD card controller module representation is executed by the processor 101 to read data from an SD card VIP and to further write the read data as a joint photographic experts group-encoded image 1 (JPEG-encoded image 1) to a portion of the memory region 1. The data is written via a direct memory access (DMA).

In another application scenario model illustrated by dashed arrows, another driver scenario model that includes the image processor module representation is executed by the processor 101 to retrieve the JPEG-encoded image data 1 from the portion of the memory region 1, to decode the JPEG-encoded image data 1 to generate decoded image data, and to provide the decoded image data as a raw image data 2 for storage in the memory region 2. Moreover, in the application scenario, a driver scenario model that executes the image processor module representation obtains the raw image data 2 from the portion of the memory region 2, and encodes the raw image to generate encoded image data, and provides the encoded image data as a JPEG-encoded image data 2 to a memory region 3.

In one embodiment, the memory region 3 is a range of addresses within the same memory device that includes the memory regions 1 and/or 2. In an embodiment, the memory region three is a range of addresses within a different memory device from a memory device that includes the memory region 1. In one embodiment, the memory region three is a range of addresses within a different memory device from a memory device that includes the memory region 2.

In yet another application scenario illustrated by minutely-dashed arrows, a driver scenario model that includes the display controller module representation retrieves the raw image data 2 from the portion of the memory region 2 and provides the raw image data 2 to a display VIP for display of an image.

In another application scenario illustrated by dotted arrows, a driver scenario model that includes the camera module representation obtains image data from a CCD VIP, processes the image data, and provides the processed image data to the memory region 2 for storage as the raw image data 2.

In still another application scenario illustrated by the cross arrows, a driver scenario model that includes the SD card controller module representation reads the JPEG-encoded image data 2 from the memory region 3, and writes the JPEG-encoded image data 2 to an SD card VIP.

It should be noted that in one embodiment, a number of the memory regions displayed in the graph 920 is the same as a number of memory regions in an SoC. In an embodiment, a number of the memory regions displayed in the graph 920 is different than a number of memory regions that an SoC.

In an embodiment, a memory device module representation is allocated to a thread and access of the memory device module representation is blocked to other threads until the thread finishes use of the memory device module representation.

FIG. 10 is a diagram of an embodiment of a system 1000 for illustrating execution of multiple scenario models in parallel by the processor 101 or by multiple CPUs or by multiple threads. In a first scenario model, the SD card controller module representation reads data from an SD card. In the first scenario model, the image processor module representation obtains the read data from the SD card controller module representation and decodes the read data to generate decoded data. In the first scenario model, a display controller module representation 1 obtains the decoded data from the image processor module representation and renders the decoded data to generate an image on the display device 1.

In a second scenario model, a display controller module representation 2 obtains the decoded data from the image processor module representation and renders the decoded data to generate an image on a display device 2.

In a third scenario model, a USB controller module representation retrieves the decoded data from the image processor module representation and transfers the decoded data to a USB port for further transfer to a device, e.g., a computing device, a mobile device, an integrated circuit, etc.

In a fourth scenario model, the SD card controller module representation retrieves the decoded data from the image processor module representation and transfers the decoded data to an SD card for storage.

In a fifth scenario model, the image processor module representation obtains data that is received by the USB controller module representation from the USB port. In the fifth scenario model, the image processor module representation decodes the obtained data to generate decoded data. In the fifth scenario model, the display controller module representation 1 obtains the decoded data from the image processor module representation and renders the decoded data to generate an image on the display device 1.

A sixth scenario model is similar to the second scenario model except that the sixth scenario model is performed using the decoded data that is generated from the data received from the USB port.

Moreover, a seventh scenario model is similar to the third scenario model except that the seventh scenario model is performed using the decoded data that is generated from the data received from the USB port.

An eighth scenario model is similar to the fourth scenario model except that the eighth scenario model is performed using the decoded data that is generated from the data received from the USB port.

In a ninth scenario model, the camera module representation processes image data that is captured using a CCD. The image processor module representation retrieves the processed image data from the camera module representation and decodes the image data to generate decoded image data. The decoded image data is sent to the display controller module representation 1 in a manner described above in the first scenario model.

A tenth scenario model is similar to the second scenario model except that the tenth scenario model is performed using the decoded data that is generated from the data received from the camera module representation.

Moreover, an eleventh scenario model is similar to the third scenario model except that the eleventh scenario model is performed using the decoded data that is generated from the data received from the camera module representation.

A twelfth scenario model is similar to the fourth scenario model except that the twelfth scenario model is performed using the decoded data that is generated from the data received from the camera module representation.

In a thirteenth scenario model, the SD card controller module representation reads data from an SD card or an SD card module representation. In the thirteenth scenario model, the video processor module representation obtains the read data from the SD card controller module representation and processes the read data to generate processed data. In the thirteenth scenario model, the display controller module representation 1 obtains the processed data from the video processor module representation and renders the processed data to generate a video on the display device 1.

In a fourteenth scenario model, the display controller module representation 2 obtains the processed data from the video processor module representation and renders the processed data to generate a video on the display device 2.

In a fifteenth scenario model, the USB controller module representation retrieves the processed data from the video processor module representation and transfers the processed data to a USB port for further transfer to a device, e.g., a computing device, a mobile device, an integrated circuit, etc.

In a sixteenth scenario model, the SD card controller module representation retrieves the processed data from the video processor module representation and transfers the processed data to an SD card for storage.

In a seventeenth scenario model, the video processor module representation obtains data that is received by the USB controller module representation from the USB port. In the seventeenth scenario model, the video processor module representation processes the obtained data to generate processed data. In the seventeenth scenario model, the display controller module representation 1 obtains the processed data from the video processor module representation and renders the processed data to generate a video on the display device 1.

An eighteenth scenario model is similar to the fourteenth scenario model except that the eighteenth scenario model is performed using the processed data that is generated from the data received from the USB port.

Moreover, a nineteenth scenario model is similar to the fifteenth scenario model except that the nineteenth scenario model is performed using the processed data that is generated from the data received from the USB port.

A twentieth scenario model is similar to the sixteenth scenario model except that the twentieth scenario model is performed using the processed data that is generated from the data received from the USB port.

In a twenty-first scenario model, the camera module representation processes video data that is captured using the CCD. The video processor module representation retrieves the video data that is processed by the camera module representation and further processes the video data to generate further processed video data. The further processed video data is sent to the display controller module representation 1 in a manner described above in the thirteenth scenario model.

A twenty-second scenario model is similar to the fourteenth scenario model except that the twenty-second scenario model is performed using the further processed data that is generated from the data received from the camera module representation.

Moreover, a twenty-third scenario model is similar to the fifteenth scenario model except that the twenty-third scenario model is performed using the further processed data that is generated from the data received from the camera module representation.

A twenty-fourth scenario model is similar to the sixteenth scenario model except that the twenty-fourth scenario model is performed using the further processed data that is generated from the data received from the camera module representation.

FIG. 11 is a diagram of an embodiment of a display screen 1100 to illustrate use of multiple threads and/or multiple CPUs to execute a number of scenario models. In one embodiment, the display screen 1100 is an example of a display screen of a computing device, e.g., the computing device 606 (FIG. 6).

The display screen 1100 displays a graphical portion 1102 and a textual portion 1104. Both the graphical portion 1102 and the textual portion 1104 are displayed by the GPU of the computing device 606 upon execution of a test. In one embodiment, the portions 1102 and 1104 are generated after the comparator 220 (FIG. 3) is executed. In the portion 1102, four threads, e.g., T1, T2, T3, and T4, etc., are executed by the CPU1. Moreover, in the portion 1102, four additional threads, e.g., T1, T2, T3, and T4, etc., are executed by the CPU2. Each thread executes one or more driver scenario models. An application scenario model includes switching between driver scenario models. For example, in an application scenario model, a driver scenario model is executed within the thread T3, which is executed by the CPU1. In the application scenario model, upon execution of the driver scenario model within the thread T3, as indicated by an arrow, execution switches to another driver scenario model, which is a portion of the thread T2, which is executed by the CPU2. Moreover, in the application scenario model, upon execution of the driver scenario model within the thread T2 by the CPU2, execution switches to executing yet another driver scenario model within the thread T4, which is executed by the CPU1.

A flow of execution is illustrated using an arrow in FIG. 11. For example, an arrow indicates a flow in which a driver scenario model is executed by the CPU2 within the thread T2 after a driver scenario model is executed within the thread T3 by the CPU1. As another example, an arrow indicates a flow in which a driver scenario model is executed by the CPU1 within the thread T4 after a driver scenario model is executed within the thread T2 by the CPU2.

It should be noted that the darkened driver scenario models, e.g., a darkened scenario model 1106, etc., in the display portion 1102 have completed execution. Moreover, the dotted driver scenario models, e.g., a dotted scenario model 1108, etc., in the display portion 1102 are awaiting execution. Also, the empty scenario models with a darkened border, e.g., an empty scenario model 1110, etc., in the display portion 1102 have paused execution as a result of a breakpoint. In one embodiment, a breakpoint is an intentional stopping or pausing of a computer program code in a compiled file for debugging. In the embodiment, the user inspects a test environment, e.g., register module representations, memory device module representations, IP blocks, etc., that is executed until the breakpoint to find out whether computer program code is functioning as expected.

Moreover, the portion 1104 includes a portion of a computer program code, e.g., a code of a test file, a code of a compiled file, etc., that includes a code of one or more of the driver scenario models that are shown in the portion 1102. For example, when there is an error during execution of one the scenario models 206 on a test bench, a computer program code for the one of the scenario models 206, e.g., stored in one of the test files 208 (FIG. 2A-2), etc., is displayed in the portion 1104. As another example, when one the scenario models 206 does not execute on a test bench, a computer program code for the one of the scenario models 206 is displayed as being highlighted in the portion 1104. As yet another example, upon receiving a selection of the empty scenario model 1110, the processor 101 commands the GPU to display a portion of a code of a compiled file or of a source code file, e.g., a test file, etc., for execution of the empty scenario model 1110. The selection is received from the user via the input device. The portion of the code is displayed in the portion 1104. To illustrate, the portion of the code is displayed as being highlighted or as zoomed-in compared to remaining code that is displayed in the portion 1104. In an embodiment, the zoom-in portion overlaps with a portion of the display portion 1102.

In one embodiment, the portion 1104 includes a computer code, e.g., a source code, a compiled code, etc., for executing the driver scenario models that are displayed in the display portion 1102. For example, as a display of the driver scenario models changes in the display portion 1102 with execution of the driver scenario models, a computer code for the driver scenario models also changes in the display portion 1102. The changed computer code is that of the changed driver scenario models that are displayed in the display portion 1102.

In an embodiment, when a selection of a driver scenario model is received via the input device from the user, a computer code for the driver scenario model is highlighted by the GPU in the portion 1104 compared to computer codes of other driver scenario models in the portion 1104.

In an embodiments, highlighted, as used herein, includes darkened, or textured, or shaded, or displayed in a different color, or zoomed-in, or zoomed-out, or a combination thereof.

It should be noted that in one embodiment, a number of threads executed by a CPU displayed in the portion 1102 is the same as a number of threads executed by CPU of an SoC. The use of the same number of threads as that of the SoC allows for execution of a realistic test of the SoC. In an embodiment, a number of threads executed by a CPU is displayed in the portion 1102 is the different from a number of threads executed by CPU of an SoC.

Each thread is represented as a vertical bar graph. For example, the thread T1 that is executed by the CPU1 is represented as a vertical bar graph, the thread T2 that is executed by the CPU 2 is represented as a vertical bar graph, etc. In an embodiment, instead of a vertical bar graph, a thread is displayed by the GPU of the computing device 606 as a horizontal bar graph or as a diagonal bar graph.

In an embodiment, a different display format that than illustrated is used to distinguish a driver scenario model that is awaiting execution from a driver scenario model that has completed execution and/or from a driver scenario model that has reached a breakpoint. For example, the GPU of the computing device 606 displays a driver scenario model that has finished execution in a different texture, or a different shade, or a different color, or a combination thereof than a driver scenario model that is to be executed. As another example, the GPU of the computing device 606 displays a driver scenario model that has reached a breakpoint using a different texture, or a different shade, or a different color, or a combination thereof than a driver scenario model that is to be executed.

In one embodiment, a number of CPUs displayed in the portion 1102 is the same as a number of CPUs of an SoC. The use of the same number of CPUs as that of the SoC allows for execution of a realistic test of the SoC. In an embodiment, a number of CPUs displayed in the portion 1102 is different from a number of CPUs of an SoC.

In an embodiment, a thread is executed to execute any number of driver scenario models, or any number of application scenario models, or any number of performance scenario models. In one embodiment, a thread is executed to execute a portion of a driver scenario model. For example, a first input provided to an arbiter scenario model, which is further described below, is processed in a thread and a second input provided to the arbiter scenario model is processed in another thread. This allows facilitating a resolution of non-determinism of arbitration. For example, when the thread associated with the first input wins arbitration, the thread notifies the other thread associated with the second input of the same.

In one embodiment, a first computer thread is executed by a first CPU and a second computer thread is executed by a second CPU. When the first and second computer threads use one memory device, the memory device is mutex-protected. For example, the first computer thread locks a mutex, e.g., a unique name, a unique value, etc., while the first computer thread is executing and using data from a memory device. Until the first computer thread uses the memory device and the mutex protection is enabled, the second computer thread cannot use, e.g., access data from, write data to, etc., the memory device. In an embodiment, the mutex protection is tested using a test bench and a scenario model, described herein. In one embodiment, the mutex protection applies when the first computer thread is executed by the first CPU and the second computer thread is executed by the first CPU.

In an embodiment, any element of a portion that is displayed on the display screen 1100 by the GPU is displayed by performing a rendering operation on data that is stored in a memory device, e.g., a memory device of the computing device 606, etc. For example, the dotted scenario model 1108 is displayed by rendering data that is stored in a memory device of the computing device 606.

FIG. 12 is a diagram of an embodiment of a computer program code to enable integration of the SOC scenario models 206 into a test bench, e.g., the test bench 214 (FIG. 4-1), the test bench 412 (FIG. 4-1), the test bench 406 (FIG. 4-1), etc. It should be noted that the computer program code is used for illustrative purposes only and that in one embodiment, other languages or other computer program codes are used for achieving the simple integration.

FIG. 13 is a diagram of an embodiment of a screen shot 1300 for illustrating visualization of one or more paths leading to a selection, by the processor 101, of one or more inputs 1302A, 1302B, 1302C, e.g., one or more stimulus', etc., based on a scenario model 1304 and based on outputs 1306A and 1306B of the scenario model 1304. The scenario model 1304 is an example of one of the SOC scenario models 206 (FIG. 2A-2). The one or more paths are highlighted in the screen shot 1300 as a path 1308A and a path 1308B. For example, the path 1308A is highlighted in dots and the path 1308B is highlighted in a dark solid line.

The path 1308A is generated by the processor 101 between the scenario model 1304 and the output 1306A and the input 1302A. Also, the path 1308A is between the scenario model 1304, the output 1306A, and the input 1302C. It is indicated by the path 1308A that the output 1306A is based on the scenario model 1304, and the input 1302A and 1302C are based on the output 1306A. The path 1308B is generated by the processor 101 between the scenario model 1304 and the expected output 1306B and the input 1302B. It is indicated by the path 1308B that the expected output 1306B is based on the scenario model 1304, and the input 1302B is based on the expected output 1306B. The user can view the paths 1308A and 1308B on a display screen of a computing device.

It should be noted that the output 1306A is constrained by the processor 101 from being achieved when the expected output 1306B is to be achieved.

In one embodiment, the path 1308B is highlighted by the processor 101 upon execution of a scenario model illustrated by the path 1308B to facilitate the user to see the path 1308B. The visualization helps the user to determine whether an application scenario model illustrated by the path 1308B has completed execution.

In an embodiment, any number of paths that have finished execution is highlighted by the processor 101. The user is able to see that multiple highlighted paths that coincide with each other to indicate to the user that cross coverage of scenario models is done. Each path indicates performance of a scenario model.

The path 1308A is an example of an unexecutable test case based on a constraint that the output 1306A cannot be achieved when the expected output 1306B is achieved. In one embodiment, instead of or in addition to highlighting the path 1308A, a path that includes one or more driver scenario models is highlighted by the processor 101. For example, a path that links the empty scenario model 1110 (FIG. 11) to other driver scenario models is bolded or colored by the processor 101. In this example, some of the other driver scenario models are connected to an input node of the empty scenario model 1110 and the remaining of the other driver scenario models are connected to an output node of the empty scenario model 1110. To further illustrate, the some of the other driver scenario models are linked as a chain to the input node of the empty scenario model 1110 and the remaining of the other driver scenario models are linked as a chain to the output node of the empty scenario model 1110. In an embodiment, the other driver scenario models and the empty scenario model 1110 are linked to form an application scenario model or a performance scenario model.

In an embodiment, the path 1308B is included in the screen shot 1300 and the path 1308A is excluded from the screen shot 1300 to a display a performance constraint to the user.

In some embodiments, a test constraint, e.g., a performance constraint, etc., is displayed as logic, e.g., a computer program code, etc., instead of in a graphical format illustrated in the screen shot 1330.

In one embodiment, the path that links the empty scenario model 1110 to the other driver scenario models includes sub-module representations of the empty scenario model 1110 and the other driver scenario models.

FIG. 14A is a diagram of an embodiment of a system 1400 to illustrate generation of a verification space, e.g., a module representation, a sub-module representation, etc., from a component of an SoC or a description of the component of the SoC. In one embodiment, a verification space is generated by the processor 101 or by another processor. The verification space is further used to generate one or more stimulus' from expected outputs.

In one embodiment, the description of the component of the SoC is within the file that defines the SoC. For example, the processor 101 receives the file defining the SoC and the file includes a description of a function of a component of the SoC.

A queue is an example of a component of an SoC and has one input port and one output port. The queue generates an outcome, e.g., a primary outcome, a secondary outcome, a test output, etc., when a pre-requisite, e.g., an input, a stimulus, etc., is applied to the queue. In one embodiment, the queue supports backpressure from a component that is connected to the output port of the queue. For example, when a data rate of the component connected to the output port of the queue is less than a data rate of data that is output from the queue, the component sends a message to the queue that the component cannot process data received from the queue. In an embodiment, when the queue includes a memory device for internal storage of data, data output from the queue is out-of-order compared to an order in which data is received at the input port of the queue.

In one embodiment, a primary outcome of the queue is data that is output from the queue when data is input to the queue. A secondary outcome of the queue is an overflow or underflow of data within a memory device used for internal storage within the queue. The overflow or underflow occurs with respect to a rate of reception of data by the queue or a rate of transfer of data from the queue. Another secondary outcome of the queue is sending of data by the queue in a different order than in which the data is received by the queue.

A verification space Vqueue corresponding to the queue is generated by the processor 101 from the queue. The verification space of the queue performs the same functions as that of the queue. In one embodiment, the verification space Vqueue is defined by the processor 101 as a scenario model for the queue. An outcome, e.g., the primary outcome, the secondary outcome, etc., of the queue is determined to be an expected output by the processor 101 or by another processor. In one embodiment, the expected output of the queue is received within the file that defines the SoC.

The expected output of the queue is applied by the processor 101 to the verification space Vqueue to determine the pre-requisite of the queue. The pre-requisite of the queue is then used as a stimulus during application of a scenario model in which the verification space Vqueue is applied. In one embodiment, the pre-requisite of the queue is used to generate a test output of the queue, which is compared to the expected output of the queue to determine whether the queue passed a test. In an embodiment, the pre-requisite of the queue is used to generate a test output of a scenario model, which is compared to an expected output of the scenario model to determine whether the scenario model passed a test.

Similarly, an arbiter is a component of the SoC that receives two or more pre-requisites for generating one outcome. The arbiter has a single output port fed by a number of input ports. In an embodiment, the input ports support back-pressure capability to inform requestors, e.g., components of an SoC that generate a request, etc., that an output port of the arbiter is unavailable for transferring data. The arbiter arbitrates between the two or more pre-requisites that are received at about the same time, e.g., concurrently, within a pre-determined time range, etc., to determine which of the two or more pre-requisites is to be allowed to be an output of the arbiter first or is allowed to be an output of the arbiter. For example, the arbiter arbitrates based on a type of a requestor, e.g., low priority, high priority, etc., a type of data, e.g., low priority data, high priority data, etc., a time at which data is received from a requestor, or a combination thereof.

A verification space Varbiter corresponding to the arbiter is generated by the processor 101 and the verification space Varbiter is executed by the processor 101 to perform the same functions as that of the arbiter. In one embodiment, the verification space Varbiter is defined by the processor 101 as a scenario model for the arbiter. The verification space Varbiter is used by the processor 101 to generate the two or more pre-requisites from an expected output of the Varbiter to further generate a test output. In one embodiment, the test output of the Varbiter is compared by the comparator 220 (FIG. 2A-2) with the expected output of the Varbiter to determine whether the Varbiter passed a test.

In one embodiment, a primary outcome of the arbiter is data that the arbiter is capable of providing at its output port. The data is provided based on a random selection of data from one of input ports of the arbiter or times of arrival of data at its input ports. In an embodiment, a secondary outcome of the arbiter includes a combination of timings associated with a transfer of data via the arbiter and of priorities associated with the transfer of data. In one embodiment, a secondary outcome of the arbiter is to create backpressure in a situation in which the arbiter becomes saturated, e.g., overflows, etc., from data received at its input ports.

Moreover, a distributor distributes data, e.g., a video stream, a pre-requisite, an audio stream, a multimedia stream, etc., that is received as input by the distributor to a number of channels in the form of the number of outputs. The distributor has multiple output ports that are fed by a single input port. In one embodiment, one of the input output ports is selected by the distributor based on a destination that is specified within data received at the input port of the distributor.

The distributor is a component of the SoC that receives one pre-requisite for generating a number of outputs. The distributor distributes the pre-requisite based on one or more conditions, e.g., whether a component attached to the distributor is ready to accept an output, an address of a destination component within a portion of the pre-requisite, etc. For example, the distributor does not distribute a portion of the pre-requisite to a component of the SoC until the distributor receives a backpressure from the component. A verification space Vdistributor that performs the same functions as that of the distributor is generated by the processor 101. In one embodiment, the verification space Vdistributor is defined by the processor 101 as a scenario model for the distributor. The verification space Vdistributor is used by the processor 101 to generate the pre-requisite from a number of expected outputs of the distributor to further generate the same number of test outputs. In one embodiment, the test outputs of the Vdistributor are compared by the processor 101 with corresponding expected outputs of the Vdistributor to determine whether the Vdistributor passes a test.

In one embodiment, a primary outcome of the distributor is data at its output ports and a secondary outcome of the distributor is a rate at which the data is distributed at each of its output ports.

In an embodiment, a verification space of a component of an SoC is coupled to another verification space for storing data, e.g., a verification space Vreg of a register, a verification space Vmem or a memory device, etc. The verification space for storing data is generated by the processor 101 based on functions performed by a memory device, e.g., a RAM, a ROM, a memory device within a component of an SoC, a register, a flash memory, a hard disk, a compact disc, a digital video disc, a disk array, a virtual memory region within a memory device, etc. For example, when a memory device is coupled to a component of the SoC, the verification space for storing data is connected by the processor 101 to the verification space having a functionality of the component. In one embodiment, the verification space Vmem is defined by the processor 101 as a scenario model for a memory device. Moreover, in an embodiment, the verification space Vreg is defined by the processor 101 as a scenario model for a register. Also, in an embodiment, the verification space having a functionality of a component of an SoC is defined by the processor 101 as a scenario model for the component. For example, the verification space having a functionality of a component of an SoC is defined by the processor 101 as a scenario model that includes an application of the functionality of the component.

In one embodiment, a memory device module representation is used, e.g., accessed for reading or writing, etc., at a time by one scenario model. For example, when a memory device module representation is accessed by an application scenario model at a time, the memory device module representation cannot be accessed by another application scenario model or a driver scenario model or a performance scenario model at the same time. To avoid conflict between multiple scenario models that access the same memory device module representation, the processor 101 determines a time of access of the memory device module representation by each scenario model or informs a scenario model when the memory device module representation will be available for access by the scenario model.

The verification space for storing data is connected to provide an input to or receive an output from a verification space of a component of an SoC based on whether a memory device is connected at an input node or an output node of the component. For example, if a memory device of the SoC is connected at an input node of a component of the SoC, the verification space for storing data is connected to provide an input to a verification space of the component. As another example, if a memory device of an SoC is connected at an output node of a component of the SoC, the verification space for storing data is connected to receive an output from a verification space of the component.

In one embodiment, a discrete memory element, e.g., one or more memory addresses in a memory device, one or more registers, etc., is allocated by a discrete allocator to a first component of an SoC until a reference count reaches zero or a pre-determined value. The processor 101 keeps a log of the reference count. A second component of the SoC cannot access the discrete memory element for storage or data or for obtaining data until the discrete memory element is allocated to the first component and until the reference count reaches zero or a pre-determined value. The reference count is a number of times the discrete memory element is accessed by the first component.

A primary outcome of the discrete allocator is to allocate the discrete memory element to a component that requests the discrete memory element, or to decrement the reference count to reach zero, or to increment the reference count to reach a pre-determined value, or to free the discrete memory element from being allocated to the component, or a combination thereof. The primary outcome of the discrete allocator is used by the processor 101 to determine pre-requisites of the discrete allocator. The pre-requisites of the discrete allocator include a definition of a pool of available resources for allocation by the discrete allocator, configuration of the discrete allocator to define whether the discrete memory element can be allocated more than once to one component, or configuration the discrete memory element, or a combination thereof. Examples of a secondary outcome of the discrete allocator include a re-use a recently freed discrete memory element and a permutation of, e.g., re-arrangement of allocation of, etc., a pool of discrete memory elements to maximize use of the discrete memory elements.

In one embodiment, a resource and a memory device are used interchangeably herein. Another example of a resource includes a bus fabric.

A verification space Vdiscrete is generated by the processor 101 based on functions performed by the discrete allocator. In one embodiment, the verification space Vdiscrete is defined by the processor 101 as a scenario model for the discrete allocator. In an embodiment, a discrete memory element of a memory device module representation is allocated by a discrete allocator module representation to a first scenario model until a reference count reaches zero. A second scenario model cannot access the discrete memory element of the memory device module representation until the discrete memory element is allocated to the first scenario model and until the reference count reaches zero or reaches a pre-determined value. The reference count is a number of times the discrete memory element is accessed by the first scenario model.

A verification space Vcontinuous is a verification space generated by the processor 101 for a continuous allocator that allocates a continuous block, e.g., region of sequential memory addresses, etc., of elements within a memory device. In one embodiment, the verification space Vcontinuous is defined by the processor 101 as a scenario model for the continuous allocator. The continuous block is allocated to or freed from a requestor of the continuous block. The requestor specifies to the allocator whether the continuous block is to be allocated to the requestor, or is already allocated to the requestor and is to be used by the requestor for multiple operations during the same data flow, e.g., a scenario model, etc. In case of multiple operations, the requestor or the continuous allocator increments or decrements a number of the multiple operations.

In one embodiment, the continuous allocator defines data in an allocated continuous block. For example, the continuous allocator statically initializes, e.g., resets, sets, etc., a block of memory elements in a continuous block or arranges for the memory elements to be initialized by another agent, e.g., in case of a direct memory access to a memory device, etc.

Examples of primary outcomes of the continuous allocator include allocation of a contiguous block of memory elements of a pre-determined length, incrementing or decrementing a reference count indicating a number of the multiple operations performed for a previously allocated block of memory elements, freeing a previously allocated block of memory elements from being allocated to a requestor, etc. Examples of pre-requisites of the continuous allocator include a definition of available contiguous blocks in one or more memory devices, static initialization of data in a contiguous block, dynamic initialization of data in a contiguous block by another agent, etc. Examples of secondary outcome of the continuous allocator include an arrangement of multiple contiguous blocks to test for non-existence of overlap between the multiple contiguous blocks in case of read and write operations, an arrangement of partial re-use of a portion of a contiguous block when an agent, e.g. requestor, etc., fails to write back in time to a remaining portion of the contiguous block, an arrangement for false sharing in which different agents use adjacent memory locations of a contiguous block to test cache coherency, an arrangement for true sharing in which different agents use the same memory locations to test cache coherency, tracking of a memory shadow state that is a state of a shadow of a memory device of an SoC, etc.

The verification space Vreg is generated by the processor 101 based on a register or a number of registers, e.g., registers having a width of 32 bits or 64 bits or 128 bits or 256 bits, etc. In one embodiment, a register is a configuration register that is used to set up modes in which an SoC operates or includes a portion of an instruction to operate the SoC. In an embodiment, a number of registers is organized by an instance of a component of an SoC. Each component instance has a base address and offsets for each register.

An example of primary outcomes of a number of registers includes register values stored in the registers. Other examples of primary outcomes of registers include register values that are obtained by the registers or by a component of an SoC from a number of shadow registers for storage in the registers. Examples of pre-requisites of a number of registers include register address offsets, base addresses for each instance of a component of an SoC, ability to execute a read instruction, ability to execute a write instruction, etc. Examples of secondary outcomes of a number of registers include register values that are provided by the registers based on randomized timings to test for register pipeline issues and register values that are provided by the registers based on a random ordering of register operations to test for hardware dependencies on the register ordering.

A verification space Vstruct is generated by the processor 101 based on a data structure or a number of data structures, e.g., memory devices, other than registers, that store data, etc. In one embodiment, the verification space Vstruct is defined by the processor 101 as a scenario model for a data structure. A format, e.g., extensible markup language (XML) format, tree, graphical, array, etc., is used to define fields in data structures.

An example of primary outcomes of a number of data structures includes a values stored in the data structures. Other examples of primary outcomes of data structures include values that are obtained by the data structures or by a component of an SoC from a number of shadow registers for storage in the data structures. Examples of pre-requisites of data structures include data structure address offsets, base addresses of the data structures, ability to execute a read instruction, ability to execute a write instruction, etc.

In an embodiment, a module representation, other than a memory device module representation, has a primary outcome of transferring data from one memory device module representation to another memory device module representation, or from a memory device module representation to an input/output module representation, or from an input/output module representation to a memory device module representation. The module representation, other than a memory device module representation, has a secondary output to indicate backpressure to one or more input ports of the module representation, and/or to indicate signal interrupts, and/or to perform direct memory access (DMA) to or from a memory device module representation. For example, a video decoder module representation has a primary outcome of storing decoded image data in a memory device module representation, and a video display module representation has a primary outcome of producing a composite image for display on a display device.

In an embodiment, a memory device module representation has a primary outcome of facilitating a read or a write and a secondary outcome of facilitating the read or write at a data rate, e.g., a double data rate, a data rate higher or lower than a double data rate, etc. In one embodiment, a cache module representation has a primary outcome of facilitating a read or a write and a secondary outcome of fetching data or snooping data from a main memory device module representation.

FIG. 14B is a diagram of an embodiment of a system to illustrate generation of a stimulus from an expected output O1 of a pipeline scenario model 1420. A verification space VC receives an output O1 as an expected output and generates an intermediate value IV2 from the output O1. The verification space VC is generated by the processor 101 by applying the module representation C. For example, the verification space VC performs the same functions as that of the module representation C.

A verification space VB receives the intermediate value IV2 from the verification space VC and generates an intermediate value IV1 from the intermediate value IV2. The verification space VB is generated by the processor 101 from the module representation B. For example, the verification space VB performs the same functions as that of the module representation B.

A verification space VA receives the intermediate value IV1 from the verification space VB and generates an input I1, which is an example of a stimulus, from the intermediate value IV1. The verification space VA is generated by the processor 101 from the module representation A. For example, the verification space VA performs the same functions as that of the module representation A.

The module representation A receives the stimulus I1 and generates the intermediate value IV 1 from the stimulus I1. The module representation B receives the intermediate value IV1 from the module representation A and generates the intermediate value IV2 from the intermediate value IV1. The module representation C receives the intermediate value IV2 from the module representation B and generates the output O1, which is a test output. The test output O1 is compared to the expected output O1 to determine whether the test output O1 matches the expected output O1 or is within a pre-determined threshold of the expected output O1. Upon determining that the test output O1 is within the pre-determined threshold of the expected output O1 or matches the expected output O1, the processor 101 determines that the pipeline scenario model 1420 passes a test. On the other hand, upon determining that the test output O1 is not within the pre-determined threshold of the expected output O1 or does not match the expected output O1, the processor 101 determines that the pipeline scenario model 1420 fails a test.

In one embodiment, instead of the module representations A, B, and C, a component of an SoC is used to describe FIG. 14B. For example, a component of an SoC from which the module representation A is generated is used instead of the module representation A to generate the intermediate value IV1.

In an embodiment, an intermediate value, as described herein, is an example of an expected outcome and the intermediate value is checked, e.g., tested, compared, etc., against a test outcome.

FIG. 14C is a diagram of an embodiment of a system to illustrate generation of stimuli I1, I2, I3, and I4 from expected outputs O1 and O2 of a switch scenario model 1430. The output O1 and an output O2 are received as expected outputs by a verification space VD. The verification space VD generates an intermediate value IV3 from the outputs O1 and O2. The verification space VD is generated by the processor 101 from the module representation D. For example, the verification space VD performs the same functions as that of the module representation D.

The verification space VC receives the intermediate value IV3 from the verification space VD and generates the intermediate values IV1 and IV2 from the intermediate value IV3. The verification space VA receives the intermediate value IV1 from the verification space VC and generates the input I1 and an input I2, which are examples of stimuli, from the intermediate value IV1. Moreover, the verification space VB receives the intermediate value IV2 from the verification space VC and generates inputs I3 and I4, which are examples of stimuli, from the intermediate value IV2.

Moreover, as shown, the module representation A receives the input I1 and the input I2 and generates the intermediate value IV1 from the inputs I1 and I2. Also, the module representation B receives the inputs I3 and I4 and generates the intermediate value IV2 from the inputs I3 and I4.

In one embodiment, the intermediate value IV1 is the same or within a range of the input I1. In an embodiment, the intermediate value IV1 is the same or within a range of the input I2. For example, when the module representation A is a representation of an arbiter component, e.g., a switch, etc., of an SoC, the arbiter component switches between providing the inputs I1 and I2 as the intermediate value IV1. To illustrate, the arbiter component outputs the input I1 as the intermediate value IV1 when there is no push back from a queue sub-module of the module representation C or a queue sub-module of the module representation D or a queue sub-module of another module representation connected to the module representation D. In this illustration, the arbiter component does not output the input I1 as the intermediate value IV1 when there is a push back from another queue sub-module of the module representation C or another queue of the module representation D.

Moreover, the module representation C receives the intermediate values IV1 and IV2 from the respective module representations A and B, and generates the intermediate value IV3 from the intermediate values IV1 and IV2. For example, when the module representation C is generated based on functions performed by an arbiter, the module representation C outputs the intermediate values IV1 or IV2 as the intermediate value IV3 based on the conditions. As another example, when the module representation C is a summer or a multiplier or a divider, the module representation C sums or multiplies or divides the intermediate value IV1 and IV2 to generate the intermediate value IV3.

Furthermore, the module representation D receives the intermediate value IV3 from the module representation C and generates the output O1 and an output O2 from the intermediate value IV3. For example, when the module representation D represents a distributor, e.g., a de-multiplexer, a switch, etc., the intermediate value IV3 is distributed to the outputs O1 and O2, which are test outputs.

The test output O1 is compared to the expected output O1 to determine whether the test output O1 matches the expected output O1 or is within a pre-determined threshold of the expected output O1. Similarly, the test output O2 is compared to the expected output O2 to determine whether the test output O2 matches the expected output O2 or is within a pre-determined threshold of the expected output O2. Upon determining that the test output O1 is within the pre-determined threshold of the expected output O1 or matches the expected output O1 and upon determining that the test output O2 is within the pre-determined threshold of the expected output O2 or matches the expected output O2, the processor 101 determines that the switch scenario model 1430 passes a test. On the other hand, upon determining that the test output O1 is not within the pre-determined threshold of the expected output O1 or does not match the expected output O1 and/or upon determining that the test output O2 is not within the pre-determined threshold of the expected output O2 or does not match the expected output O2, the processor 101 determines that the switch scenario model 1430 fails a test.

In one embodiment, instead of the module representations A, B, C, and D, a component of an SoC is used to describe FIG. 14C. For example, a component of an SoC from which the module representation C is generated is used instead of the module representation C to generate the intermediate value IV3.

In an embodiment, a switch scenario module representation has a primary outcome of routing a transaction to one of its output ports. The switch scenario module representation has a secondary outcome that asserts backpressure on its input ports and/or has a secondary outcome that creates buffer overflow of a buffer module representation that is coupled to the switch scenario module representation and/or has a secondary outcome that creates buffer underflow of the buffer module representation. The backpressure on the input ports indicates error conditions regarding transfer of data via the switch scenario model.

FIG. 14D is a diagram of an embodiment of a system to illustrate generation of a stimulus from the expected output O1 of a pipeline scenario model 1440. The output O1 is applied as an expected output to a verification space VAout. The verification space VAout receives the output O1 and generates an intermediate value IV4 from the output O1. The verification space VAout is generated by the processor 101 from the module representation A. For example, the verification space VAout performs one or more functions performed by the module representation A.

A verification space VBout receives the intermediate value IV4 as an input from the verification space VAout and generates the intermediate value IV3 from the intermediate value IV4. The verification space VBout is generated by the processor 101 from the module representation B. For example, the verification space VBout performs one or more functions performed by the module representation B.

A verification space VCout receives the intermediate value IV3 from the verification space VBout and generates an intermediate value from the intermediate value IV3. The verification space VCout is generated by the processor 101 from the module representation C. For example, the verification space VCout performs one or more functions performed by the module representation C.

A verification space VCin receives the intermediate value generated by the verification space VCout and generates the intermediate value IV2 from the intermediate value generated by the verification space VCout. The verification space VCin is generated by the processor 101 from the module representation C. For example, the verification space VCin performs one or more functions performed by the module representation C.

It should be noted that in one embodiment, the verification space VCin performs a different function than that performed by the verification space VCout. In an embodiment, the verification space VCin performs the same function as that performed by the verification space VCout.

A verification space VBin receives the intermediate value IV2 from the verification space VCin and generates the intermediate value IV1 from the intermediate value IV2. The verification space VBin is generated by the processor 101 from the module representation B. For example, the verification space VBin performs one or more functions performed by the module representation B.

It should be noted that in one embodiment, the verification space VBin performs a different function than that performed by the verification space VBout. In an embodiment, the verification space VBin performs the same function as that performed by the verification space VBout.

A verification space VAin receives the intermediate value IV1 from the verification space VBin and generates the input I1, which is an example of a stimulus, from the intermediate value IV1. The verification space VAin is generated by the processor 101 from the module representation A. For example, the verification space VAin performs one or more functions performed by the module representation A.

It should be noted that in one embodiment, the verification space VAin performs a different function than that performed by the verification space VAout. In an embodiment, the verification space VAin performs the same function as that performed by the verification space VAout.

The stimulus I1 is forward propagated via the pipeline scenario model 140 that involves the module representations A, B, and C to generate the output O1. For example, the module representation A receives the input I1 and generates the intermediate value IV1 from the input I1. Moreover, the module representation B receives the intermediate value IV1 from the module representation A and generates the intermediate value IV2 from the intermediate value IV1. Furthermore, the module representation C receives the intermediate value IV2 from the module representation B and generates the intermediate value IV3 from the intermediate value IV2. Also, the module representation B receives the intermediate value IV3 from the module representation C and generates the intermediate value IV4 from the intermediate value IV3. The module representation A receives the intermediate value IV4 from the module representation B and generates the output O1 as a test output from the intermediate value IV4.

The test output O1 is compared to the expected output O1 to determine whether the test output O1 matches the expected output O1 or is within a pre-determined threshold of the expected output O1. Upon determining that the test output O1 is within the pre-determined threshold of the expected output O1 or matches the expected output O1, the processor 101 determines that the pipeline scenario model 1440 passes a test. On the other hand, upon determining that the test output O1 is not within the pre-determined threshold of the expected output O1 or does not match the expected output O1, the processor 101 determines that the pipeline scenario model 1430 fails a test.

In one embodiment, instead of the module representations A, B, and C, a component of an SoC is used to describe FIG. 14D. For example, a component of an SoC from which the module representation B is generated is used instead of the module representation B to generate the intermediate values IV2 and IV4.

FIG. 14E-1 is a diagram of an embodiment of a scenario model 1450 to illustrate generation of verification spaces for performing a write operation. During the write operation, the processor 101 uses the output O1 as an expected output. The expected output O1 is received by a verification space VMEMX and sent by the verification space VMEMX to the verification space VC. The verification space VMEMX is generated by the processor 101 and has the same functions as that of a memory device module representation MemX. The verification space VC determines whether the expected output O1 is received from a first requestor or a second requestor, both of which are described below. Upon determining that the expected output O1 is received from the first requestor, the verification space VC generates the intermediate value IV1 from the output O1 and provides the intermediate value IV1 to the verification space VA. The verification space VA generates the input value I1 from the intermediate value IV1 and sends the input value I1 to the first requestor. Moreover, upon determining that the expected output O1 is received from the first requestor, the verification space VC generates data D1 and provides the data D1 to verification space VB, which further sends the data D1 to the first requestor.

Upon determining that the expected output O1 is received from the second requestor, the verification space VC generates the intermediate value IV1 from the output O1 and provides the intermediate value IV1 to the verification space VA. The verification space VA generates the input value I2 from the intermediate value IV1 and sends the input value I2 to the second requestor. Moreover, upon determining that the expected output O1 is received from the second requestor, the verification space VC generates data D2 and provides the data D2 to verification space VB, which further sends the data D2 to the second requestor.

Moreover, during the write operation, the processor 101 uses the output O2 as an expected output. The expected output O2 is received by a verification space VMEMY and is sent by the verification space VMEMY to the verification space VD. The verification space VMEMY is generated by the processor 101 and has the same functions as that of a memory device module representation MemY. The verification space VD determines whether the expected output O2 is received from the first requestor or the second requestor. Upon determining that the expected output O2 is received from the first requestor, the verification space VD generates the intermediate value IV2 from the output O2 and provides the intermediate value IV2 to the verification space VA. The verification space VA generates the input value I1 from the intermediate value IV2 and sends the input value I1 to the first requestor. Moreover, upon determining that the expected output O2 is received from the first requestor, the verification space VD generates the data D1 and provides the data D1 to the verification space VB, which further sends the data D1 to the first requestor.

Upon determining that the expected output O2 is received from the second requestor, the verification space VD generates the intermediate value IV2 from the output O2 and provides the intermediate value IV2 to the verification space VA. The verification space VA generates the input value I2 from the intermediate value IV2 and sends the input value I2 to the second requestor. Moreover, upon determining that the expected output O2 is received from the second requestor, the verification space VD generates the data D2 and provides the data D2 to verification space VB, which further sends the data D2 to the second requestor.

During the write operation, the inputs I1, I2 and the data D1 and D2 are forward propagated via the corresponding module representations A, B, C, D, MemX, and MemY to generate test outputs, e.g., the outputs O1 and O2. During the write operation, the input I1 is received from the first requestor, e.g., an IP block, etc., which provides an instruction to perform the write operation and indicates an address, e.g., an address within a memory device module representation MemX, an address within a memory device module representation MemY, etc., at which data is to be written.

When the write operation is to be performed to the memory device module representation MemX, the instruction for performing the write operation and the address of the write operation are provided as the intermediate value IV1 to the module representation C. The module representation C requests data to be written to the address from the module representation B and the module representation B further requests data D1 from the first requestor. The data D1 is provided via the module representations B and C to be written to the memory device module representation MemX. The data D1 is provided to the memory device module representation MemX as the output O1.

If the write operation is to be performed by the first requestor to the memory device module representation MemY, the instruction of performing the write operation and the address of the write operation are provided as the intermediate value IV2 to the module representation D. The memory device module representation D requests data to be written to the address from the module representation B and the module representation B further requests the data D1 from the first requestor. The data D1 is provided via the module representations B and D to be written to the memory device module representation MemY. The data D1 is provided to the memory device module representation MemY as the output O2.

During the write operation, the input I2 is received from the second requestor, e.g., an IP block, etc., which provides an instruction whether to perform a read operation or a write operation and indicates an address, e.g., an address within a memory device module representation MemX, an address within a memory device module representation MemY, etc., at which data is to be written.

If the write operation is to be performed to the memory device module representation MemX by the second requestor, the instruction of performing the write operation and the address of the write operation are provided as the intermediate value IV1 to the module representation C. The module representation C requests data to be written to the address from the module representation B and the module representation B further requests data D2 from the second requestor. The data D2 is provided via the module representations B and C to be written to the memory device module representation MemX. The data D2 is provided to the memory device module representation MemX as the output O1.

If the write operation is to be performed by the second requestor to the memory device module representation MemY, the instruction of performing the write operation and the address of the write operation are provided as the intermediate value IV2 to the module representation D by the module representation A. The memory device module representation D requests data to be written to the address from the module representation B and the module representation B further requests the data D2 from the second requestor. The data D2 is provided via the module representations B and D to be written to the memory device module representation MemY. The data D2 is provided to the memory device module representation MemY as the output O2.

During the write operation, a test output is compared by the processor 101 with a corresponding expected output to determine whether the scenario model 1450 passed a test. For example, it is determined by the processor 101 whether the test output O1 is the same as or is within a pre-determined threshold of the expected output O1. Upon determining that the test output O1 is the same as or is within a pre-determined threshold of the expected output O1, the processor 101 determines that the scenario model 1450 passes a test for the write operation. On the other hand, upon determining that the test output O1 is not the same as or is not within the pre-determined threshold of the expected output O1, the processor 101 determines that the scenario model 1450 fails a test for the write operation. As another example, it is determined by the processor 101 whether the test output O2 is the same as or is within a pre-determined threshold of the expected output O2. Upon determining that the test output O2 is the same as or is within a pre-determined threshold of the expected output O2, the processor 101 determines that the scenario model 1450 passes a test for the write operation. On the other hand, upon determining that the test output O2 is not the same as or is not within the pre-determined threshold of the expected output O2, the processor 101 determines that the scenario model 1450 fails a test for the write operation.

In one embodiment, instead of the module representations A, B, C, D, MemX, and MemY, components of an SoC are used to describe FIG. 14E-1.

FIG. 14E-2 is a diagram of an embodiment of a scenario model 1460 to illustrate generation of verification spaces for performing a read operation. During the read operation, the processor 101 uses the output O1 as an expected output. It is determined by the verification space VC that the expected output O1 received by the verification space VC is to be provided to the verification space VMemX. The verification space VC further determines whether the expected output O1 is to be received from the first requestor or the second requestor. Upon determining that the expected output O1 is to be received from the first requestor for the read operation, the verification space VC generates the intermediate value IV1 from the output O1 and provides the intermediate value IV1 to the verification space VA. The verification space VA generates the input value I1 from the intermediate value IV1 and sends the input value I1 to the first requestor. Moreover, upon determining that the expected output O1 is to be received from the first requestor for the read operation, the verification space VC sends a request for the data D1 and provides the request for the data D1 to the verification space VB, which further sends the request to the first requestor to receive the data D1 from the first requestor.

Upon determining that the expected output O1 is to be received from the second requestor for the read operation, the verification space VC generates the intermediate value IV1 from the output O1 and provides the intermediate value IV1 to the verification space VA. The verification space VA generates the input value I2 from the intermediate value IV1 and sends the input value I2 to the second requestor. Moreover, upon determining that the expected output O1 is to be received from the second requestor for the read operation, the verification space VC sends a request for the data D2 and provides the request for the data D2 to the verification space VB, which further sends the request to the second requestor to receive the data D2 from the second requestor.

The processor 101 uses the output O2 as an expected output. It is determined by the verification space VD that the expected output O2 is to be provided to the verification space VMemY by the verification space VD. The verification space VD further determines whether the expected output O2 is to be received from the first requestor or the second requestor. Upon determining that the expected output O2 is to be received from the first requestor for the read operation, the verification space VD generates the intermediate value IV2 from the output O2 and provides the intermediate value IV2 to the verification space VA. The verification space VA generates the input value I1 from the intermediate value IV2 and sends the input value I1 to the first requestor. Moreover, upon determining that the expected output O2 is to be received from the first requestor for the read operation, the verification space VD sends a request for the data D1 and provides the request for the data D1 to the verification space VB, which further sends the request to the first requestor to receive the data D1 from the first requestor.

Upon determining that the expected output O2 is to be received from the second requestor for the read operation, the verification space VD generates the intermediate value IV2 from the output O2 and provides the intermediate value IV2 to the verification space VA. The verification space VA generates the input value I2 from the intermediate value IV2 and sends the input value I2 to the second requestor. Moreover, upon determining that the expected output O2 is to be received from the second requestor for the read operation, the verification space VD sends a request for the data D2 and provides the request for the data D2 to the verification space VB, which further sends the request to the second requestor to receive the data D2 from the second requestor.

During the read operation, the inputs I1, I2 are forward propagated and the data D1 and D2 are backward propagated via the corresponding module representations A, B, C, D, MemX, and MemY to generate test outputs, e.g., the outputs O1 and O2. During the read operation, the input I1 is received from the first requestor indicating to perform the read operation and indicating an address, e.g., an address within a memory device module representation MemX, an address within a memory device module representation MemY, etc., from which data is to be read.

When the read operation is to be performed from the memory device module representation MemX by the first requestor, the instruction of performing the read operation and the address of the read operation are provided as the intermediate value IV1 to the module representation C. The module representation C requests data to be read from the address of the memory device module representation MemX. Upon receiving the request for reading the data, the memory device module representation MemX provides the output O1 as data to the module representation C. Moreover, the memory device module representation C determines that the first requestor requested the read operation and provides the read data to the module representation B for sending to the first requestor. The module representation B provides the data D1 as an output to the first requestor upon receiving the read data from the module representation C and upon receiving an indication that the read data is to be sent to the first requestor.

When the read operation is to be performed from the memory device module representation MemY by the first requestor, the instruction of performing the read operation and the address of the read operation are provided as the intermediate value IV2 to the module representation D. The module representation D requests data to be read from the address of the memory device module representation MemY. Upon receiving the request for reading the data, the memory device module representation MemY provides the output O2 as data to the module representation D. Moreover, the module representation D determines that the first requestor requested the read operation and provides the read data to the module representation B for sending to the first requestor. The module representation B provides the data D1 as an output to the first requestor upon receiving the read data from the module representation D and upon receiving an indication that the read data is to be sent to the first requestor.

When the read operation is to be performed from the memory device module representation MemX by the second requestor, the instruction of performing the read operation and the address of the read operation are provided as the intermediate value IV1 to the module representation C. The module representation C requests data to be read from the address of the memory device module representation MemX. Upon receiving the request for reading the data, the memory device module representation MemX provides the output O1 as data to the module representation C. Moreover, the memory device module representation C determines that the second requestor requested the read operation and provides the read data to the module representation B for sending to the second requestor. The module representation B provides the data D1 as an output to the second requestor upon receiving the read data from the module representation C and upon receiving an indication that the read data is to be sent to the second requestor.

When the read operation is to be performed from the memory device module representation MemY by the second requestor, the instruction of performing the read operation and the address of the read operation are provided as the intermediate value IV2 to the module representation D. The module representation D requests data to be read from the address of the memory device module representation MemY. Upon receiving the request for reading the data, the memory device module representation MemY provides the output O2 as data to the module representation D. Moreover, the module representation D determines that the second requestor requested the read operation and provides the read data to the module representation B for sending to the second requestor. The module representation B provides the data D1 as an output to the second requestor upon receiving the read data from the module representation D and upon receiving an indication that the read data is to be sent to the second requestor.

A test output is compared by the processor 101 with a corresponding expected output to determine whether the scenario model 1460 passes a test for the read operation. For example, it is determined by the processor 101 whether the test output O1 is the same as or is within a pre-determined threshold of the expected output O1. Upon determining that the test output O1 is the same as or is within a pre-determined threshold of the expected output O1, the processor 101 determines that the scenario model 1450 passes a test for the read operation. On the other hand, upon determining that the test output O1 is not the same as or is not within the pre-determined threshold of the expected output O1, the processor 101 determines that the scenario model 1450 fails a test for the read operation. As another example, it is determined by the processor 101 whether the test output O2 is the same as or is within a pre-determined threshold of the expected output O2. Upon determining that the test output O2 is the same as or is within a pre-determined threshold of the expected output O2, the processor 101 determines that the scenario model 1450 passes a test for the read operation. On the other hand, upon determining that the test output O2 is not the same as or is not within the pre-determined threshold of the expected output O2, the processor 101 determines that the scenario model 1450 fails a test for the read operation.

In one embodiment, instead of the module representations A, B, C, D, MemX, and MemY, components of an SoC are used to describe FIG. 14E-2.

Figure 14F:
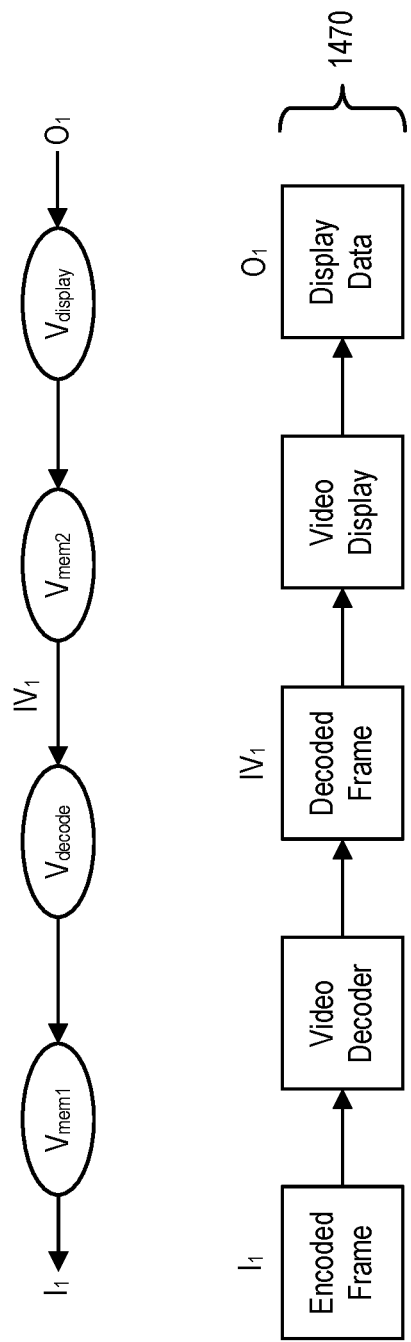
FIG. 14F is a diagram of a system for generating a stimulus for displaying video data and then generating test display data based on the stimulus to be compared with expected display data, in accordance with one embodiment described in the present disclosure.

FIG. 14F is a diagram of an embodiment of a system 1470 for generating a stimulus for displaying video data and then generating test display data based on the stimulus to be compared with expected display data. The processor 101 determines a video to be an expected output. The processor 101 generates a verification space Vdisplay from a video display device. For example, the verification space Vdisplay performs the same functions as that performed by the video display device. As another example, the verification space Vdisplay is a scenario model for the video display device. To further illustrate, the verification space Vdisplay is a scenario model that has an application of functionality of the video display device. The verification space Vdisplay is executed by the processor 101 to generate a decoded frame from the video, which is the expected output, and to further determine that the decoded frame is to be stored in a verification space Vmem2.

The verification space Vmem2 is created by the processor 101 based on a memory device that stores the decoded frame, and is executed by the processor 101 to store the decoded frame. For example, the verification space Vmem2 performs the same functions as that performed by the memory device that stores the decoded frame. As another example, the verification space Vmem2 is a scenario model for the memory device that stores the decoded frame. To further illustrate, the verification space Vmem2 is a scenario model that has an application of functionality of the memory device that stores the decoded frame.

The decoded frame is encoded by a verification space Vdecode to generate an encoded frame. The verification space Vdecode is created by the processor 101 based on a video decoder, and is executed by the processor 101. For example, the verification space Vdecode performs the same functions as that performed by the video decoder. As another example, the verification space Vdecode is a scenario model for the video decoder. To further illustrate, the verification space Vdecode is a scenario model that has an application of functionality of the video decoder. The encoded frame is stored in a verification space Vmem1 by the processor 101. The verification space Vmem1 is created by the processor 101 based on a memory device that stores the encoded frame, and is executed by the processor 101 to store the encoded frame. For example, the verification space Vmem1 performs the same functions as that performed by the memory device that stores the encoded frame. As another example, the verification space Vmem1 is a scenario model for the memory device that stores the encoded frame. To illustrate, the verification space Vmem1 is a scenario model that has an application of functionality of the memory device that stores the encoded frame.

The video decoder receives the encoded frame, which is an example of the input I1, and decodes the encoded frame to generate the decoded frame, which is an example of the intermediate value IV1. The video display device receives the decoded frame and displays the video frame as the video, which is an example of the output O1.

In one embodiment, the verification space Vdecode is executed in one thread, e.g., a producer thread, etc., and the verification space Vdisplay is executed in another thread, e.g., a consumer thread, etc.

In an embodiment, a verification space is generated and executed by the processor 101.

In one embodiment, all module representations described herein are generated and executed by the processor 101.

It should be noted that although some the above embodiments are described with respect to the computing device, in an embodiment, instead of the processors of the computing device, processors of different computing devices are used. For example, the processor 110 of the computing device parses the file that defines the SoC and a processor of another computing device executes the comparator 220 (FIG. 2A-2).

It is noted that although some of the above-described embodiments are described with respect to the processor 101, in one embodiment, another processor is used to perform the operations described herein as being performed by the processor 101.

In an embodiment, instead of a memory device, a virtual memory device, e.g., a range of memory addresses within a memory device, etc., is used.

In one embodiment, a scenario model that includes information that is not specific to an SoC, e.g., a processor, an integrated circuit, etc., is applied by the processor 101 to another SoC, e.g., for testing the other SoC.

In one embodiment, a scenario model is generated to achieve an extraordinary outcome, which is an example of an expected output or a secondary outcome. For example, a scenario model is generated to divide a number by zero. Another scenario model is generated to add two numbers to achieve a carry over. It should be noted that an ordinary outcome of a scenario model is an example of a primary outcome. For example, a result of an addition that does not include a carry-over is an ordinary outcome. As another example, a division by a number that generates no remainder is an ordinary outcome.

In an embodiment, multiple scenario models are executed in parallel to perform a test. For example, a first application scenario model is executed simultaneously with a second application scenario model. In this example, the first application scenario model is executed to generate a primary outcome or a secondary outcome and the second application scenario model is executed to generate a primary outcome or a secondary outcome. As another example, a first driver scenario model is executed simultaneously with a second driver scenario model or an application scenario model. In this example, the first driver scenario model is executed to generate a primary outcome or a secondary outcome and the second driver scenario model or the application scenario model is executed to generate a primary outcome or a secondary outcome. To illustrate, inputs snoops to a cache module representation are set up simultaneously with executing a read or a write request to the cache module representation. As yet another example, a first performance scenario model is executed at the same time as a second performance scenario model or an application scenario model or a driver scenario model. In this example, the first performance scenario model is executed to generate a primary outcome or a secondary outcome and the second performance scenario model or the application scenario model or the driver scenario model is executed to generate a primary outcome or a secondary outcome.

In one embodiment, a value of a primary outcome is used as a value of a secondary outcome. For example, a memory address that is output from a cache module representation is used as a secondary outcome to generate a stimulus. The stimulus is generated by applying a function performed by the cache module representation different from a function performed to generate the memory address. To further illustrate, the memory address output is generated by applying a primary function of the cache module representation of facilitating a read from or a write of data to the cache module representation and the stimulus is generated to fetch data from the memory address of a main memory device module representation.

In an embodiment, a value of a secondary outcome is used as a value of a primary outcome.

It should further be noted that although some of the embodiments described above relate to the functions, described above, as being performed by a digital camera, in one embodiment, the embodiments equally apply to various other functions, e.g., resetting registers, resetting addresses within a memory device, generating interrupts, interrupt handling, handling contention for shared resources, committing write data to an address of a memory device before a read operation is to be performed, generation of randomized page tables and selecting memory addresses to hit and miss in the page tables, randomized switching between clock and power modes of the system and power control module representation, controlling memory stall rates, etc. The various other functions are performed by one or more components of an SoC.

Other examples of the various other functions include allocating memory buffers and freeing the buffers on demand, random use of addresses of a cache to create cache line collisions to test cache coherency, partial re-use of recently freed buffers, checking accessibility of a CPU to one or more registers, checking accessibility of a CPU to one or more memory devices, checking a component of an SoC to determine whether the component is able to drive an I/O or generate an interrupt, concurrent performance of multiple components of an SoC, checking register values, checking I/Os, sending data to an I/O, receiving data from an I/O, logging diagnostic messages on progress of threads, logging diagnostic messages on a state of a memory device, checking memory data buffers, checking time elapsed between two events occurring using a number of scenario models, etc. In one embodiment, an event is a function that is performed to generate a test outcome.

Yet other examples of the various other functions include transferring data from a memory device via a component of an SoC to an output port of the SoC, transferring data from the component to the output port, transferring data from an input port of the SoC via a component of the SoC to the memory device, transferring data from the input port to the component, transferring data from one memory device to another memory device, etc. In one embodiment, a DMA agent is used to transfer data.

Further examples of the various other functions include sending an interrupt from an IP block to a CPU that services the interrupt. The interrupt is sent when the IP block finishes execution of its task. Moreover, the CPU is assigned to the IP block for an amount of time the IP block finishes execution of the task. In an embodiment, CPUs are not assigned to IP blocks. In this embodiment, any CPU receives an interrupt from an IP block and upon receiving the interrupt, sets a mutex for the interrupt so that another CPU is able to service a task to be performed by the IP block. In one embodiment, an interrupt handler, which is an example of a computer software program, services an IP block until a task is finished execution by the IP block. The interrupt handler generates an interrupt when the IP block finishes execution of the task. In an embodiment, the interrupt handler is executed under an operating system (OS) or a real time operation system (RTOS).

It should further be noted that although some of the embodiments described above relate to functions performed by an SoC, the embodiments apply to components that are located outside the SoC. For example, asynchronous events, e.g., external bus masters, I/Os, external interrupts, fault injections to or from an external component, fault resets of an external component or received from an external component, etc., that are associated with devices external to an SoC are tested using the embodiments described above. To further illustrate, when a fault signal is sent to an external component and an acknowledgment of the fault signal is not received from the external component within a pre-determined time period, the processor 101 determines that the external component fails a test.

In one embodiment, an SoC is implemented within a computing device, a mobile phone, a home appliance, a television, a smart television, a tablet, the Internet, a computer network, an Intranet, etc.

Moreover, although the above embodiments are described with respect to a processor, in one embodiment, the functions described herein are being performed by the processor are performed instead by one or more virtual machines (VMs) or by one or more servers or by multiple processors.

In some embodiments, a scenario model, as used herein, is a scenario. Moreover, in these embodiments, multiple scenarios form a scenario model.

In one embodiment, any operations, described herein, as being performed by a GPU are performed by a processor, e.g., the processor 101, etc.

Embodiments described herein may be practiced with various computer system configurations including hand-held hardware units, microprocessor systems, microprocessor-based or programmable consumer electronics, minicomputers, mainframe computers and the like. In one embodiment, the embodiments described herein are practiced in distributed computing environments where tasks are performed by remote processing hardware units that are linked through a computer network.

With the above embodiments in mind, it should be understood that some of the embodiments employ various computer-implemented operations involving data stored in computer systems. These operations are those physically manipulating physical quantities. Any of the operations described herein that form part of the embodiments are useful machine operations.

Some of the embodiments also relate to a hardware unit or an apparatus for performing these operations. The apparatus is specially constructed for a special purpose computer. When defined as a special purpose computer, the computer performs other processing, program execution or routines that are not part of the special purpose, while still being capable of operating for the special purpose.

In one embodiment, the operations described herein are processed by a computer selectively activated or configured by one or more computer programs stored in a computer memory, cache, or obtained over a computer network. When data is obtained over the computer network, the data is processed by other computers on the computer network, e.g., a cloud of computing resources.

In an embodiment, one or more embodiments, described above, are fabricated as computer-readable code on a non-transitory computer-readable medium. The non-transitory computer-readable medium is any data storage hardware unit, e.g., a memory device, etc., that stores data, which is thereafter be read by a computer system. Examples of the non-transitory computer-readable medium include hard drives, network attached storage (NAS), ROM, RAM, compact disc-ROMs (CD-ROMs), CD-recordables (CD-Rs), CD-rewritables (CD-RWs), magnetic tapes and other optical and non-optical data storage hardware units. In an embodiment, the non-transitory computer-readable medium includes a computer-readable tangible medium distributed over a network-coupled computer system so that the computer-readable code is stored and executed in a distributed fashion.

Although the method operations above were described in a specific order, it should be understood that in various embodiments, other housekeeping operations are performed in between operations, or the method operations are adjusted so that they occur at slightly different times, or are distributed in a system which allows the occurrence of the method operations at various intervals, or are performed in a different order than that described above.

It should further be noted that in an embodiment, one or more features from any embodiment described above are combined with one or more features of any other embodiment without departing from a scope described in various embodiments described in the present disclosure.

Although the foregoing embodiments have been described in some detail for purposes of clarity of understanding, it will be apparent that certain changes and modifications can be practiced within the scope of appended claims. Accordingly, the present embodiments are to be considered as illustrative and not restrictive, and the embodiments are not to be limited to the details given herein, but may be modified within the scope and equivalents of the appended claims.

The invention claimed is:

1. A method comprising:

generating a stimulus to be applied to an input of one of a first plurality of driver scenario models based on an expected result to be achieved at an output of one of a second plurality of driver scenario models, wherein the one of the first plurality of driver scenario models represents a first function and the one of the second plurality of driver scenario models represents a second function, wherein said generating the stimulus includes back propagating the expected result from an output of the second function represented by the one of the second plurality of driver scenario models via the second function represented by the one of the second plurality of driver scenario models and via the first function represented by the one of the first plurality of driver scenario models to determine the stimulus at an input node of the first function, wherein the first function and the second function are associated with a test of a design of one or more systems on chips (SoCs), wherein the one of the first plurality of driver scenario models is configured to be executed during an emulation stage, a prototyping stage, and a post-silicon stage of the one or more SoCs;

generating a graphical display of multiple computer threads including a first computer thread and a second computer thread, wherein the graphical display of the multiple computer threads includes a graphical display of the first computer thread and a graphical display of the second computer thread, wherein the graphical display of the first computer thread includes a graphical display of the one of the first plurality of driver scenario models and the graphical display of the second computer thread includes a graphical display of the one of the second plurality of driver scenario models, wherein the graphical display of the one of the first plurality of driver scenario models of the first computer thread graphically conveys a state of execution of the one of the first plurality of driver scenario models of the first computer thread and the graphical display of the one of the second plurality of driver scenario models of the second computer thread graphically conveys a state of execution of the one of the second plurality of driver scenario models of the second computer thread; and identifying, within the graphical display of the multiple computer threads, a directionality of flow of execution from the graphical display of the one of the first plurality of driver scenario models of the first computer thread to the graphical display of the one of the second plurality of driver scenario models of the second computer thread, wherein the directionality of flow of execution provides a sequence of execution during the test from the stimulus via the one of the first plurality of driver scenario models of the first computer thread to the one of the second plurality of driver scenario models of the second computer thread.

2. The method of claim 1, wherein the graphical display of the multiple computer threads includes multiple bar graphs, wherein a portion of one of the bar graphs represents the one of the first plurality of driver scenario models of the first computer thread and a portion of another one of the bar graphs represents the one of the second plurality of driver scenario models of the second computer thread.

3. The method of claim 2, wherein the one of the bar graphs is aligned in a horizontal direction or a vertical direction with the another one of the bar graphs.

4. The method of claim 2, wherein the portion of the one of the bar graphs is a first portion, wherein the one of the bar graphs includes a second portion and a third portion, wherein the first portion indicates that the one of the first plurality of driver scenario models of the first computer thread has finished execution during the test, the second portion indicates that another one of the first plurality of driver scenario models of the first computer thread is to be executed during the test, and the third portion indicates that yet another one of the first plurality of driver scenario models of the first computer thread has paused execution during the test, the method further comprising:
generating a different display format for the first portion than that of the second portion; and
generating a different display format for the second portion than that of the third portion.

5. The method of claim 1, wherein the directionality of flow of execution is indicated using an arrow.

6. The method of claim 1, wherein the first computer thread is executed on a first central processing unit (CPU) design and the second computer thread is executed on a second CPU design during the test.

7. The method of claim 1, wherein the first and second computer threads are executed by a single central processing unit (CPU).

8. The method of claim 1, further comprising:
generating a display of a portion of a computer program besides the graphical display of the multiple computer threads, the portion of the computer program including a program code associated with the one of the first plurality of driver scenario models of the first computer thread and a program code associated with the one of the second plurality of driver scenario models of the second computer thread.

9. The method of claim 8, further comprising:
receiving an indication of a selection of the graphical display of the one of the first plurality of driver scenario models of the first computer thread; and
highlighting at least a portion of the program code associated with the selected graphical display of the one of the first plurality of driver scenario models of the first computer thread upon receiving the selection of the graphical display of the one of the first plurality of driver scenario models of the first computer thread.

10. The method of claim 1, further comprising:
generating an events file having the expected result;
executing the first and second computer threads in the directionality of flow within a test bench by applying the stimulus to generate a test result;
receiving the test result from the test bench;
comparing the test result with the expected result to determine whether the design of the one or more SoCs pass the test.

11. The method of claim 1, wherein the one of the first plurality of driver scenario models of the first computer thread is configured to be executed during an SoC stage, a subsystem stage, and an intellectual property (IP) stage of the one or more SoCs, wherein during the SoC stage, a bus verification intellectual property (VIP) block is used instead of a central processing unit (CPU), wherein during the SoC stage, the CPU is used to test the design of the one or more SoCs.

12. A method comprising:
generating a stimulus to be applied at an input of a first driver scenario model based on an expected result to be achieved at an output of a second driver scenario model, wherein the first driver scenario model represents a first function and the second driver scenario model represents a second function, wherein said generating the stimulus includes back propagating the expected result from an output of the second function represented by the second driver scenario model via the second function represented by the second driver scenario model and via the first function represented by the first driver scenario model to determine the stimulus at an input node of the first function;
receiving multiple application scenario models, the application scenario models including the first driver scenario model and the second driver scenario model, the application scenario models for testing a design of one or more systems on chips (SoCs), wherein the first driver scenario model is configured to be executed during an emulation stage, a prototyping stage, and a post-silicon stage of the one or more SoCs;
assigning the first driver scenario model to a first computer thread and the second driver scenario model to a second computer thread;
providing the first driver scenario model, the second driver scenario model, the assignment of the first driver scenario model, the assignment of the second driver scenario model, and the stimulus for said testing of the design of the one or more SoCs; and
generating a graphical display of the first and second computer threads, wherein the graphical display of the first computer thread includes a graphical display of the first driver scenario model and the graphical display of the second computer thread includes a graphical display of the second driver scenario model, wherein the graphical display of the first driver scenario model graphically conveys a state of execution of the first driver scenario model and the graphical display of the second driver scenario model graphical conveys a state of execution of the second driver scenario model, wherein the graphical display of the first and second computer threads represents a directionality of the flow of execution from the stimulus via the first driver scenario model assigned to the first computer thread to the second driver scenario model assigned to the second computer thread.

13. The method of claim 12, wherein the directionality of flow is indicated in a form of an arrow pointing from the graphical display of the first driver scenario model to the graphical display of the second driver scenario model.

14. The method of claim 12, further comprising:
highlighting each of the graphical displays of the first and second driver scenario models based on whether the driver scenario model has executed, is to be executed, and a breakpoint is found in the driver scenario model.

15. The method of claim 12, further comprising:
generating a textual display of a computer code of the first and second driver scenario models; and
displaying the textual display besides the graphical displays of the first and second computer threads.

16. The method of claim 12, wherein the first computer thread is executed by a first processor and the second computer thread is executed by a second processor.

17. The method of claim 12, wherein the first and second computer threads are executed by a single processor.

18. The method of claim 12, further comprising:
receiving an indication of a selection of the graphical display of the first driver scenario model in the first computer thread; and
highlighting a textual display of a computer code of the first driver scenario model upon receiving the indication of the selection of the graphical display of the first driver scenario model.

19. The method of claim 18, wherein the textual display is highlighted besides the graphical displays of the first and second computer threads.

20. The method of claim 18, wherein the textual display includes a zoom-in of the computer code of the first driver scenario model.

21. A system comprising:
one or more processors for:
generating a stimulus to be applied to an input of one of a first plurality of driver scenario models based on an expected result to be achieved at an output of one of a second plurality of driver scenario models, wherein the one of the first plurality of driver scenario models represents a first function and the one of the second plurality of driver scenario models represents a second function, wherein said generating the stimulus includes back propagating the expected result from an output of the second function represented by the one of the second plurality of driver scenario models via the second function represented by the one of the second plurality of driver scenario models and via the first function represented by the one of the first plurality of driver scenario models to determine the stimulus at an input node of the first function, wherein the first function and the second function are associated with a test of a design of one or more systems on chips (SoCs), wherein the one of the first plurality of driver scenario models is configured to be executed during an emulation stage, a prototyping stage, and a post-silicon stage of the one or more SoCs;
generating a graphical display of multiple computer threads including a first computer thread and a second computer thread, wherein the graphical display of the multiple computer threads includes a graphical display of the first computer thread and a graphical display of the second computer thread, wherein the graphical display of the first computer thread includes a graphical display of the one of the first plurality of driver scenario models and the graphical display of the second computer thread includes a graphical display of the one of the second plurality of driver scenario models, wherein the graphical display of the one of the first plurality of driver scenario models of the first computer thread graphically conveys a state of execution of the one of the first plurality of driver scenario models of the first computer thread and the graphical display of the one of the second plurality of driver scenario models of the second computer thread graphically conveys a state of execution of the one of the second plurality of driver scenario models of the second computer thread; and
identifying, within the graphical display of the multiple computer threads, a directionality of flow of execution from the graphical display of the one of the first plurality of driver scenario models of the first computer thread to the graphical display of the one of the second plurality of driver scenario models of the second computer thread, wherein the directionality of flow of execution provides a sequence of execution during the test from the stimulus via the one of the first plurality of driver scenario models of the first computer thread to the one of the second plurality of driver scenario models of the second computer thread; and
a memory device coupled to the one or more processors.

22. The system of claim 21, wherein the graphical display of the multiple computer threads includes multiple bar graphs, wherein a portion of one of the bar graphs represents the one of the first plurality of driver scenario models of the first computer thread and a portion of another one of the bar graphs represents the one of the second plurality of driver scenario models of the second computer thread.

* * * * *